US012430646B2

(12) United States Patent
Seguritan et al.

(10) Patent No.: US 12,430,646 B2
(45) Date of Patent: Sep. 30, 2025

(54) SYSTEMS AND METHODS OF GENERATING RISK SCORES AND PREDICTIVE FRAUD MODELING

(71) Applicant: CSIdentity Corporation, Austin, TX (US)

(72) Inventors: Victor Seguritan, San Diego, CA (US); Brian Michael Stack, Sam Clemente, CA (US); Joel Carleton, San Diego, CA (US); David Burdelski, Winchester, MA (US)

(73) Assignee: CSIdentity Corporation, Austin, TX (US)

( * ) Notice: Subject to any disclaimer, the term of this patent is extended or adjusted under 35 U.S.C. 154(b) by 81 days.

(21) Appl. No.: 17/658,604

(22) Filed: Apr. 8, 2022

(65) Prior Publication Data

US 2022/0327541 A1    Oct. 13, 2022

Related U.S. Application Data

(60) Provisional application No. 63/173,913, filed on Apr. 12, 2021.

(51) Int. Cl.
*G06Q 20/40* (2012.01)
(52) U.S. Cl.
CPC .................. *G06Q 20/4016* (2013.01)
(58) Field of Classification Search
CPC ................................................. G06Q 20/4016
USPC .......................................................... 705/75
See application file for complete search history.

(56) References Cited

U.S. PATENT DOCUMENTS

| 2,074,513 A | 3/1937 | Mills |
| 3,316,395 A | 4/1967 | Lavin et al. |
| 3,752,904 A | 8/1973 | Waterbury |
| 4,163,290 A | 7/1979 | Sutherlin et al. |
| 5,274,547 A | 12/1993 | Zoffel et al. |
| 5,323,315 A | 6/1994 | Highbloom |
| 5,386,104 A | 1/1995 | Sime |
| 5,414,833 A | 5/1995 | Hershey et al. |

(Continued)

FOREIGN PATENT DOCUMENTS

| AU | 2011203185 | 7/2011 |
| AU | 2021215125 | 9/2021 |

(Continued)

OTHER PUBLICATIONS

Aïmeur et al., "The Scourge of Internet Personal Data Collection", 2013 International Conference on Availability, Reliability and Security, pp. 821-828.

(Continued)

*Primary Examiner* — John W Hayes
*Assistant Examiner* — Wodajo Getachew
(74) *Attorney, Agent, or Firm* — Knobbe Martens Olson & Bear LLP

(57) ABSTRACT

One or more implementations include methods, systems, and/or devices to help protect consumers from fraudulent activity using compromised PII. For example, systems and methods can be implemented that enable the detection and prevention of consumer-focused identity theft, generates a risk score and is powered by a predictive model using machine learning techniques and tools and presents information and recommended action a user can take in reports.

20 Claims, 11 Drawing Sheets

(56) References Cited

U.S. PATENT DOCUMENTS

| | | |
|---|---|---|
| 5,454,030 A | 9/1995 | de Oliveira et al. |
| 5,504,675 A | 4/1996 | Cragun et al. |
| 5,563,783 A | 10/1996 | Stolfo et al. |
| 5,627,886 A | 5/1997 | Bowman |
| 5,679,940 A | 10/1997 | Templeton et al. |
| 5,696,907 A | 12/1997 | Tom |
| 5,696,965 A | 12/1997 | Dedrick |
| 5,739,512 A | 4/1998 | Tognazzini |
| 5,742,775 A | 4/1998 | King |
| 5,745,654 A | 4/1998 | Titan |
| 5,752,242 A | 5/1998 | Havens |
| 5,754,632 A | 5/1998 | Smith |
| 5,774,868 A | 6/1998 | Cragun et al. |
| 5,793,497 A | 8/1998 | Funk |
| 5,809,478 A | 9/1998 | Greco et al. |
| 5,819,226 A | 10/1998 | Gopinathan et al. |
| 5,819,260 A | 10/1998 | Lu et al. |
| 5,822,741 A | 10/1998 | Fischthal |
| 5,832,068 A | 11/1998 | Smith |
| 5,842,178 A | 11/1998 | Giovannoli |
| 5,870,721 A | 2/1999 | Norris |
| 5,872,921 A | 2/1999 | Zahariev et al. |
| 5,878,403 A | 3/1999 | DeFrancesco |
| 5,879,297 A | 3/1999 | Haynor et al. |
| 5,884,289 A | 3/1999 | Anderson et al. |
| 5,912,839 A | 6/1999 | Ovshinsky et al. |
| 5,913,196 A | 6/1999 | Talmor et al. |
| 5,943,666 A | 8/1999 | Kleewein et al. |
| 5,950,179 A | 9/1999 | Buchanan et al. |
| 5,987,440 A | 11/1999 | O'Neil et al. |
| 5,999,907 A | 12/1999 | Donner |
| 5,999,940 A | 12/1999 | Ranger |
| 6,023,694 A | 2/2000 | Kouchi et al. |
| 6,029,139 A | 2/2000 | Cunningham et al. |
| 6,029,149 A | 2/2000 | Dykstra et al. |
| 6,029,154 A | 2/2000 | Pettitt |
| 6,029,194 A | 2/2000 | Tilt |
| 6,044,357 A | 3/2000 | Garg |
| 6,055,570 A | 4/2000 | Nielsen |
| 6,094,643 A | 7/2000 | Anderson et al. |
| 6,119,103 A | 9/2000 | Basch et al. |
| 6,125,985 A | 10/2000 | Amdahl et al. |
| 6,142,283 A | 11/2000 | Amdahl et al. |
| 6,144,988 A | 11/2000 | Kappel |
| 6,157,707 A | 12/2000 | Baulier et al. |
| 6,182,219 B1 | 1/2001 | Feldbau et al. |
| 6,208,720 B1 | 3/2001 | Curtis et al. |
| 6,249,228 B1 | 6/2001 | Shirk et al. |
| 6,253,203 B1 | 6/2001 | O'Flaherty et al. |
| 6,254,000 B1 | 7/2001 | Degen et al. |
| 6,263,447 B1 | 7/2001 | French et al. |
| 6,269,349 B1 | 7/2001 | Aieta et al. |
| 6,282,658 B2 | 8/2001 | French et al. |
| 6,285,983 B1 | 9/2001 | Jenkins |
| 6,285,987 B1 | 9/2001 | Roth et al. |
| 6,292,795 B1 | 9/2001 | Peters et al. |
| 6,311,169 B2 | 10/2001 | Duhon |
| 6,317,783 B1 | 11/2001 | Freishtat et al. |
| 6,321,339 B1 | 11/2001 | French et al. |
| 6,330,546 B1 | 12/2001 | Gopinathan et al. |
| 6,397,197 B1 | 5/2002 | Gindlesperger |
| 6,418,436 B1 | 7/2002 | Degen et al. |
| 6,424,956 B1 | 7/2002 | Werbos |
| 6,448,889 B1 | 9/2002 | Hudson |
| 6,456,984 B1 | 9/2002 | Demoff et al. |
| 6,496,936 B1 | 12/2002 | French et al. |
| 6,505,193 B1 | 1/2003 | Musgrave et al. |
| 6,510,415 B1 | 1/2003 | Talmor et al. |
| 6,513,018 B1 | 1/2003 | Culhane |
| 6,532,459 B1 | 3/2003 | Berson |
| 6,542,894 B1 | 4/2003 | Lee et al. |
| 6,543,683 B2 | 4/2003 | Hoffman |
| 6,553,495 B1 | 4/2003 | Johansson et al. |
| 6,571,334 B1 | 5/2003 | Feldbau et al. |
| 6,597,775 B2 | 7/2003 | Lawyer et al. |
| 6,612,488 B2 | 9/2003 | Suzuki |
| 6,615,193 B1 | 9/2003 | Kingdon et al. |
| 6,658,393 B1 | 12/2003 | Basch et al. |
| 6,662,023 B1 | 12/2003 | Helle |
| 6,696,941 B2 | 2/2004 | Baker |
| 6,700,220 B2 | 3/2004 | Bayeur et al. |
| 6,714,918 B2 | 3/2004 | Hillmer et al. |
| 6,735,572 B2 | 5/2004 | Landesmann |
| 6,740,875 B1 | 5/2004 | Ishikawa et al. |
| 6,748,426 B1 | 6/2004 | Shaffer et al. |
| 6,751,626 B2 | 6/2004 | Brown et al. |
| 6,796,497 B2 | 9/2004 | Benkert et al. |
| 6,811,082 B2 | 11/2004 | Wong |
| 6,829,711 B1 | 12/2004 | Kwok et al. |
| 6,850,606 B2 | 2/2005 | Lawyer et al. |
| 6,857,073 B2 | 2/2005 | French et al. |
| 6,866,586 B2 | 3/2005 | Oberberger et al. |
| 6,871,287 B1 | 3/2005 | Ellingson |
| 6,873,979 B2 | 3/2005 | Fishman et al. |
| 6,898,574 B1 | 5/2005 | Regan |
| 6,907,408 B2 | 6/2005 | Angel |
| 6,908,030 B2 | 6/2005 | Rajasekaran et al. |
| 6,913,194 B2 | 7/2005 | Suzuki |
| 6,918,038 B1 | 7/2005 | Smith et al. |
| 6,920,435 B2 | 7/2005 | Hoffman et al. |
| 6,928,546 B1 | 8/2005 | Nanavati et al. |
| 6,930,707 B2 | 8/2005 | Bates et al. |
| 6,934,849 B2 | 8/2005 | Kramer et al. |
| 6,934,858 B2 | 8/2005 | Woodhill |
| 6,965,881 B1 | 11/2005 | Brickell et al. |
| 6,965,997 B2 | 11/2005 | Dutta |
| 6,973,462 B2 | 12/2005 | Dattero et al. |
| 6,973,575 B2 | 12/2005 | Arnold |
| 6,983,381 B2 | 1/2006 | Jerdonek |
| 6,983,882 B2 | 1/2006 | Cassone |
| 6,991,174 B2 | 1/2006 | Zuili |
| 6,993,659 B2 | 1/2006 | Milgramm et al. |
| 7,007,174 B2 | 2/2006 | Wheeler et al. |
| 7,028,052 B2 | 4/2006 | Chapman et al. |
| 7,035,855 B1 | 4/2006 | Kilger et al. |
| 7,069,240 B2 | 6/2006 | Spero et al. |
| 7,083,090 B2 | 8/2006 | Zuili |
| 7,089,592 B2 | 8/2006 | Adjaoute et al. |
| 7,092,891 B2 | 8/2006 | Maus et al. |
| 7,104,444 B2 | 9/2006 | Suzuki |
| 7,158,622 B2 | 1/2007 | Lawyer et al. |
| 7,162,640 B2 | 1/2007 | Heath et al. |
| 7,174,335 B2 | 2/2007 | Kameda |
| 7,188,078 B2 | 3/2007 | Arnett et al. |
| 7,203,653 B1 | 4/2007 | McIntosh |
| 7,212,995 B2 | 5/2007 | Schulkins |
| 7,222,779 B1 | 5/2007 | Pineda-Sanchez et al. |
| 7,225,977 B2 | 6/2007 | Davis |
| 7,234,156 B2 | 6/2007 | French et al. |
| 7,240,059 B2 | 7/2007 | Bayliss et al. |
| 7,240,363 B1 | 7/2007 | Ellingson |
| 7,246,067 B2 | 7/2007 | Austin et al. |
| 7,246,740 B2 | 7/2007 | Swift et al. |
| 7,254,560 B2 | 8/2007 | Singhal |
| 7,263,506 B2 | 8/2007 | Lee et al. |
| 7,272,728 B2 | 9/2007 | Pierson et al. |
| 7,272,857 B1 | 9/2007 | Everhart |
| 7,277,869 B2 | 10/2007 | Starkman |
| 7,277,875 B2 | 10/2007 | Serrano-Morales et al. |
| 7,283,974 B2 | 10/2007 | Katz et al. |
| 7,289,607 B2 | 10/2007 | Bhargava et al. |
| 7,290,704 B1 | 11/2007 | Ball et al. |
| 7,298,873 B2 | 11/2007 | Miller, Jr. et al. |
| 7,310,743 B1 | 12/2007 | Gagne et al. |
| 7,314,162 B2 | 1/2008 | Carr et al. |
| 7,314,167 B1 | 1/2008 | Kiliccote |
| 7,330,871 B2 | 2/2008 | Barber |
| 7,333,635 B2 | 2/2008 | Tsantes et al. |
| 7,340,042 B2 | 3/2008 | Cluff et al. |
| 7,343,149 B2 | 3/2008 | Benco |
| 7,356,516 B2 | 4/2008 | Richey et al. |
| 7,370,044 B2 | 5/2008 | Mulhern et al. |
| 7,370,351 B1 | 5/2008 | Ramachandran et al. |
| 7,376,618 B1 | 5/2008 | Anderson et al. |

(56) References Cited

U.S. PATENT DOCUMENTS

| | | |
|---|---|---|
| 7,383,227 B2 | 6/2008 | Weinflash et al. |
| 7,386,448 B1 | 6/2008 | Poss et al. |
| 7,386,506 B2 | 6/2008 | Aoki et al. |
| 7,392,534 B2 | 6/2008 | Lu et al. |
| 7,395,273 B2 | 7/2008 | Khan et al. |
| 7,398,915 B1 | 7/2008 | Pineda-Sanchez et al. |
| 7,406,715 B2 | 7/2008 | Clapper |
| 7,412,228 B2 | 8/2008 | Barclay et al. |
| 7,418,431 B1 | 8/2008 | Nies et al. |
| 7,428,509 B2 | 9/2008 | Klebanoff |
| 7,433,855 B2 | 10/2008 | Gavan et al. |
| 7,433,864 B2 | 10/2008 | Malik |
| 7,438,226 B2 | 10/2008 | Helsper et al. |
| 7,444,518 B1 | 10/2008 | Dharmarajan et al. |
| 7,457,401 B2 | 11/2008 | Lawyer et al. |
| 7,458,508 B1 | 12/2008 | Shao et al. |
| 7,466,235 B1 | 12/2008 | Kolb et al. |
| 7,467,401 B2 | 12/2008 | Cicchitto |
| 7,480,631 B1 | 1/2009 | Merced et al. |
| 7,481,363 B2 | 1/2009 | Zuili |
| 7,490,052 B2 | 2/2009 | Kilger et al. |
| 7,490,356 B2 | 2/2009 | Lieblich et al. |
| 7,497,374 B2 | 3/2009 | Helsper et al. |
| 7,509,117 B2 | 3/2009 | Yum |
| 7,512,221 B2 | 3/2009 | Toms |
| 7,519,558 B2 | 4/2009 | Ballard et al. |
| 7,522,060 B1 | 4/2009 | Tumperi et al. |
| 7,533,808 B2 | 5/2009 | Song et al. |
| 7,536,346 B2 | 5/2009 | Aliffi et al. |
| 7,540,021 B2 | 5/2009 | Page |
| 7,542,993 B2 | 6/2009 | Satterfield et al. |
| 7,543,739 B2 | 6/2009 | Brown et al. |
| 7,543,740 B2 | 6/2009 | Greene et al. |
| 7,546,271 B1 | 6/2009 | Chmielewski et al. |
| 7,548,886 B2 | 6/2009 | Kirkland et al. |
| 7,552,467 B2 | 6/2009 | Lindsay |
| 7,562,184 B2 | 7/2009 | Henmi et al. |
| 7,562,814 B1 | 7/2009 | Shao et al. |
| 7,568,616 B2 | 8/2009 | Zuili |
| 7,575,157 B2 | 8/2009 | Barnhardt et al. |
| 7,581,112 B2 | 8/2009 | Brown et al. |
| 7,584,146 B1 | 9/2009 | Duhon |
| 7,587,368 B2 | 9/2009 | Felsher |
| 7,591,425 B1 | 9/2009 | Zuili et al. |
| 7,593,891 B2 | 9/2009 | Kornegay et al. |
| 7,606,401 B2 | 10/2009 | Hoffman et al. |
| 7,606,790 B2 | 10/2009 | Levy |
| 7,610,216 B1 | 10/2009 | May et al. |
| 7,610,229 B1 | 10/2009 | Kornegay |
| 7,610,243 B2 | 10/2009 | Haggerty et al. |
| 7,620,596 B2 | 11/2009 | Knudson et al. |
| 7,623,844 B2 | 11/2009 | Herrmann et al. |
| 7,630,924 B1 | 12/2009 | Collins et al. |
| 7,630,932 B2 | 12/2009 | Danaher et al. |
| 7,636,853 B2 | 12/2009 | Cluts et al. |
| 7,644,868 B2 | 1/2010 | Hare |
| 7,647,344 B2 | 1/2010 | Skurtovich, Jr. et al. |
| 7,647,645 B2 | 1/2010 | Edeki et al. |
| 7,653,593 B2 | 1/2010 | Zarikian et al. |
| 7,657,431 B2 | 2/2010 | Hayakawa |
| 7,668,769 B2 | 2/2010 | Baker et al. |
| 7,668,840 B2 | 2/2010 | Bayliss et al. |
| 7,668,921 B2 | 2/2010 | Proux et al. |
| 7,672,865 B2 | 3/2010 | Kumar et al. |
| 7,673,793 B2 | 3/2010 | Greene et al. |
| 7,676,418 B1 | 3/2010 | Chung et al. |
| 7,676,433 B1 | 3/2010 | Ross et al. |
| 7,685,096 B2 | 3/2010 | Margolus et al. |
| 7,686,214 B1 | 3/2010 | Shao et al. |
| 7,689,007 B2 | 3/2010 | Bous et al. |
| 7,689,505 B2 | 3/2010 | Kasower |
| 7,689,506 B2 | 3/2010 | Fei et al. |
| 7,690,032 B1 | 3/2010 | Peirce |
| 7,701,364 B1 | 4/2010 | Zilberman |
| 7,702,550 B2 | 4/2010 | Perg et al. |
| 7,707,163 B2 | 4/2010 | Anzalone et al. |
| 7,708,190 B2 | 5/2010 | Brandt et al. |
| 7,708,200 B2 | 5/2010 | Helsper et al. |
| 7,711,635 B2 | 5/2010 | Steele et al. |
| 7,711,636 B2 | 5/2010 | Robida et al. |
| 7,720,750 B2 | 5/2010 | Brody |
| 7,725,300 B2 | 5/2010 | Pinto et al. |
| 7,734,523 B1 | 6/2010 | Cui et al. |
| 7,735,125 B1 | 6/2010 | Alvarez et al. |
| 7,742,982 B2 | 6/2010 | Chaudhuri et al. |
| 7,747,520 B2 | 6/2010 | Livermore et al. |
| 7,747,521 B2 | 6/2010 | Serio |
| 7,747,559 B2 | 6/2010 | Leitner et al. |
| 7,752,084 B2 | 7/2010 | Pettitt |
| 7,752,236 B2 | 7/2010 | Williams et al. |
| 7,752,554 B2 | 7/2010 | Biggs et al. |
| 7,756,783 B2 | 7/2010 | Crooks |
| 7,761,379 B2 | 7/2010 | Zoldi et al. |
| 7,761,384 B2 | 7/2010 | Madhogarhia |
| 7,774,270 B1 | 8/2010 | MacCloskey |
| 7,778,885 B1 | 8/2010 | Semprevivo et al. |
| 7,779,456 B2 | 8/2010 | Dennis et al. |
| 7,779,457 B2 | 8/2010 | Taylor |
| 7,783,281 B1 | 8/2010 | Cook et al. |
| 7,783,515 B1 | 8/2010 | Kumar et al. |
| 7,788,184 B2 | 8/2010 | Kane |
| 7,792,715 B1 | 9/2010 | Kasower |
| 7,792,864 B1 | 9/2010 | Rice et al. |
| 7,793,835 B1 | 9/2010 | Coggeshall et al. |
| 7,801,811 B1 | 9/2010 | Merrell et al. |
| 7,801,828 B2 | 9/2010 | Candella et al. |
| 7,802,104 B2 | 9/2010 | Dickinson |
| 7,805,362 B1 | 9/2010 | Merrell et al. |
| 7,805,391 B2 | 9/2010 | Friedlander et al. |
| 7,809,797 B2 | 10/2010 | Cooley et al. |
| 7,813,944 B1 | 10/2010 | Luk et al. |
| 7,827,115 B2 | 11/2010 | Weller et al. |
| 7,832,006 B2 | 11/2010 | Chen et al. |
| 7,835,983 B2 | 11/2010 | Lefner et al. |
| 7,840,459 B1 | 11/2010 | Loftesness et al. |
| 7,841,004 B1 | 11/2010 | Balducci et al. |
| 7,844,520 B1 | 11/2010 | Franklin |
| 7,848,987 B2 | 12/2010 | Haig |
| 7,849,029 B2 | 12/2010 | Crooks et al. |
| 7,853,518 B2 | 12/2010 | Cagan |
| 7,853,526 B2 | 12/2010 | Milana |
| 7,853,533 B2 | 12/2010 | Eisen |
| 7,853,998 B2 | 12/2010 | Blaisdell et al. |
| 7,856,397 B2 | 12/2010 | Whipple et al. |
| 7,856,494 B2 | 12/2010 | Kulkarni |
| 7,860,769 B2 | 12/2010 | Benson |
| 7,860,783 B2 | 12/2010 | Yang et al. |
| 7,865,427 B2 | 1/2011 | Wright et al. |
| 7,865,439 B2 | 1/2011 | Seifert et al. |
| 7,865,937 B1 | 1/2011 | White et al. |
| 7,870,078 B2 | 1/2011 | Clark et al. |
| 7,870,599 B2 | 1/2011 | Pemmaraju |
| 7,873,382 B2 | 1/2011 | Rydgren et al. |
| 7,873,566 B1 | 1/2011 | Templeton et al. |
| 7,874,488 B2 | 1/2011 | Parkinson |
| 7,877,304 B1 | 1/2011 | Coulter |
| 7,877,784 B2 | 1/2011 | Chow et al. |
| 7,882,548 B2 | 2/2011 | Heath et al. |
| 7,890,433 B2 | 2/2011 | Singhal |
| 7,904,360 B2 | 3/2011 | Evans |
| 7,904,367 B2 | 3/2011 | Chung et al. |
| 7,908,242 B1 | 3/2011 | Achanta |
| 7,909,246 B2 | 3/2011 | Hogg et al. |
| 7,912,865 B2 | 3/2011 | Akerman et al. |
| 7,917,715 B2 | 3/2011 | Tallman, Jr. |
| 7,925,582 B1 | 4/2011 | Kornegay et al. |
| 7,929,951 B2 | 4/2011 | Stevens et al. |
| 7,933,835 B2 | 4/2011 | Keane et al. |
| 7,941,363 B2 | 5/2011 | Tanaka et al. |
| 7,945,515 B2 | 5/2011 | Zoldi et al. |
| 7,950,577 B1 | 5/2011 | Daniel |
| 7,958,046 B2 | 6/2011 | Doerner et al. |
| 7,961,857 B2 | 6/2011 | Zoldi et al. |
| 7,962,404 B1 | 6/2011 | Metzger, II et al. |

(56) References Cited

U.S. PATENT DOCUMENTS

| | | |
|---|---|---|
| 7,962,467 B2 | 6/2011 | Howard et al. |
| 7,970,679 B2 | 6/2011 | Kasower |
| 7,970,698 B2 | 6/2011 | Gupta et al. |
| 7,970,701 B2 | 6/2011 | Lewis et al. |
| 7,971,246 B1 | 6/2011 | Emigh et al. |
| 7,975,299 B1 | 7/2011 | Balducci et al. |
| 7,983,976 B2 | 7/2011 | Nafeh et al. |
| 7,983,979 B2 | 7/2011 | Holland, IV |
| 7,984,849 B2 | 7/2011 | Berghel et al. |
| 7,988,043 B2 | 8/2011 | Davis |
| 7,991,201 B2 | 8/2011 | Bous et al. |
| 7,991,689 B1 | 8/2011 | Brunzell et al. |
| 7,991,716 B2 | 8/2011 | Crooks et al. |
| 7,991,751 B2 | 8/2011 | Peled et al. |
| 7,995,994 B2 | 8/2011 | Khetawat et al. |
| 7,996,521 B2 | 8/2011 | Chamberlain et al. |
| 8,001,034 B2 | 8/2011 | Chung et al. |
| 8,001,042 B1 | 8/2011 | Brunzell et al. |
| 8,001,153 B2 | 8/2011 | Skurtovich, Jr. et al. |
| 8,001,597 B2 | 8/2011 | Crooks |
| 8,005,749 B2 | 8/2011 | Ginsberg |
| 8,006,291 B2 | 8/2011 | Headley et al. |
| 8,009,873 B2 | 8/2011 | Chapman |
| 8,019,678 B2 | 9/2011 | Wright et al. |
| 8,020,763 B1 | 9/2011 | Kowalchyk et al. |
| 8,024,263 B2 | 9/2011 | Zarikian et al. |
| 8,024,271 B2 | 9/2011 | Grant |
| 8,027,439 B2 | 9/2011 | Zoldi et al. |
| 8,027,518 B2 | 9/2011 | Baker et al. |
| 8,027,947 B2 | 9/2011 | Hinsz et al. |
| 8,028,168 B2 | 9/2011 | Smithies et al. |
| 8,028,326 B2 | 9/2011 | Palmer et al. |
| 8,028,329 B2 | 9/2011 | Whitcomb |
| 8,028,896 B2 | 10/2011 | Carter et al. |
| 8,032,448 B2 | 10/2011 | Anderson et al. |
| 8,032,449 B2 | 10/2011 | Hu et al. |
| 8,032,927 B2 | 10/2011 | Ross |
| 8,037,097 B2 | 10/2011 | Guo et al. |
| 8,037,512 B2 | 10/2011 | Wright et al. |
| 8,041,597 B2 | 10/2011 | Li et al. |
| 8,042,159 B2 | 10/2011 | Basner et al. |
| 8,042,193 B1 | 10/2011 | Piliouras |
| 8,049,596 B2 | 11/2011 | Sato |
| 8,055,667 B2 | 11/2011 | Levy |
| 8,056,128 B1 | 11/2011 | Dingle et al. |
| 8,058,972 B2 | 11/2011 | Mohanty |
| 8,060,424 B2 | 11/2011 | Kasower |
| 8,060,915 B2 | 11/2011 | Voice et al. |
| 8,060,916 B2 | 11/2011 | Bajaj et al. |
| 8,065,233 B2 | 11/2011 | Lee et al. |
| 8,065,525 B2 | 11/2011 | Zilberman |
| 8,069,053 B2 | 11/2011 | Gervais et al. |
| 8,069,084 B2 | 11/2011 | Mackouse |
| 8,069,256 B2 | 11/2011 | Rasti |
| 8,069,485 B2 | 11/2011 | Carter |
| 8,073,785 B1 | 12/2011 | Candella et al. |
| 8,078,569 B2 | 12/2011 | Kennel |
| 8,090,648 B2 | 1/2012 | Zoldi et al. |
| 8,104,679 B2 | 1/2012 | Brown |
| 8,116,731 B2 | 2/2012 | Buhrmann et al. |
| 8,121,962 B2 | 2/2012 | Vaiciulis et al. |
| 8,131,615 B2 | 3/2012 | Diev et al. |
| 8,151,327 B2 | 4/2012 | Eisen |
| 8,195,549 B2 | 6/2012 | Kasower |
| 8,201,257 B1 | 6/2012 | Andres et al. |
| 8,204,774 B2 | 6/2012 | Chwast et al. |
| 8,204,982 B2 | 6/2012 | Casado et al. |
| 8,214,262 B1 | 7/2012 | Semprevivo et al. |
| 8,214,285 B2 | 7/2012 | Hu et al. |
| 8,224,723 B2 | 7/2012 | Bosch et al. |
| 8,225,395 B2 | 7/2012 | Atwood et al. |
| 8,239,677 B2 | 8/2012 | Colson |
| 8,244,629 B2 | 8/2012 | Lewis et al. |
| 8,255,978 B2 | 8/2012 | Dick |
| 8,260,914 B1 | 9/2012 | Ranjan |
| 8,280,805 B1 | 10/2012 | Abrahams et al. |
| 8,280,833 B2 | 10/2012 | Miltonberger |
| 8,285,613 B1 | 10/2012 | Coulter |
| 8,285,636 B2 | 10/2012 | Curry et al. |
| 8,296,225 B2 | 10/2012 | Maddipati et al. |
| 8,296,229 B1 | 10/2012 | Yellin et al. |
| 8,296,250 B2 | 10/2012 | Crooks et al. |
| 8,332,338 B2 | 12/2012 | Vaiciulis et al. |
| 8,346,593 B2 | 1/2013 | Fanelli |
| 8,355,896 B2 | 1/2013 | Kumar et al. |
| 8,359,278 B2 | 1/2013 | Domenikos et al. |
| 8,364,588 B2 | 1/2013 | Celka et al. |
| 8,374,973 B2 | 2/2013 | Herbrich et al. |
| 8,386,377 B1 | 2/2013 | Xiong et al. |
| 8,429,070 B2 | 4/2013 | Hu et al. |
| 8,463,904 B2 | 6/2013 | Casado et al. |
| 8,468,090 B2 | 6/2013 | Lesandro et al. |
| 8,473,415 B2 | 6/2013 | Siegel |
| 8,489,479 B2 | 7/2013 | Slater et al. |
| 8,510,329 B2 | 8/2013 | Balkir et al. |
| 8,515,844 B2 | 8/2013 | Kasower |
| 8,516,439 B2 | 8/2013 | Brass et al. |
| 8,543,499 B2 | 9/2013 | Haggerty et al. |
| 8,548,137 B2 | 10/2013 | Zoldi et al. |
| 8,548,903 B2 | 10/2013 | Becker |
| 8,549,590 B1 | 10/2013 | de Villiers Prichard et al. |
| 8,559,607 B2 | 10/2013 | Zoldi et al. |
| 8,567,669 B2 | 10/2013 | Griegel et al. |
| 8,578,496 B1 | 11/2013 | Krishnappa |
| 8,607,353 B2 | 12/2013 | Rippert, Jr. |
| 8,626,671 B2 | 1/2014 | Federgreen |
| 8,630,938 B2 | 1/2014 | Cheng et al. |
| 8,639,920 B2 | 1/2014 | Stack et al. |
| 8,645,301 B2 | 2/2014 | Vaiciulis et al. |
| 8,671,115 B2 | 3/2014 | Skurtovich, Jr. et al. |
| 8,676,684 B2 | 3/2014 | Newman et al. |
| 8,676,699 B2 | 3/2014 | Phillips |
| 8,676,726 B2 | 3/2014 | Hore et al. |
| 8,682,755 B2 | 3/2014 | Bucholz et al. |
| 8,683,586 B2 | 3/2014 | Crooks |
| 8,694,427 B2 | 4/2014 | Maddipati et al. |
| 8,707,445 B2 | 4/2014 | Sher-Jan et al. |
| 8,725,613 B1 | 5/2014 | Celka et al. |
| 8,763,133 B2 | 6/2014 | Sher-Jan et al. |
| 8,776,225 B2 | 7/2014 | Pierson et al. |
| 8,781,953 B2 | 7/2014 | Kasower |
| 8,781,975 B2 | 7/2014 | Bennett et al. |
| 8,793,777 B2 | 7/2014 | Colson |
| 8,805,836 B2 | 8/2014 | Hore et al. |
| 8,812,387 B1 | 8/2014 | Samler et al. |
| 8,819,793 B2 | 8/2014 | Gottschalk, Jr. |
| 8,824,648 B2 | 9/2014 | Zoldi et al. |
| 8,826,393 B2 | 9/2014 | Eisen |
| 8,850,539 B2 | 9/2014 | Bailey, Jr. |
| 8,862,514 B2 | 10/2014 | Eisen |
| 8,862,526 B2 | 10/2014 | Miltonberger |
| 8,909,664 B2 | 12/2014 | Hopkins |
| 8,918,891 B2 | 12/2014 | Coggeshall et al. |
| 8,949,981 B1 | 2/2015 | Trollope et al. |
| 9,118,646 B2 | 8/2015 | Pierson et al. |
| 9,147,117 B1 | 9/2015 | Madhu et al. |
| 9,191,403 B2 | 11/2015 | Zoldi et al. |
| 9,194,899 B2 | 11/2015 | Zoldi et al. |
| 9,196,004 B2 | 11/2015 | Eisen |
| 9,210,156 B1 | 12/2015 | Little et al. |
| 9,235,728 B2 | 1/2016 | Gottschalk, Jr. et al. |
| 9,251,541 B2 | 2/2016 | Celka et al. |
| 9,256,624 B2 | 2/2016 | Skurtovich, Jr. et al. |
| 9,280,658 B2 | 3/2016 | Coggeshall et al. |
| 9,361,597 B2 | 6/2016 | Britton et al. |
| 9,367,520 B2 | 6/2016 | Zhao et al. |
| 9,390,384 B2 | 7/2016 | Eisen |
| 9,412,141 B2 | 8/2016 | Prichard et al. |
| 9,483,650 B2 | 11/2016 | Sher-Jan et al. |
| 9,489,497 B2 | 11/2016 | MaGill et al. |
| 9,531,738 B2 | 12/2016 | Zoldi et al. |
| 9,558,368 B2 | 1/2017 | Gottschalk, Jr. et al. |
| 9,595,066 B2 | 3/2017 | Samler et al. |
| 9,600,845 B2 | 3/2017 | Nordyke et al. |

(56) References Cited

U.S. PATENT DOCUMENTS

| | | |
|---|---|---|
| 9,652,802 B1 | 5/2017 | Kasower |
| 9,704,195 B2 | 7/2017 | Zoldi |
| 9,710,523 B2 | 7/2017 | Skurtovich, Jr. et al. |
| 9,710,868 B2 | 7/2017 | Gottschalk, Jr. et al. |
| 9,754,256 B2 | 9/2017 | Britton et al. |
| 9,754,311 B2 | 9/2017 | Eisen |
| 9,760,885 B1 | 9/2017 | Ramalingam et al. |
| 9,773,227 B2 | 9/2017 | Zoldi et al. |
| 9,781,147 B2 | 10/2017 | Sher-Jan et al. |
| 9,805,216 B2 | 10/2017 | Kraska et al. |
| 9,953,321 B2 | 4/2018 | Zoldi et al. |
| 10,043,213 B2 | 8/2018 | Straub et al. |
| 10,089,411 B2 | 10/2018 | Kassa |
| 10,089,679 B2 | 10/2018 | Eisen |
| 10,089,686 B2 | 10/2018 | Straub et al. |
| 10,102,530 B2 | 10/2018 | Zoldi et al. |
| 10,115,153 B2 | 10/2018 | Zoldi et al. |
| 10,152,736 B2 | 12/2018 | Yang et al. |
| 10,217,163 B2 | 2/2019 | Straub et al. |
| 10,242,540 B2 | 3/2019 | Chen et al. |
| 10,339,527 B1 | 7/2019 | Coleman et al. |
| 10,373,061 B2 | 8/2019 | Kennel et al. |
| 10,404,472 B2 | 9/2019 | Knopf |
| 10,430,604 B2 | 10/2019 | Spinelli et al. |
| 10,438,308 B2 | 10/2019 | Prichard et al. |
| 10,482,542 B1 | 11/2019 | Jain |
| 10,497,034 B2 | 12/2019 | Yang et al. |
| 10,510,025 B2 | 12/2019 | Zoldi et al. |
| 10,521,857 B1 | 12/2019 | Shao et al. |
| 10,528,948 B2 | 1/2020 | Zoldi et al. |
| 10,579,938 B2 | 3/2020 | Zoldi et al. |
| 10,592,982 B2 | 3/2020 | Samler et al. |
| 10,593,004 B2 | 3/2020 | Gottschalk, Jr. et al. |
| 10,616,196 B1 | 4/2020 | Khitrenovich et al. |
| 10,692,058 B2 | 6/2020 | Zoldi et al. |
| 10,699,028 B1 | 6/2020 | Kennedy et al. |
| 10,713,711 B2 | 7/2020 | Zoldi |
| 10,769,290 B2 | 9/2020 | Crawford et al. |
| 10,791,136 B2 | 9/2020 | Zoldi et al. |
| 10,896,381 B2 | 1/2021 | Zoldi et al. |
| 10,896,472 B1 | 1/2021 | Stack et al. |
| 10,902,426 B2 | 1/2021 | Zoldi et al. |
| 10,909,617 B2 | 2/2021 | Kasower |
| 10,958,725 B2 | 3/2021 | Knopf |
| 10,977,363 B2 | 4/2021 | Leitner et al. |
| 10,990,979 B1 | 4/2021 | Coleman et al. |
| 10,999,298 B2 | 5/2021 | Eisen |
| 11,023,963 B2 | 6/2021 | Zoldi et al. |
| 11,025,428 B2 | 6/2021 | Knopf |
| 11,030,562 B1 | 6/2021 | Dean et al. |
| 11,037,229 B2 | 6/2021 | Zoldi et al. |
| 11,080,740 B2 | 8/2021 | Billman et al. |
| 11,087,334 B1 | 8/2021 | McEachern et al. |
| 11,093,845 B2 | 8/2021 | Zoldi et al. |
| 11,093,988 B2 | 8/2021 | Zoldi et al. |
| 11,100,506 B2 | 8/2021 | Zoldi et al. |
| 11,108,562 B2 | 8/2021 | Knopf et al. |
| 11,151,468 B1 | 10/2021 | Chen et al. |
| 11,157,650 B1 | 10/2021 | Kennedy et al. |
| 11,256,825 B2 | 2/2022 | Spinelli et al. |
| 11,354,670 B2 | 6/2022 | Phelan et al. |
| 11,367,074 B2 | 6/2022 | Zoldi et al. |
| 11,373,190 B2 | 6/2022 | Zoldi et al. |
| 11,380,171 B2 | 7/2022 | Chen et al. |
| 11,423,414 B2 | 8/2022 | Zoldi et al. |
| 11,431,736 B2 | 8/2022 | Brown et al. |
| 11,436,606 B1 | 9/2022 | Coleman et al. |
| 11,552,901 B2 | 1/2023 | Hoover et al. |
| 11,568,348 B1 | 1/2023 | Dean et al. |
| 11,580,259 B1 | 2/2023 | Kennedy et al. |
| 11,593,476 B2 | 2/2023 | Van Dyke |
| 11,625,730 B2 | 4/2023 | Liu et al. |
| 11,636,485 B2 | 4/2023 | Zoldi et al. |
| 11,658,994 B2 | 5/2023 | Johnston et al. |
| 11,665,004 B2 | 5/2023 | Knopf |
| 11,669,894 B2 | 6/2023 | Nordyke et al. |
| 11,762,975 B2 | 9/2023 | Allen |
| 11,777,972 B2 | 10/2023 | Jones |
| 11,804,306 B2 | 10/2023 | Hua et al. |
| 11,804,967 B2 | 10/2023 | Knopf et al. |
| 11,941,635 B1 | 3/2024 | Coleman et al. |
| 12,045,755 B2 | 7/2024 | Dean et al. |
| 12,099,940 B1 | 9/2024 | Chen et al. |
| 2001/0014868 A1 | 8/2001 | Herz et al. |
| 2001/0014878 A1 | 8/2001 | Mitra et al. |
| 2001/0027413 A1 | 10/2001 | Bhutta |
| 2001/0029470 A1 | 10/2001 | Schultz et al. |
| 2001/0034631 A1 | 10/2001 | Kiselik |
| 2001/0039523 A1 | 11/2001 | Iwamoto |
| 2002/0010684 A1 | 1/2002 | Moskowitz |
| 2002/0013899 A1 | 1/2002 | Faul |
| 2002/0019804 A1 | 2/2002 | Sutton |
| 2002/0019938 A1 | 2/2002 | Aarons |
| 2002/0032635 A1 | 3/2002 | Harris et al. |
| 2002/0040344 A1 | 4/2002 | Preiser et al. |
| 2002/0042879 A1 | 4/2002 | Gould et al. |
| 2002/0052841 A1 | 5/2002 | Guthrie et al. |
| 2002/0059521 A1 | 5/2002 | Tasler |
| 2002/0062185 A1 | 5/2002 | Runge et al. |
| 2002/0062281 A1 | 5/2002 | Singhal |
| 2002/0073044 A1 | 6/2002 | Singhal |
| 2002/0077178 A1 | 6/2002 | Oberberger et al. |
| 2002/0077964 A1 | 6/2002 | Brody et al. |
| 2002/0080256 A1 | 6/2002 | Bates et al. |
| 2002/0087460 A1 | 7/2002 | Hornung |
| 2002/0099649 A1 | 7/2002 | Lee et al. |
| 2002/0119824 A1 | 8/2002 | Allen |
| 2002/0130176 A1 | 9/2002 | Suzuki |
| 2002/0138417 A1 | 9/2002 | Lawrence |
| 2002/0138751 A1 | 9/2002 | Dutta |
| 2002/0147695 A1 | 10/2002 | Khedkar et al. |
| 2002/0156676 A1 | 10/2002 | Ahrens et al. |
| 2002/0161664 A1 | 10/2002 | Shaya et al. |
| 2002/0161711 A1 | 10/2002 | Sartor et al. |
| 2002/0173994 A1 | 11/2002 | Ferguson, III |
| 2002/0178112 A1 | 11/2002 | Goeller et al. |
| 2002/0184509 A1 | 12/2002 | Scheidt et al. |
| 2002/0188544 A1 | 12/2002 | Wizon et al. |
| 2003/0004879 A1 | 1/2003 | Demoff et al. |
| 2003/0009426 A1 | 1/2003 | Ruiz-Sanchez |
| 2003/0033261 A1 | 2/2003 | Knegendorf |
| 2003/0046554 A1 | 3/2003 | Leydier et al. |
| 2003/0048904 A1 | 3/2003 | Wang et al. |
| 2003/0050882 A1 | 3/2003 | Degen et al. |
| 2003/0057278 A1 | 3/2003 | Wong |
| 2003/0061163 A1 | 3/2003 | Durfield |
| 2003/0065563 A1 | 4/2003 | Elliott et al. |
| 2003/0070101 A1 | 4/2003 | Buscemi |
| 2003/0078877 A1 | 4/2003 | Beirne et al. |
| 2003/0093366 A1 | 5/2003 | Halper et al. |
| 2003/0097320 A1 | 5/2003 | Gordon |
| 2003/0105696 A1 | 6/2003 | Kalotay et al. |
| 2003/0115133 A1 | 6/2003 | Bian |
| 2003/0143980 A1 | 7/2003 | Choi et al. |
| 2003/0149744 A1 | 8/2003 | Bierre et al. |
| 2003/0153299 A1 | 8/2003 | Perfit et al. |
| 2003/0158751 A1 | 8/2003 | Suresh et al. |
| 2003/0158960 A1 | 8/2003 | Engberg |
| 2003/0182214 A1 | 9/2003 | Taylor |
| 2003/0195859 A1 | 10/2003 | Lawrence |
| 2003/0200447 A1 | 10/2003 | Sjoblom |
| 2003/0208428 A1 | 11/2003 | Raynes et al. |
| 2003/0222500 A1 | 12/2003 | Bayeur et al. |
| 2003/0225656 A1 | 12/2003 | Aberman et al. |
| 2003/0225692 A1 | 12/2003 | Bosch et al. |
| 2003/0225742 A1 | 12/2003 | Tenner et al. |
| 2003/0233278 A1 | 12/2003 | Marshall |
| 2004/0004117 A1 | 1/2004 | Suzuki |
| 2004/0005912 A1 | 1/2004 | Hubbe et al. |
| 2004/0010698 A1 | 1/2004 | Rolfe |
| 2004/0024709 A1 | 2/2004 | Yu et al. |
| 2004/0026496 A1 | 2/2004 | Zuili |
| 2004/0030649 A1 | 2/2004 | Nelson et al. |
| 2004/0039586 A1 | 2/2004 | Garvey et al. |

(56) References Cited

U.S. PATENT DOCUMENTS

| | | |
|---|---|---|
| 2004/0054619 A1 | 3/2004 | Watson et al. |
| 2004/0059653 A1 | 3/2004 | Verkuylen et al. |
| 2004/0064401 A1 | 4/2004 | Palaghita et al. |
| 2004/0078324 A1 | 4/2004 | Lonnberg et al. |
| 2004/0103147 A1 | 5/2004 | Flesher et al. |
| 2004/0107363 A1 | 6/2004 | Monteverde |
| 2004/0110119 A1 | 6/2004 | Riconda et al. |
| 2004/0111305 A1 | 6/2004 | Gavan et al. |
| 2004/0111335 A1 | 6/2004 | Black et al. |
| 2004/0117235 A1 | 6/2004 | Shacham |
| 2004/0128227 A1 | 7/2004 | Whipple et al. |
| 2004/0128232 A1 | 7/2004 | Descloux |
| 2004/0133440 A1 | 7/2004 | Carolan et al. |
| 2004/0143526 A1 | 7/2004 | Monasterio et al. |
| 2004/0149820 A1 | 8/2004 | Zuili |
| 2004/0149827 A1 | 8/2004 | Zuili |
| 2004/0153330 A1 | 8/2004 | Miller et al. |
| 2004/0153656 A1 | 8/2004 | Cluts et al. |
| 2004/0158520 A1 | 8/2004 | Noh |
| 2004/0158523 A1 | 8/2004 | Dort |
| 2004/0158723 A1 | 8/2004 | Root |
| 2004/0167793 A1 | 8/2004 | Masuoka et al. |
| 2004/0177046 A1 | 9/2004 | Ogram |
| 2004/0193538 A1 | 9/2004 | Raines |
| 2004/0199456 A1 | 10/2004 | Flint et al. |
| 2004/0199462 A1 | 10/2004 | Starrs |
| 2004/0204948 A1 | 10/2004 | Singletary et al. |
| 2004/0205008 A1 | 10/2004 | Haynie et al. |
| 2004/0225594 A1 | 11/2004 | Nolan, III et al. |
| 2004/0230448 A1 | 11/2004 | Schaich |
| 2004/0230527 A1 | 11/2004 | Hansen et al. |
| 2004/0230538 A1 | 11/2004 | Clifton et al. |
| 2004/0234117 A1 | 11/2004 | Tibor |
| 2004/0243514 A1 | 12/2004 | Wankmueller |
| 2004/0243518 A1 | 12/2004 | Clifton et al. |
| 2004/0243567 A1 | 12/2004 | Levy |
| 2004/0250085 A1 | 12/2004 | Tattan et al. |
| 2004/0255127 A1 | 12/2004 | Arnouse |
| 2004/0260922 A1 | 12/2004 | Goodman et al. |
| 2005/0001028 A1 | 1/2005 | Zuili |
| 2005/0010513 A1 | 1/2005 | Duckworth et al. |
| 2005/0010780 A1 | 1/2005 | Kane et al. |
| 2005/0021519 A1 | 1/2005 | Ghouri |
| 2005/0027983 A1 | 2/2005 | Klawon |
| 2005/0038726 A1 | 2/2005 | Salomon et al. |
| 2005/0038737 A1 | 2/2005 | Norris |
| 2005/0039086 A1 | 2/2005 | Krishnamurthy et al. |
| 2005/0050577 A1 | 3/2005 | Westbrook et al. |
| 2005/0058262 A1 | 3/2005 | Timmins et al. |
| 2005/0065950 A1 | 3/2005 | Chaganti et al. |
| 2005/0071282 A1 | 3/2005 | Lu et al. |
| 2005/0075985 A1 | 4/2005 | Cartmell |
| 2005/0081052 A1 | 4/2005 | Washington |
| 2005/0086161 A1 | 4/2005 | Gallant |
| 2005/0091164 A1 | 4/2005 | Varble |
| 2005/0097039 A1 | 5/2005 | Kulcsar et al. |
| 2005/0097051 A1 | 5/2005 | Madill, Jr. et al. |
| 2005/0097364 A1 | 5/2005 | Edeki et al. |
| 2005/0102206 A1 | 5/2005 | Savasoglu et al. |
| 2005/0105719 A1 | 5/2005 | Huda |
| 2005/0125226 A1 | 6/2005 | Magee |
| 2005/0125686 A1 | 6/2005 | Brandt |
| 2005/0138391 A1 | 6/2005 | Mandalia et al. |
| 2005/0144143 A1 | 6/2005 | Freiberg |
| 2005/0154664 A1 | 7/2005 | Guy et al. |
| 2005/0154665 A1 | 7/2005 | Kerr |
| 2005/0154671 A1 | 7/2005 | Doan et al. |
| 2005/0165667 A1 | 7/2005 | Cox |
| 2005/0197953 A1 | 9/2005 | Broadbent et al. |
| 2005/0203885 A1 | 9/2005 | Chenevich et al. |
| 2005/0216953 A1 | 9/2005 | Ellingson |
| 2005/0229007 A1 | 10/2005 | Bolle et al. |
| 2005/0240578 A1 | 10/2005 | Biederman et al. |
| 2005/0242173 A1 | 11/2005 | Suzuki |
| 2005/0251474 A1 | 11/2005 | Shinn et al. |
| 2005/0256809 A1 | 11/2005 | Sadri |
| 2005/0262014 A1 | 11/2005 | Fickes |
| 2005/0273333 A1 | 12/2005 | Morin et al. |
| 2005/0278542 A1 | 12/2005 | Pierson et al. |
| 2005/0278786 A1 | 12/2005 | Tippett |
| 2005/0279827 A1 | 12/2005 | Mascavage et al. |
| 2005/0279869 A1 | 12/2005 | Barklage |
| 2006/0004663 A1 | 1/2006 | Singhal |
| 2006/0014129 A1 | 1/2006 | Coleman et al. |
| 2006/0032909 A1 | 2/2006 | Seegar |
| 2006/0041464 A1 | 2/2006 | Powers et al. |
| 2006/0045105 A1 | 3/2006 | Dobosz et al. |
| 2006/0047605 A1 | 3/2006 | Ahmad |
| 2006/0059073 A1 | 3/2006 | Walzak |
| 2006/0059110 A1 | 3/2006 | Madhok et al. |
| 2006/0064374 A1 | 3/2006 | Helsper et al. |
| 2006/0074798 A1 | 4/2006 | Din et al. |
| 2006/0074986 A1 | 4/2006 | Mallalieu et al. |
| 2006/0080230 A1 | 4/2006 | Freiberg |
| 2006/0080263 A1 | 4/2006 | Willis et al. |
| 2006/0089905 A1 | 4/2006 | Song et al. |
| 2006/0101508 A1 | 5/2006 | Taylor |
| 2006/0106605 A1 | 5/2006 | Saunders et al. |
| 2006/0112279 A1 | 5/2006 | Cohen et al. |
| 2006/0112280 A1 | 5/2006 | Cohen et al. |
| 2006/0129428 A1 | 6/2006 | Wennberg |
| 2006/0129481 A1 | 6/2006 | Bhatt et al. |
| 2006/0129840 A1 | 6/2006 | Milgramm et al. |
| 2006/0131390 A1 | 6/2006 | Kim |
| 2006/0136332 A1 | 6/2006 | Ziegler |
| 2006/0140460 A1 | 6/2006 | Coutts |
| 2006/0143073 A1 | 6/2006 | Engel et al. |
| 2006/0144924 A1 | 7/2006 | Stover |
| 2006/0149580 A1 | 7/2006 | Helsper et al. |
| 2006/0149674 A1 | 7/2006 | Cook et al. |
| 2006/0161435 A1 | 7/2006 | Atef et al. |
| 2006/0161592 A1 | 7/2006 | Ertoz et al. |
| 2006/0173776 A1 | 8/2006 | Shalley et al. |
| 2006/0173792 A1 | 8/2006 | Glass |
| 2006/0177226 A1 | 8/2006 | Ellis, III |
| 2006/0178971 A1 | 8/2006 | Owen et al. |
| 2006/0179004 A1 | 8/2006 | Fuchs |
| 2006/0195351 A1 | 8/2006 | Bayburtian |
| 2006/0200855 A1 | 9/2006 | Willis |
| 2006/0202012 A1 | 9/2006 | Grano et al. |
| 2006/0204051 A1 | 9/2006 | Holland |
| 2006/0206725 A1 | 9/2006 | Milgramm et al. |
| 2006/0212386 A1 | 9/2006 | Willey et al. |
| 2006/0218069 A1 | 9/2006 | Aberman et al. |
| 2006/0229961 A1 | 10/2006 | Lyftogt et al. |
| 2006/0239512 A1 | 10/2006 | Petrillo |
| 2006/0239513 A1 | 10/2006 | Song et al. |
| 2006/0242046 A1 | 10/2006 | Haggerty et al. |
| 2006/0242047 A1 | 10/2006 | Haggerty et al. |
| 2006/0253358 A1 | 11/2006 | Delgrosso et al. |
| 2006/0253583 A1 | 11/2006 | Dixon et al. |
| 2006/0255914 A1 | 11/2006 | Westman |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0273158 A1 | 12/2006 | Suzuki |
| 2006/0277043 A1 | 12/2006 | Tomes et al. |
| 2006/0282285 A1 | 12/2006 | Helsper et al. |
| 2006/0282372 A1 | 12/2006 | Endres et al. |
| 2006/0282395 A1 | 12/2006 | Leibowitz |
| 2006/0287765 A1 | 12/2006 | Kraft |
| 2006/0288090 A1 | 12/2006 | Kraft |
| 2006/0294023 A1 | 12/2006 | Lu |
| 2007/0005508 A1 | 1/2007 | Chiang |
| 2007/0011100 A1 | 1/2007 | Libin et al. |
| 2007/0016500 A1 | 1/2007 | Chatterji et al. |
| 2007/0016521 A1 | 1/2007 | Wang |
| 2007/0016522 A1 | 1/2007 | Wang |
| 2007/0022141 A1 | 1/2007 | Singleton et al. |
| 2007/0038483 A1 | 2/2007 | Wood |
| 2007/0038568 A1 | 2/2007 | Greene et al. |
| 2007/0040017 A1 | 2/2007 | Kozlay |

(56) References Cited

U.S. PATENT DOCUMENTS

| | | |
|---|---|---|
| 2007/0040019 A1 | 2/2007 | Berghel et al. |
| 2007/0043577 A1 | 2/2007 | Kasower |
| 2007/0047770 A1 | 3/2007 | Swope et al. |
| 2007/0048765 A1 | 3/2007 | Abramson |
| 2007/0050638 A1 | 3/2007 | Rasti |
| 2007/0059442 A1 | 3/2007 | Sabeta |
| 2007/0061273 A1 | 3/2007 | Greene et al. |
| 2007/0067207 A1 | 3/2007 | Haggerty et al. |
| 2007/0067297 A1 | 3/2007 | Kublickis |
| 2007/0072190 A1 | 3/2007 | Aggarwal |
| 2007/0073622 A1 | 3/2007 | Kane |
| 2007/0073630 A1 | 3/2007 | Greene et al. |
| 2007/0078786 A1 | 4/2007 | Bous et al. |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0087795 A1 | 4/2007 | Aletto et al. |
| 2007/0093234 A1 | 4/2007 | Willis et al. |
| 2007/0094137 A1 | 4/2007 | Phillips et al. |
| 2007/0094264 A1 | 4/2007 | Nair |
| 2007/0100774 A1 | 5/2007 | Abdon |
| 2007/0106582 A1 | 5/2007 | Baker et al. |
| 2007/0106611 A1 | 5/2007 | Larsen |
| 2007/0107050 A1 | 5/2007 | Selvarajan |
| 2007/0109103 A1 | 5/2007 | Jedrey et al. |
| 2007/0110282 A1 | 5/2007 | Millsapp |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0155411 A1 | 7/2007 | Morrison |
| 2007/0157299 A1 | 7/2007 | Hare |
| 2007/0168246 A1 | 7/2007 | Haggerty et al. |
| 2007/0168480 A1 | 7/2007 | Biggs et al. |
| 2007/0174208 A1 | 7/2007 | Black et al. |
| 2007/0179903 A1 | 8/2007 | Seinfeld et al. |
| 2007/0180209 A1 | 8/2007 | Tallman |
| 2007/0180263 A1 | 8/2007 | Delgrosso et al. |
| 2007/0186276 A1 | 8/2007 | McRae et al. |
| 2007/0192248 A1 | 8/2007 | West |
| 2007/0192853 A1 | 8/2007 | Shraim et al. |
| 2007/0198410 A1 | 8/2007 | Labgold et al. |
| 2007/0205266 A1 | 9/2007 | Carr et al. |
| 2007/0208669 A1 | 9/2007 | Rivette et al. |
| 2007/0214037 A1 | 9/2007 | Shubert et al. |
| 2007/0214365 A1 | 9/2007 | Cornett et al. |
| 2007/0219928 A1 | 9/2007 | Madhogarhia |
| 2007/0220594 A1 | 9/2007 | Tulsyan |
| 2007/0226093 A1 | 9/2007 | Chan et al. |
| 2007/0226129 A1 | 9/2007 | Liao et al. |
| 2007/0233614 A1 | 10/2007 | McNelley et al. |
| 2007/0234427 A1 | 10/2007 | Gardner et al. |
| 2007/0244782 A1 | 10/2007 | Chimento |
| 2007/0244807 A1 | 10/2007 | Andringa et al. |
| 2007/0250704 A1 | 10/2007 | Hallam-Baker |
| 2007/0250920 A1 | 10/2007 | Lindsay |
| 2007/0266439 A1 | 11/2007 | Kraft |
| 2007/0282730 A1 | 12/2007 | Carpenter et al. |
| 2007/0288355 A1 | 12/2007 | Roland et al. |
| 2007/0288360 A1 | 12/2007 | Seeklus |
| 2007/0288559 A1 | 12/2007 | Parsadayan |
| 2007/0291995 A1 | 12/2007 | Rivera |
| 2007/0292006 A1 | 12/2007 | Johnson |
| 2007/0294104 A1 | 12/2007 | Boaz et al. |
| 2007/0299759 A1 | 12/2007 | Kelly |
| 2008/0010203 A1 | 1/2008 | Grant |
| 2008/0010683 A1 | 1/2008 | Baddour et al. |
| 2008/0010687 A1 | 1/2008 | Gonen et al. |
| 2008/0015887 A1 | 1/2008 | Drabek et al. |
| 2008/0021804 A1 | 1/2008 | Deckoff |
| 2008/0027857 A1 | 1/2008 | Benson |
| 2008/0027858 A1 | 1/2008 | Benson |
| 2008/0052182 A1 | 2/2008 | Marshall |
| 2008/0059236 A1 | 3/2008 | Cartier |
| 2008/0059352 A1 | 3/2008 | Chandran |
| 2008/0059364 A1 | 3/2008 | Tidwell et al. |
| 2008/0059366 A1 | 3/2008 | Fou |
| 2008/0063172 A1 | 3/2008 | Ahuja et al. |
| 2008/0066188 A1 | 3/2008 | Kwak |
| 2008/0071882 A1 | 3/2008 | Hering et al. |
| 2008/0076386 A1 | 3/2008 | Khetawat et al. |
| 2008/0077526 A1 | 3/2008 | Arumugam |
| 2008/0098222 A1 | 4/2008 | Zilberman |
| 2008/0103798 A1 | 5/2008 | Domenikos et al. |
| 2008/0103800 A1 | 5/2008 | Domenikos et al. |
| 2008/0103811 A1 | 5/2008 | Sosa |
| 2008/0103972 A1 | 5/2008 | Lanc |
| 2008/0104021 A1 | 5/2008 | Cai et al. |
| 2008/0104672 A1 | 5/2008 | Lunde et al. |
| 2008/0114837 A1 | 5/2008 | Biggs et al. |
| 2008/0120237 A1 | 5/2008 | Lin |
| 2008/0126116 A1 | 5/2008 | Singhai |
| 2008/0126233 A1 | 5/2008 | Hogan |
| 2008/0147454 A1 | 6/2008 | Walker et al. |
| 2008/0154758 A1 | 6/2008 | Schattmaier et al. |
| 2008/0162202 A1 | 7/2008 | Khanna et al. |
| 2008/0162259 A1 | 7/2008 | Patil et al. |
| 2008/0162383 A1 | 7/2008 | Kraft |
| 2008/0167883 A1 | 7/2008 | Thavildar Khazaneh |
| 2008/0175360 A1 | 7/2008 | Schwarz et al. |
| 2008/0177655 A1 | 7/2008 | Zalik |
| 2008/0177841 A1 | 7/2008 | Sinn et al. |
| 2008/0189789 A1 | 8/2008 | Lamontagne |
| 2008/0208548 A1 | 8/2008 | Metzger et al. |
| 2008/0208610 A1 | 8/2008 | Thomas et al. |
| 2008/0208726 A1 | 8/2008 | Tsantes et al. |
| 2008/0217400 A1 | 9/2008 | Portano |
| 2008/0228635 A1 | 9/2008 | Megdal et al. |
| 2008/0243680 A1 | 10/2008 | Megdal et al. |
| 2008/0244717 A1 | 10/2008 | Jelatis et al. |
| 2008/0255922 A1 | 10/2008 | Feldman et al. |
| 2008/0255992 A1 | 10/2008 | Lin |
| 2008/0256613 A1 | 10/2008 | Grover |
| 2008/0281737 A1 | 11/2008 | Fajardo |
| 2008/0281743 A1 | 11/2008 | Pettit |
| 2008/0288382 A1 | 11/2008 | Smith et al. |
| 2008/0288430 A1 | 11/2008 | Friedlander et al. |
| 2008/0288790 A1 | 11/2008 | Wilson |
| 2008/0294540 A1 | 11/2008 | Celka et al. |
| 2008/0294689 A1 | 11/2008 | Metzger et al. |
| 2008/0296367 A1 | 12/2008 | Parkinson |
| 2008/0296382 A1 | 12/2008 | Connell, II et al. |
| 2008/0300877 A1 | 12/2008 | Gilbert et al. |
| 2008/0319889 A1 | 12/2008 | Hammad |
| 2009/0007220 A1 | 1/2009 | Ormazabal et al. |
| 2009/0018934 A1 | 1/2009 | Peng et al. |
| 2009/0021349 A1 | 1/2009 | Errico et al. |
| 2009/0024417 A1 | 1/2009 | Marks et al. |
| 2009/0024505 A1 | 1/2009 | Patel et al. |
| 2009/0024636 A1 | 1/2009 | Shiloh |
| 2009/0024663 A1 | 1/2009 | McGovern |
| 2009/0026270 A1 | 1/2009 | Connell, II et al. |
| 2009/0043637 A1 | 2/2009 | Eder |
| 2009/0044279 A1 | 2/2009 | Crawford et al. |
| 2009/0048957 A1 | 2/2009 | Celano |
| 2009/0079539 A1 | 3/2009 | Johnson |
| 2009/0094311 A1 | 4/2009 | Awadallah et al. |
| 2009/0099960 A1 | 4/2009 | Robida et al. |
| 2009/0106153 A1 | 4/2009 | Ezra |
| 2009/0106846 A1 | 4/2009 | Dupray et al. |
| 2009/0112650 A1 | 4/2009 | Iwane |
| 2009/0119106 A1 | 5/2009 | Rajakumar et al. |
| 2009/0119299 A1 | 5/2009 | Rhodes |
| 2009/0125369 A1 | 5/2009 | Kloostra et al. |
| 2009/0125439 A1 | 5/2009 | Zarikian et al. |
| 2009/0125463 A1 | 5/2009 | Hido |
| 2009/0138391 A1 | 5/2009 | Dudley et al. |
| 2009/0141318 A1 | 6/2009 | Hughes |
| 2009/0151005 A1 | 6/2009 | Bell et al. |
| 2009/0158404 A1 | 6/2009 | Hahn et al. |
| 2009/0164380 A1 | 6/2009 | Brown |
| 2009/0172815 A1 | 7/2009 | Gu et al. |
| 2009/0182653 A1 | 7/2009 | Zimiles |
| 2009/0199264 A1 | 8/2009 | Lang |
| 2009/0205032 A1 | 8/2009 | Hinton et al. |

(56) References Cited

U.S. PATENT DOCUMENTS

| | | |
|---|---|---|
| 2009/0206993 A1 | 8/2009 | Di Mambro et al. |
| 2009/0216560 A1 | 8/2009 | Siegel |
| 2009/0216747 A1 | 8/2009 | Li et al. |
| 2009/0222308 A1 | 9/2009 | Zoldi et al. |
| 2009/0222362 A1 | 9/2009 | Stood et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0222897 A1 | 9/2009 | Carow et al. |
| 2009/0224875 A1 | 9/2009 | Rabinowitz et al. |
| 2009/0224889 A1 | 9/2009 | Aggarwal et al. |
| 2009/0226056 A1 | 9/2009 | Vlachos et al. |
| 2009/0234738 A1 | 9/2009 | Britton et al. |
| 2009/0240609 A1 | 9/2009 | Cho et al. |
| 2009/0241168 A1 | 9/2009 | Readshaw |
| 2009/0241173 A1 | 9/2009 | Troyansky |
| 2009/0248198 A1 | 10/2009 | Siegel et al. |
| 2009/0248497 A1 | 10/2009 | Hueter |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0254476 A1 | 10/2009 | Sharma et al. |
| 2009/0254484 A1 | 10/2009 | Forero et al. |
| 2009/0257595 A1 | 10/2009 | de Cesare et al. |
| 2009/0259470 A1 | 10/2009 | Chang |
| 2009/0259560 A1 | 10/2009 | Bachenheimer |
| 2009/0259588 A1 | 10/2009 | Lindsay |
| 2009/0259855 A1 | 10/2009 | de Cesare et al. |
| 2009/0261189 A1 | 10/2009 | Ellis, Jr. |
| 2009/0270126 A1 | 10/2009 | Liu |
| 2009/0271265 A1 | 10/2009 | Lay et al. |
| 2009/0271617 A1 | 10/2009 | Song et al. |
| 2009/0272801 A1 | 11/2009 | Connell, II et al. |
| 2009/0276244 A1 | 11/2009 | Baldwin, Jr. et al. |
| 2009/0281945 A1 | 11/2009 | Shakkarwar |
| 2009/0281951 A1 | 11/2009 | Shakkarwar |
| 2009/0289110 A1 | 11/2009 | Regen et al. |
| 2009/0292568 A1* | 11/2009 | Khosravani ............ G06Q 40/02 705/7.28 |
| 2009/0300066 A1 | 12/2009 | Guo et al. |
| 2009/0307778 A1 | 12/2009 | Mardikar |
| 2009/0326972 A1 | 12/2009 | Washington |
| 2009/0328173 A1 | 12/2009 | Jakobson et al. |
| 2010/0024037 A1 | 1/2010 | Grzymala-Busse et al. |
| 2010/0030677 A1 | 2/2010 | Melik-Aslanian et al. |
| 2010/0031030 A1 | 2/2010 | Kao et al. |
| 2010/0037147 A1 | 2/2010 | Champion et al. |
| 2010/0037308 A1 | 2/2010 | Lin et al. |
| 2010/0042526 A1 | 2/2010 | Martinov |
| 2010/0043055 A1 | 2/2010 | Baumgart |
| 2010/0070620 A1 | 3/2010 | Awadallah et al. |
| 2010/0077006 A1 | 3/2010 | El Emam et al. |
| 2010/0085146 A1 | 4/2010 | Johnson |
| 2010/0088233 A1 | 4/2010 | Tattan et al. |
| 2010/0088338 A1 | 4/2010 | Pavoni, Jr. et al. |
| 2010/0094664 A1 | 4/2010 | Bush et al. |
| 2010/0094767 A1 | 4/2010 | Miltonberger |
| 2010/0094768 A1 | 4/2010 | Miltonberger |
| 2010/0094910 A1 | 4/2010 | Bayliss |
| 2010/0095357 A1 | 4/2010 | Willis et al. |
| 2010/0100406 A1 | 4/2010 | Lim |
| 2010/0100945 A1 | 4/2010 | Ozzie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0131273 A1 | 5/2010 | Aley-Raz et al. |
| 2010/0132043 A1 | 5/2010 | Bjorn et al. |
| 2010/0145836 A1 | 6/2010 | Baker et al. |
| 2010/0158207 A1 | 6/2010 | Dhawan et al. |
| 2010/0169210 A1 | 7/2010 | Bous et al. |
| 2010/0169947 A1 | 7/2010 | Sarmah et al. |
| 2010/0188684 A1 | 7/2010 | Kumara |
| 2010/0205662 A1 | 8/2010 | Ibrahim et al. |
| 2010/0217837 A1 | 8/2010 | Ansari et al. |
| 2010/0218255 A1 | 8/2010 | Ritman et al. |
| 2010/0228649 A1 | 9/2010 | Pettitt |
| 2010/0228657 A1 | 9/2010 | Kagarlis |
| 2010/0229225 A1 | 9/2010 | Sarmah et al. |
| 2010/0229230 A1 | 9/2010 | Edeki et al. |
| 2010/0229245 A1 | 9/2010 | Singhal |
| 2010/0241501 A1 | 9/2010 | Marshall |
| 2010/0250364 A1 | 9/2010 | Song et al. |
| 2010/0250411 A1 | 9/2010 | Ogrodski |
| 2010/0250509 A1 | 9/2010 | Andersen |
| 2010/0250955 A1 | 9/2010 | Trevithick et al. |
| 2010/0268557 A1 | 10/2010 | Faith et al. |
| 2010/0274679 A1 | 10/2010 | Hammad |
| 2010/0275265 A1 | 10/2010 | Fiske et al. |
| 2010/0280882 A1 | 11/2010 | Faith et al. |
| 2010/0281248 A1 | 11/2010 | Lockhart et al. |
| 2010/0293090 A1 | 11/2010 | Domenikos et al. |
| 2010/0293114 A1 | 11/2010 | Khan et al. |
| 2010/0302157 A1 | 12/2010 | Zilberman |
| 2010/0306101 A1 | 12/2010 | Lefner et al. |
| 2010/0313273 A1 | 12/2010 | Freas |
| 2010/0325035 A1 | 12/2010 | Hilgers et al. |
| 2010/0325442 A1 | 12/2010 | Petrone et al. |
| 2010/0332292 A1 | 12/2010 | Anderson |
| 2010/0332362 A1 | 12/2010 | Ramsey et al. |
| 2011/0004498 A1 | 1/2011 | Readshaw |
| 2011/0016042 A1 | 1/2011 | Cho et al. |
| 2011/0040983 A1 | 2/2011 | Grzymala-Busse et al. |
| 2011/0047071 A1 | 2/2011 | Choudhuri et al. |
| 2011/0066547 A1 | 3/2011 | Clark et al. |
| 2011/0093383 A1 | 4/2011 | Haggerty et al. |
| 2011/0112958 A1 | 5/2011 | Haggerty et al. |
| 2011/0119291 A1 | 5/2011 | Rice |
| 2011/0126024 A1 | 5/2011 | Beatson et al. |
| 2011/0126275 A1 | 5/2011 | Anderson et al. |
| 2011/0131123 A1 | 6/2011 | Griffin et al. |
| 2011/0145899 A1 | 6/2011 | Cao et al. |
| 2011/0166988 A1 | 7/2011 | Coulter |
| 2011/0184838 A1 | 7/2011 | Winters et al. |
| 2011/0184851 A1 | 7/2011 | Megdal et al. |
| 2011/0196791 A1 | 8/2011 | Dominguez |
| 2011/0238566 A1 | 9/2011 | Santos |
| 2011/0260832 A1 | 10/2011 | Ross et al. |
| 2011/0276496 A1 | 11/2011 | Neville et al. |
| 2011/0282778 A1 | 11/2011 | Wright et al. |
| 2011/0289032 A1 | 11/2011 | Crooks et al. |
| 2011/0289322 A1 | 11/2011 | Rasti |
| 2011/0295721 A1 | 12/2011 | MacDonald |
| 2011/0295750 A1 | 12/2011 | Rammal |
| 2011/0296529 A1 | 12/2011 | Bhanoo et al. |
| 2011/0302412 A1 | 12/2011 | Deng et al. |
| 2011/0302641 A1 | 12/2011 | Hald et al. |
| 2012/0030080 A1 | 2/2012 | Slater et al. |
| 2012/0030771 A1 | 2/2012 | Pierson et al. |
| 2012/0036352 A1 | 2/2012 | Tovar et al. |
| 2012/0066073 A1 | 3/2012 | Dilip et al. |
| 2012/0101939 A1 | 4/2012 | Kasower |
| 2012/0158574 A1 | 6/2012 | Brunzell et al. |
| 2012/0158654 A1 | 6/2012 | Behren et al. |
| 2012/0198556 A1 | 8/2012 | Patel et al. |
| 2012/0215682 A1 | 8/2012 | Lent et al. |
| 2012/0278227 A1 | 11/2012 | Kolo et al. |
| 2012/0278249 A1 | 11/2012 | Duggal et al. |
| 2012/0290660 A1 | 11/2012 | Rao et al. |
| 2013/0004033 A1 | 1/2013 | Trugenberger et al. |
| 2013/0132060 A1 | 5/2013 | Badhe et al. |
| 2013/0185293 A1 | 7/2013 | Boback |
| 2013/0218797 A1 | 8/2013 | Prichard et al. |
| 2014/0007238 A1 | 1/2014 | Magee et al. |

(56) References Cited

U.S. PATENT DOCUMENTS

| | | |
|---|---|---|
| 2014/0058910 A1 | 2/2014 | Abeles |
| 2014/0143134 A1* | 5/2014 | Yan .................. G06Q 40/02 705/38 |
| 2014/0149304 A1 | 5/2014 | Bucholz et al. |
| 2014/0214636 A1 | 7/2014 | Rajsky |
| 2014/0283097 A1 | 9/2014 | Allen et al. |
| 2014/0304822 A1 | 10/2014 | Sher-Jan et al. |
| 2015/0106260 A1 | 4/2015 | Andrews et al. |
| 2015/0142595 A1 | 5/2015 | Acuña-Rohter |
| 2015/0161529 A1 | 6/2015 | Kondaji et al. |
| 2015/0186901 A1 | 7/2015 | Miltonberger |
| 2015/0199784 A1 | 7/2015 | Straub et al. |
| 2015/0205692 A1 | 7/2015 | Seto |
| 2015/0295924 A1 | 10/2015 | Gottschalk, Jr. |
| 2015/0348036 A1 | 12/2015 | Nordyke et al. |
| 2015/0348208 A1 | 12/2015 | Nordyke et al. |
| 2016/0012561 A1 | 1/2016 | Lappenbusch et al. |
| 2016/0063278 A1 | 3/2016 | Kraska et al. |
| 2016/0063645 A1 | 3/2016 | Houseworth et al. |
| 2016/0071208 A1 | 3/2016 | Straub et al. |
| 2016/0086262 A1 | 3/2016 | Straub et al. |
| 2016/0125412 A1 | 5/2016 | Cannon |
| 2016/0142532 A1 | 5/2016 | Bostick |
| 2016/0210450 A1 | 7/2016 | Su |
| 2016/0328814 A1 | 11/2016 | Prichard et al. |
| 2016/0344758 A1 | 11/2016 | Cohen et al. |
| 2016/0379011 A1 | 12/2016 | Koike et al. |
| 2017/0099314 A1 | 4/2017 | Klatt et al. |
| 2017/0161520 A1 | 6/2017 | Lockhart, III |
| 2017/0161746 A1* | 6/2017 | Cook .................. H04L 9/14 |
| 2017/0177683 A1 | 6/2017 | Koike et al. |
| 2017/0206376 A1 | 7/2017 | Sher-Jan |
| 2017/0270629 A1 | 9/2017 | Fitzgerald |
| 2017/0278182 A1 | 9/2017 | Kasower |
| 2017/0331839 A1 | 11/2017 | Park et al. |
| 2017/0357971 A1 | 12/2017 | Pitz et al. |
| 2017/0374076 A1 | 12/2017 | Pierson et al. |
| 2018/0004978 A1 | 1/2018 | Hebert et al. |
| 2018/0013786 A1 | 1/2018 | Knopf |
| 2018/0027001 A1 | 1/2018 | Park et al. |
| 2018/0033009 A1 | 2/2018 | Goldman et al. |
| 2018/0131708 A1 | 5/2018 | Pirttilahti et al. |
| 2018/0184288 A1 | 6/2018 | De Lorenzo et al. |
| 2018/0218369 A1 | 8/2018 | Xiao et al. |
| 2018/0322572 A1 | 11/2018 | Straub et al. |
| 2019/0073676 A1 | 3/2019 | Wang |
| 2019/0164173 A1 | 5/2019 | Liu et al. |
| 2019/0228178 A1 | 7/2019 | Sharma et al. |
| 2019/0266609 A1 | 8/2019 | Phelan et al. |
| 2019/0294786 A1 | 9/2019 | Villavicencio et al. |
| 2019/0311366 A1 | 10/2019 | Zoldi et al. |
| 2019/0333101 A1 | 10/2019 | Sohum et al. |
| 2019/0349351 A1* | 11/2019 | Verma .................. H04L 63/30 |
| 2019/0354982 A1 | 11/2019 | Gómez |
| 2019/0377896 A1 | 12/2019 | Spinelli et al. |
| 2019/0385170 A1 | 12/2019 | Arrabothu et al. |
| 2020/0005310 A1 | 1/2020 | Kumar et al. |
| 2020/0110870 A1* | 4/2020 | Girdhar .................. G06F 21/316 |
| 2020/0134629 A1 | 4/2020 | Zoldi et al. |
| 2020/0143465 A1 | 5/2020 | Chilaka et al. |
| 2020/0145436 A1 | 5/2020 | Brown et al. |
| 2020/0151628 A1 | 5/2020 | Zoldi et al. |
| 2020/0193018 A1 | 6/2020 | Van Dyke |
| 2020/0242615 A1 | 7/2020 | Chandra et al. |
| 2020/0273097 A1 | 8/2020 | Nordyke et al. |
| 2020/0293684 A1 | 9/2020 | Harris et al. |
| 2020/0380112 A1 | 12/2020 | Allen |
| 2020/0396246 A1 | 12/2020 | Zoldi et al. |
| 2021/0021631 A1 | 1/2021 | Okutan et al. |
| 2021/0150056 A1 | 5/2021 | Vax |
| 2021/0150532 A1 | 5/2021 | Zhang et al. |
| 2021/0182857 A1 | 6/2021 | Tiwan |
| 2021/0209230 A1 | 7/2021 | Leitner et al. |
| 2021/0326785 A1 | 10/2021 | McBurnett et al. |
| 2021/0372314 A1 | 12/2021 | Weigl et al. |
| 2022/0038481 A1 | 2/2022 | Jones |
| 2022/0046088 A1 | 2/2022 | Knopf |
| 2022/0084032 A1 | 3/2022 | Koehler et al. |
| 2022/0103589 A1 | 3/2022 | Shen et al. |
| 2022/0123946 A1 | 4/2022 | Knopf |
| 2022/0147817 A1 | 5/2022 | Boardman et al. |
| 2022/0180368 A1* | 6/2022 | Immaneni .......... G06Q 20/4014 |
| 2022/0207324 A1 | 6/2022 | Hamilton et al. |
| 2022/0231859 A1 | 7/2022 | Knopf et al. |
| 2022/0277308 A1 | 9/2022 | Ardizzi et al. |
| 2022/0321394 A1 | 10/2022 | Huang et al. |
| 2022/0358516 A1 | 11/2022 | Zoldi et al. |
| 2022/0368704 A1 | 11/2022 | Brown et al. |
| 2022/0377096 A1 | 11/2022 | Johnston et al. |
| 2022/0391793 A1 | 12/2022 | Latimer et al. |
| 2022/0400087 A1 | 12/2022 | Hoover et al. |
| 2022/0417275 A1 | 12/2022 | Jones |
| 2023/0008975 A1* | 1/2023 | Crudele ............. H04W 12/72 |
| 2023/0035336 A1 | 2/2023 | Knopf |
| 2023/0046601 A1 | 2/2023 | Hamilton et al. |
| 2023/0082708 A1 | 3/2023 | Hoover et al. |
| 2023/0113118 A1 | 4/2023 | Guo et al. |
| 2023/0162053 A1 | 5/2023 | Patel et al. |
| 2023/0196147 A1 | 6/2023 | McBurnett et al. |
| 2023/0196455 A1 | 6/2023 | Huber et al. |
| 2023/0205893 A1 | 6/2023 | Gjorvad et al. |
| 2023/0216866 A1 | 7/2023 | Monnig et al. |
| 2023/0229767 A1 | 7/2023 | Galli et al. |
| 2023/0245139 A1 | 8/2023 | Shen et al. |
| 2023/0245246 A1 | 8/2023 | Stack et al. |
| 2023/0254333 A1 | 8/2023 | Johnston et al. |
| 2023/0267537 A1 | 8/2023 | Nordyke et al. |
| 2023/0283628 A1 | 9/2023 | Johnston |
| 2023/0342605 A1 | 10/2023 | Sankaran et al. |
| 2023/0362014 A1 | 11/2023 | Knopf |
| 2023/0388131 A1 | 11/2023 | Knopf |
| 2023/0403276 A1* | 12/2023 | Vbh ................. H04L 9/3226 |
| 2024/0022587 A1 | 1/2024 | Jones |

FOREIGN PATENT DOCUMENTS

| | | |
|---|---|---|
| AU | 2020419017 | 6/2023 |
| AU | 2023203214 | 6/2023 |
| AU | 2022291564 | 7/2023 |
| CA | 3 058 653 | 4/2020 |
| CN | 104877993 | 9/2015 |
| CN | 113011973 | 6/2021 |
| DE | 91 08 341 | 10/1991 |
| EP | 0 554 083 | 8/1993 |
| EP | 2 939 361 | 10/2019 |
| EP | 3 092 569 | 1/2024 |
| GB | 2 392 748 | 3/2004 |
| GB | 2 518 099 | 3/2015 |
| JP | 2011-134252 | 7/2011 |
| JP | 5191376 | 5/2013 |
| KR | 10-2004-0034063 | 4/2004 |
| TW | I256569 | 6/2006 |
| WO | WO 94/006103 | 3/1994 |
| WO | WO 96/041488 | 12/1996 |
| WO | WO 00/055778 | 9/2000 |
| WO | WO 00/055789 | 9/2000 |
| WO | WO 00/055790 | 9/2000 |
| WO | WO 01/011522 | 2/2001 |
| WO | WO 02/027610 | 4/2002 |
| WO | WO 02/097563 | 12/2002 |
| WO | WO 03/071388 | 8/2003 |
| WO | WO 02/037219 A9 | 5/2004 |
| WO | WO 2004/046882 | 6/2004 |
| WO | WO 2006/069199 | 6/2006 |
| WO | WO 2007/001394 | 1/2007 |
| WO | WO 2008/028179 | 3/2008 |
| WO | WO 2008/054403 | 5/2008 |
| WO | WO 2008/054849 | 5/2008 |
| WO | WO 2008/147918 | 12/2008 |
| WO | WO 2009/062111 | 5/2009 |
| WO | WO 2009/117518 | 9/2009 |
| WO | WO 2011/044036 | 4/2011 |
| WO | WO 2012/054646 | 4/2012 |
| WO | WO 2012/112781 | 8/2012 |

(56) References Cited

FOREIGN PATENT DOCUMENTS

| | | |
|---|---|---|
| WO | WO 2013/026343 | 2/2013 |
| WO | WO 2013/126281 | 8/2013 |
| WO | WO 2014/008079 | 1/2014 |
| WO | WO 2014/008247 | 1/2014 |
| WO | WO 2014/150987 | 9/2014 |
| WO | WO 2015/184006 | 12/2015 |
| WO | WO 2017/011345 | 1/2017 |
| WO | WO 2018/163162 | 9/2018 |
| WO | WO 2018/175440 | 9/2018 |
| WO | WO 2018/208770 | 11/2018 |
| WO | WO 2019/006272 | 1/2019 |
| WO | WO 2019/018420 | 1/2019 |
| WO | WO 2019/040443 | 2/2019 |
| WO | WO 2019/050864 | 3/2019 |
| WO | WO 2019/079071 | 4/2019 |
| WO | WO 2019/125445 | 6/2019 |
| WO | WO 2019/169000 | 9/2019 |
| WO | WO 2022/020162 | 1/2022 |
| WO | WO 2022/026273 | 2/2022 |
| WO | WO 2022/031412 | 2/2022 |
| WO | WO 2022/032285 | 2/2022 |
| WO | WO 2022/072989 | 4/2022 |
| WO | WO 2022/104329 | 5/2022 |
| WO | WO 2022/221202 | 10/2022 |
| WO | WO 2022/261600 | 12/2022 |
| WO | WO 2023/060150 | 4/2023 |
| WO | WO 2023/086954 | 5/2023 |
| WO | WO 2023/107134 | 6/2023 |
| WO | WO 2023/129977 | 7/2023 |

OTHER PUBLICATIONS

Dimopoulou et al., "Mobile Anonymization and Pseudonymization of Structured Health Data for Research," 2022 Seventh International Conference on Mobile and Secure Services (MobiSecServ), 2022, pp. 1-6.
El Haddad et al., "Exploring User Behavior and Cybersecurity Knowledge—An Experimental Study in Online Shopping", 2018 16th Annual Conference on Privacy, Security and Trust (PST), pp. 10.
Hu et al. "Robust Support Vector Machines for Anomaly Detection in Computer Security", 2003, Proceedings of the 2003 International Conference on Machine Learning and Applications, pp. 7.
International Search Report and Written Opinion for Application No. PCT/US2022/024277, dated Jul. 18, 2022.
International Preliminary Report on Patentability in Application No. PCT/US2022/024277, dated Oct. 26, 2023.
Kundu et al., "BLAST-SSAHA Hybridization for Credit Card Fraud Detection", Oct.-Dec. 2009, IEEE Transactions on Dependable and Secure Computing, vol. 6, No. 4, pp. 309-315.
Pervushin et al., "Determination of loss of information during data anonymization procedure," 2016 IEEE 10th International Conference on Application of Information and Communication Technologies (AICT), 2016, pp. 1-5.
Sun et al., "Enhancing Security Using Mobility-Based Anomaly Detection in Cellular Mobile Networks", Jul. 2006, IEEE Transactions on Vehicular Technology, vol. 55, No. 4, pp. 1385-1396.
Trivedi et al., "Parallel Data Stream Anonymization Methods: A Review," 2022 Second International Conference on Artificial Intelligence and Smart Energy (ICAIS), 2022, pp. 887-891.
Ye et al., "EWMA Forecast of Normal System Activity for Computer Intrusion Detection", IEEE Transactions on Reliability, Dec. 2004, vol. 53, No. 4, pp. 557-566.
Chatzigeorgiou et al., "A Communication Gateway Architecture for Ensuring Privacy and Confidentiality in Incident Reporting," 2017 IEEE 15th International Conference on Software Engineering Research, Management and Applications (SERA), London, UK, 2017, pp. 407-411.
Chen et al., "Statistical Analysis of Identity Risk of Exposure and Cost Using the Ecosystem of Identity Attributes," 2019 European Intelligence and Security Informatics Conference (EISIC), Oulu, Finland, 2019, pp. 32-39.
Li, "Threats and data trading detection methods in the dark web," 2021 6th International Conference on Innovative Technology in Intelligent System and Industrial Applications (CITISIA), Sydney, Australia, 2021, pp. 1-9.
Peterson et al., "Introduction to Identity Management Risk Metrics," in IEEE Security & Privacy, vol. 4, No. 4, Jul.-Aug. 2006, pp. 88-91.
Trabelsi, "Monitoring Leaked Confidential Data," 2019 10th IFIP International Conference on New Technologies, Mobility and Security (NTMS), Canary Islands, Spain, 2019, pp. 1-5.
Xu et al., "Research on Dark Web Monitoring Crawler Based on TOR," 2021 IEEE 2nd International Conference on Information Technology, Big Data and Artificial Intelligence (ICIBA), Chongqing, China, 2021, pp. 197-202.
U.S. Appl. No. 09/557,252, filed Apr. 24, 2000, Page.
U.S. Appl. No. 12/705,489, filed Feb. 12, 2010, Bargoli et al.
U.S. Appl. No. 12/705,511, filed Feb. 12, 2010, Bargoli et al.
"A New Approach to Fraud Solutions", BasePoint Science Solving Fraud, pp. 8, 2006.
Aad et al., "NRC Data Collection and the Privacy by Design Principles", IEEE, Nov. 2010, pp. 5.
Allard et al., "Safe Realization of the Generalization Privacy Mechanism", 2011 Ninth Annual International Conference on Privacy, Security and Trust, pp. 8.
"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.
ABC News Now:Money Matters, as broadcasted Nov. 15, 2005 with guest Todd Davis (CEO of Lifelock), pp. 6.
Alsalamah et al., "Security Risk Management in Online System", 2017 5th International Conference on Applied Computing and Information Technology/4th International Conference on Computational Science/Intelligence and Applied Informatics/2nd International Conference on Big Data, Cloud Computing, Data Science & Engineering, 2017, pp. 119-124.
Anonymous, "Feedback", Credit Management, ABI/INFORM Global, Sep. 2006, pp. 6.
"Beverly Hills Man Convicted of Operating 'Bust-Out' Schemes that Caused More than $8 Million in Losses", Department of Justice, Jul. 25, 2006, 2 Pgs.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
"Bust-Out Schemes", Visual Analytics Inc. Technical Product Support, Newsletter vol. 4, Issue 1, Jan. 2005, pp. 7.
Chores & Allowances, "Do Kids Have Credit Reports?" Oct. 15, 2007, http://choresandallowances.blogspot.com/2007/10/do-kids-have-credit-reports.html, pp. 5.
Cowie, Norman, "Warning Bells & 'The Bust-Out'", Business Credit, Jul. 1, 2000, pp. 5.
Cullen, Terri; "The Wall Street Journal Complete Identity Theft Guidebook:How to Protect Yourself from the Most Pervasive Crime in America"; Chapter 3, pp. 59-79; Jul. 10, 2007.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
"Dealing with Measurement Noise (A Gentle Introduction to Noise Filtering)", Chemical and Process Engineering, University of Newcastle Upon Tyne, https://web.archive.org/web/20000418021742/http://lorien.ncl.ac.uk/ming/filter/filewma.htm, Archived Apr. 18, 2000, pp. 3.
EFunds Corporation, "Data & Decisioning: Debit Report" printed Apr. 1, 2007, http://www.efunds.com/web/industry-solutions/financial-services/frm-debit-report/htm in 1 page.
El Kalam et al., "Personal Data Anonymization for Security and Privacy in Collaborative Environments", 2005 IEEE, pp. 56-61.

(56) References Cited

OTHER PUBLICATIONS

Equifax; "Equifax Credit Watch"; https://web.archive.org/web/20070627135447/https://www.econsumer.equifax.co.uk/consumer/uk/sitepage.ehtml?forward=gb_esn_detail, dated Jun. 27, 2007 on www.archive.org in 2 pages.
Experian Team, "Impact on Credit Scores of Inquiries for an Auto Loan," Ask Experian, Mar. 1, 2009, pp. 5.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
Familysecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
"Fighting the New Face of Fraud", FinanceTech, http://www.financetech.com/showArticle.jhtml?articleID=167100405, Aug. 2, 2005.
"FinExtra, Basepoint Analytics Introduces Predictive Technology for Mortgage Fraud", Oct. 5, 2005, pp. 3.
Fisher, Joseph, "Access to Fair Credit Reports: Current Practices and Proposed Legislation," American Business Law Journal, Fall 1981, vol. 19, No. 3, p. 319.
"Fraud Alert | Learn How". Fight Identity Theft. http://www.fightidentitytheft.com/flag.html, accessed on Nov. 5, 2009.
Gaudio, David, "Intelligent Adaptive Authentication: How 6 Workflow Steps Improve Customer Experience", OneSpan, https://www.onespan.com/blog/intelligent-adaptive-authentication-how-6-workflow-steps-improve-customer-experience, Jun. 22, 2020, pp. 6.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
Haglund, Christoffer, "Two-Factor Authentication with a Mobile Phone", Fox Technologies, Uppsala, Department of Information Technology, Nov. 2, 2007, pp. 62.
Herzberg, Amir, "Payments and Banking with Mobile Personal Devices," Communications of the ACM, May 2003, vol. 46, No. 5, pp. 53-58.
"ID Analytics ID Network", from www.idanalytics.com, as retrieved from www.archive.org, dated Nov. 20, 2005 or earlier; attached as "ID Network (IDN)", pp. 8.
ID Cops, www.idcops.com; retrieved from www.archive.org any linkage Feb. 16, 2007.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&SID=1&Fmt=3&clientld=19649&RQT=309&Vname=PQD.
"Industry News, New Technology Identifies Mortgage Fraud: Basepoint Analytics Launches FraudMark", Inman News, American Land Title Association, Oct. 5, 2005, pp. 1.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
"Intersections, Inc. Identity Guard", from www.intersections.com and www.identityguard.com, as retrieved from Internet Archive, dated Nov. 25, 2005 or earlier; attached as "Identity Guard (IDG)", pp. 7.
Iovation, Device Identification & Device Fingerprinting, http://www.iovation.com/risk-management/device-identification printed Nov. 5, 2012 in 6 pages.
Jacob et al., A Case Study of Checking Account Inquiries and Closures in Chicago, The Center for Financial Services Innovation, Nov. 2006.
Jaeger, Herbert, "A Tutorial on Training Recurrent Neural Networks, Covering BPPT, RTRL, EKF and the 'Echo State Network' Approach", Fraunhofer Institute for Autonomous Intelligent Systems (AIS), International University Bremen, Oct. 2002, pp. 46.
Jin et al., "Network Security Risks in Online Banking", 2005 International Conference on Wireless Communications, Networking and Mobile Computing, Jan. 2005, vol. 2, pp. 1229-1234.
Karlan et al., "Observing Unobservables: Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
Lamons, Bob, "Be Smart: Offer Inquiry Qualification Services," Marketing News, ABI/Inform Global, Nov. 6, 1995, vol. 29, No. 23, pp. 13.
Lee, Timothy B., "How America's Broken Tax System Makes Identity Theft Easy", http://www.vox.com/2014/4/14/5608072/how-americas-broken-tax-system-makes-identity-theft-easy, Apr. 14, 2014, pp. 10.
Lee, W.A.; "Experian, on Deal Hunt, Nets Identity Theft Insurer", American Banker: The Financial Services Daily, Jun. 4, 2003, New York, NY, 1 page.
Lefebvre et al., "A Robust Soft Hash Algorithm for Digital Image Signature", International Conference on Image Processing 2:11 (ICIP), vol. 3, Oct. 2003, pp. 495-498.
Lennox et al., "Tax Aggressiveness and Accounting Fraud", Journal of Accounting Research, 2013, pp. 40.
Lifelock, "How LifeLock Works," http://www.lifelock.com/lifelock-for-people printed Mar. 14, 2008 in 1 page.
Lifelock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
Lifelock, "Personal Identity Theft Protection & Identity Theft Products," http://www.lifelock.com/lifelock-for-people, accessed Nov. 5, 2007.
Lifelock, Various Pages, www.lifelock.com/, Jan. 9, 2007, pp. 49.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.

(56) References Cited

OTHER PUBLICATIONS

National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
Quinn, Tom, "Low Credit Inquiries Affect Your Credit Score", Credit.com, May 2, 2011, pp. 2.
"Recurrent Neural Network", as downloaded from wikipedia.org https://en.wikipedia.org/wiki/Recurrent_neural_network?oldid=717224329, Apr. 2016, pp. 8.
Ribeiro et al., "Privacy Protection with Pseudonumization and Anonumization In a Health IoT System", Results from OCARIoT, 2019 IEEE, pp. 904-908.
Rivera, Barbara, "New Tools for Combating Income Tax Refund Fraud", https://gcn.com/Articles/2014/05/08/Insight-tax-fraud-tools.aspx?Page=1, May 8, 2014, pp. 3.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Shoeboxed, https://www.shoeboxed.com/sbx-home/ printed Oct. 16, 2012 in 4 pages.
Singletary, Michelle, "The Littlest Victims of ID Theft", The Washington Post, The Color of Money, Oct. 4, 2007.
Sumner, Anthony, "Tackling the Issue of Bust-Out Fraud", Retail Banker International, Jul. 24, 2007, pp. 4.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
"The Return Review: Program Increases Fraud Detection; However, Full Retirement of the Electronic Fraud Detection System Will be Delayed", Treasury Inspector General for Tax Administration, Sep. 25, 2017, Reference No. 2017-20-080, pp. 27.

Themorningcall.com, "Cheap Ways to Foil Identity Theft," www.mcall.com/business/columnists/all-karp.5920748jul01,0 . . . , published Jul. 1, 2007.
Torgler, Benno, "What Do We Know about Tax Fraud ?: An Overview of Recent Developments", Social Research: An International Quarterly, vol. 74, No. 4, Winter 2008, pp. 1239-1270.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Vamosi, Robert, "How to Handle ID Fraud's Youngest Victims," Nov. 21, 2008, http://news.cnet.com/8301-10789_3-10105303-57.html.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Wilson, Andrea, "Escaping the Alcatraz of Collections and Charge-Offs", http://www.transactionworld.net/articles/2003/october/riskMgmt1.asp, Oct. 2003.
International Search Report and Written Opinion for Application No. PCT/US2007/06070, dated Nov. 10, 2008.
International Search Report and Written Opinion for Application No. PCT/US2008/064594, dated Oct. 30, 2008.
International Preliminary Report and Written Opinion in PCT/US2008/064594, mailed Dec. 10, 2009.
International Search Report and Written Opinion for Application No. PCT/US09/37565, dated May 12, 2009.
Official Communication in Australian Patent Application No. 2012217565, dated May 12, 2017.
Official Communication in Australian Patent Application No. 2017203586, dated Jun. 18, 2019.
Official Communication in Australian Patent Application No. 2019279982, dated Dec. 19, 2019.
Official Communication in Canadian Patent Application No. 2,827,478, dated Jun. 29, 2017.
Official Communication in Canadian Patent Application No. 2,827,478, dated May 31, 2018.
Official Communication in Canadian Patent Application No. 2,827,478, dated Mar. 27, 2019.
Extended European Search Report for Application No. EP12747205, dated Sep. 25, 2014.
Supplementary European Search Report for Application No. EP12747205, dated Jun. 19, 2015.
Extended European Search Report for Application No. EP18748000, dated Dec. 13, 2018.
International Search Report and Written Opinion for Application No. PCT/US2012/025456, dated May 21, 2012.
International Preliminary Report on Patentability in Application No. PCT/US2012/025456, dated Aug. 21, 2013.
International Search Report and Written Opinion for Application No. PCT/US2011/033940, dated Aug. 22, 2011.
Mahalle et al., "Insider Threat and Mitigation for Cloud Architecture Infrastructure in Banking and Financial Services Industry", Proceedings of the 2019 IEEE 23rd International Conference on Computer Supported Cooperative Work in Design, 2019, pp. 16-21.
Sherly et al., "BOAT Adaptive Credit Card Fraud Detection System", 2010 IEEE International Conference on Computational Intelligence and Computing Research, Dec. 2010, pp. 7.

* cited by examiner

SYSTEMS AND METHODS OF GENERATING RISK SCORES AND PREDICTIVE FRAUD MODELING

PRIORITY AND INCORPORATION BY REFERENCE TO APPLICATION(S)

This application claims priority to U.S. Provisional Patent Application No. 63/173,913 filed on Apr. 12, 2021 and titled "SYSTEMS AND METHODS OF GENERATING RISK SCORES AND PREDICTIVE FRAUD MODELING". The entire content of the above-referenced application is hereby expressly incorporated herein by reference in its entirety for all purposes.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

FIELD OF THE IMPLEMENTATIONS

The disclosure generally relates to using compromised Personally Identifiable Information (PII) from the Dark Web for determining a likelihood of future fraudulent activities and presenting information and recommendations in assessments or reports.

SUMMARY

Various systems, methods, and devices are described for providing a platform for calculating or determining a Dark Web Risk Score (DWRS) and/or training a predictive model to determine a likelihood of future fraudulent activity. The systems, methods, and devices of the disclosure each have several innovative aspects, no single one of which is solely responsible for the desirable attributes disclosed herein.

The World Wide Web, also commonly known as the Web or Internet, is a wealth of seemingly boundless, mostly useful, information. Unfortunately, the Web is also a source of illegal activity. Fraudsters and threat actors are constantly monitoring the Web for many reasons. Some common reasons are for money, to steal or leak information, to disrupt services, or simply for fun or bragging rights.

The Web is commonly divided into three (3) layers; the Surface Web, the Deep Web, and the Dark Web. The Dark Web is a rampant source of illegal activity because a fraudster or criminal can easily remain anonymous, and activities are very difficult to monitor. An example of illegal content found on the Dark Web is compromised (for example, stolen or exposed) Personally Identifiable Information (PII). However, compromised PII may also be found or sold on the Surface Web and Deep Web as well. Compromised PII is often used for fraudulent activity involving identity theft or account take-over, such as using a victim's PII in a credit or loan application (for example, credit cards, loans, and so forth), in refund applications (for example, tax, government reimbursements, and so forth), or for requesting government assistance (for example, Federal Emergency Management (FEMA), welfare, unemployment, and so forth). Compromised PII may also lead to large-scale compromises or attacks, such as institutional or government data breaches, malware attacks, or disrupting or taking down corporate and government servers, for example.

In 2019, the Federal Trade Commission's (FTC) Consumer Sentinel Network (CSN) reported 1.7 million consumer accounts of fraud and 650,572 accounts of identity theft. Dollar loss was estimated at upwards of $1.9 billion in 2019 for all CSN reports. In comparison to 2018, the CSN reports an 88% increase in new credit card application fraud and increases of 105%, 116%, and 188% for auto, business/personal, and student loan fraud, respectively. Individuals between the ages of 20 and 49 made up 39.46% of the US population, according to data published in 2019 by the United States Census Bureau. However, individuals in this age group account for 71.7% of CSN's reported fraud and identity theft. In other words, a majority of CSN fraud and identity theft cases were reported by less than 40% of the US population. Conversely, 60.54% of the US population falls outside of the 20-49 age group but only accounts for 28.3% of CSN reported fraud and identity theft.

A majority of identity theft coming from less than 40% of the US population suggests that individuals in the 20-49 age group have had their PII compromised before the theft occurred. Presumably these individuals have a strong online presence (for example, social media, retail, gambling, and so forth), and hence, are at risk of predation by fraudsters. Identity thieves actively find compromised PII (for example, exposed or stolen PII) and illegally post or sell the compromised PII on the Web, but largely on the Dark Web, for example. The compromised PII can then be subsequently used to impersonate a victim on applications for loans or lines of credit by a purchaser of the compromised PII, for example. If the purchaser is caught or if the fraudulent activity detected, the fraudulent activity can be reported to one or more agencies, such as the FTC, or credit bureaus, such as Experian, for example. The alarming increases of 2019 account take-overs compared to the previous year may be mitigated by illuminating or flagging compromised PII from the Dark Web—or the Web in general—that may be used for future identity theft, account take-over, or fraud, for example.

The concept of a Dark Web Risk Score (DWRS) is an ideal tool to guide consumers to be proactive with managing their presence in cyberspace and may reduce the risk of potential PII exposure. In some implementations, the DWRS can be derived from predictive models trained to recognize fraud signatures from compromised PII. For example, a consumer that regularly monitors their DWRS may be encouraged to more thoughtfully manage their online presence. So, lowering an individual's Dark Web Score may also lower the possibility of becoming a victim of identity theft.

In one implementation, a system is disclosed. The system may include: one or more data stores configured to store: computer-executable instructions; a first set of personal identifiable information (PII) collected from one or more internet-accessible sources, wherein the first set of PII correspond to a plurality of users; a second set of PII associated with confirmed fraud cases and confirmed non-fraud cases; and a third set of PII associated with a first user; a network interface configured to communicate with a plurality of network devices; and one or more physical computer processors in communication with the one or more data stores, wherein the computer-executable instructions, when executed, configure the one or more physical computer processors to: access, by the network interface and from the one or more data stores, the first set of PII, the second set of PII, and the third set of PII; generate a first predictive model by inputting the first set of PII and the second set of PII into a first machine learning algorithm, wherein the first predictive model is configured to determine a likelihood of future fraudulent activities; generate a first risk score and first recommendations for the first user by applying a second machine learning algorithm, wherein the first predictive model, the first set of PII, and the third set of PII are input into the second machine learning algorithm to generate the first risk score; and based at least in part on the first risk score, generate and transmit, to a first user device associated with the first user, display instructions configured to present an interactive user interface comprising a risk report, wherein the risk report comprises the first risk score and first recommendations.

In some implementations, the one or more physical computer processors are further configured to: train the first machine learning algorithm to generate the first predictive model, and wherein the training of the first machine learning algorithm is performed by: determining a first set of variables by comparing the first set of PII to the second set of PII; applying variable or feature importance to the first set of variables to generate a feature importance score for each variable of the first set of variables; determining a second set of variables based at least in part on the application of the variable or feature importance, wherein the second set of variables is a subset of the first set of variables; and generating the first predictive model based on the second set of variables. In some implementations, the first recommendations include one or more of: closing an account, changing a password, changing a username, changing or removing PII associated with an account, changing multi-factor authentication settings, and changing general settings on an account. In some implementations, the first recommendations include recommended actions the first user can take to improve the first risk score or reduce a likelihood of future fraudulent activity with respect to the third set of PII. In some implementations, the one or more physical computer processors are further configured to: monitor status of the first recommendations; and based on the monitoring, determine that a second recommendation of the first recommendations has been completed. In some implementations, the one or more physical computer processors are further configured to: in response to the determination that the second recommendation has been completed, generate an updated risk score and updated recommendations for the first user. In some implementations, the risk report further comprises one or more of: a subpopulation risk score, a user password analysis, a percent contribution analysis, a list of riskiest breached sites, and a web exposure analysis. In some implementations confirmed fraud cases and confirmed non-fraud cases are determined by data collected from one or more of: one or more proprietary databases, one or more users, and one or more third party services or companies. In some implementations, the first predictive model comprises an equation comprising weighted coefficients and variables, wherein the variables are based at least in part on the second set of variables. In some implementations, the comparing of the first set of PII to the second set of PII comprises matching PII from the first set of PII collected from one or more internet-accessible sources with PII from the second set of PII associated with confirmed fraud cases and confirmed non-fraud cases. In some implementations, the second set of variables includes determining all variables of the first set of variables that comprise a feature importance score that meets a preconfigured threshold score that indicates a threshold predictive value for the first predictive model. In some implementations, the second set of variables includes fewer variables than the first set of variables.

In another implementation, a computer-implemented method is disclosed. The computer-implemented method may include: accessing, by a network interface and from one or more data stores: a first set of personal identifiable information (PII) collected from one or more internet-accessible sources, wherein the first set of PII correspond to a plurality of users; a second set of PII associated with confirmed fraud cases and confirmed non-fraud cases; and a third set of PII associated with a first user; generating a first predictive model by inputting the first set of PII and the second set of PII into a first machine learning algorithm, wherein the first predictive model is configured to determine a likelihood of future fraudulent activities; generating a first risk score and first recommendations for the first user by applying a second machine learning algorithm, wherein the first predictive model, the first set of PII, and the third set of PII are input into the second machine learning algorithm to generate the first risk score; and based at least in part on the first risk score, generating and transmitting, to a first user device associated with the first user, display instructions configured to present an interactive user interface comprising a risk report, wherein the risk report comprises the first risk score and first recommendations.

In some implementations, the method may further include training the first machine learning algorithm to generate the first predictive model, and wherein the training of the first machine learning algorithm is performed by: determining a first set of variables by comparing the first set of PII to the second set of PII; applying variable or feature importance to the first set of variables to generate a feature importance score for each variable of the first set of variables; determining a second set of variables based at least in part on the application of the variable or feature importance, wherein the second set of variables is a subset of the first set of variables; and generating the first predictive model based on the second set of variables. In some implementations, the first recommendations include recommended actions the first user can take to improve the first risk score or reduce a likelihood of future fraudulent activity with respect to the third set of PII. In some implementations, the first predictive model comprises an equation comprising weighted coefficients and variables, wherein the variables are based at least in part on the second set of variables. In some implementations, the comparing of the first set of PII to the second set of PII comprises matching PII from the first set of PII collected from one or more internet-accessible sources with PII from the second set of PII associated with confirmed fraud cases and confirmed non-fraud cases. In some implementations, determining the second set of variables includes determining all variables of the first set of variables that comprise a feature importance score that meets a preconfigured threshold score that indicates a threshold predictive value for the first predictive model.

In a further implementation, a non-transitory computer storage medium storing computer-executable instructions is disclosed. The non-transitory computer storage medium may store computer-executable instructions that, when executed by a processor, cause the processor to at least: access, by a network interface and from one or more data stores: a first set of personal identifiable information (PII) collected from one or more internet-accessible sources, wherein the first set of PII correspond to a plurality of users; a second set of PII associated with confirmed fraud cases and confirmed non-fraud cases; and a third set of PII associated with a first user; generate a first predictive model by inputting the first set of PII and the second set of PII into a first machine learning algorithm, wherein the first predictive model is configured to determine a likelihood of future fraudulent activities; generate a first risk score and first recommendations for the first user by applying a second machine learning algorithm, wherein the first predictive model, the first set of PII, and the third set of PII are input into the second machine learning algorithm to generate the first risk score; and based at least in part on the first risk score, generate and transmit, to a first user device associated with the first user, display instructions configured to present an interactive user interface comprising a risk report, wherein the risk report comprises the first risk score and first recommendations. In some implementations, the non-transitory computer storage medium may store computer-executable instructions that, when executed by a processor, further cause the processor to at least: train the first machine learning algorithm to generate the first predictive model, and wherein the training of the first machine learning algorithm is performed by: determining a first set of variables by comparing the first set of PII to the second set of PII; applying variable or feature importance to the first set of variables to generate a feature importance score for each variable of the first set of variables; determining a second set of variables based at least in part on the application of the variable or feature importance, wherein the second set of variables is a subset of the first set of variables; and generating the first predictive model based on the second set of variables.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings. The accompanying drawings, which are incorporated in, and constitute a part of, this specification, illustrate implementations of the disclosure.

Throughout the drawings, reference numbers are re-used to indicate correspondence between referenced elements. The drawings are provided to illustrate implementations of the subject matter described herein and not to limit the scope thereof. Specific implementations will be described with reference to the following drawings.

DETAILED DESCRIPTION

Figure 1:
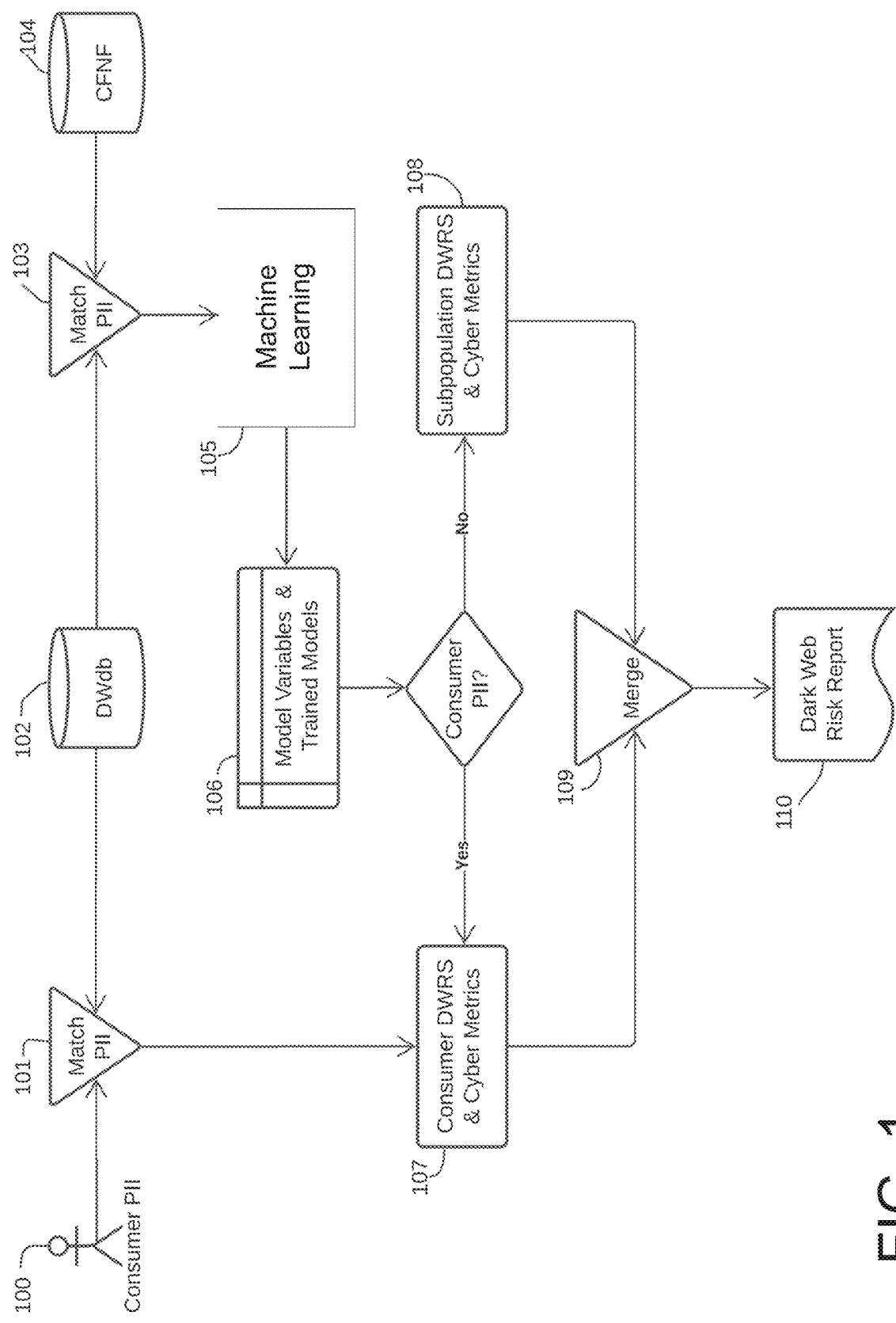
FIG. 1 is a block diagram illustrating an implementation of a process of generating a Dark Web Risk Score and a Dark Web Risk Report.

Implementations of the disclosure will now be described with reference to the accompanying figures. The terminology used in the description presented herein is not intended to be interpreted in any limited or restrictive manner, simply because it is being utilized in conjunction with a detailed description of implementations of the disclosure. Furthermore, implementations of the disclosure may include several novel features, no single one of which is solely responsible for its desirable attributes, or which is essential to practicing the implementations of the disclosure herein described. For purposes of this disclosure, certain aspects, advantages, and novel features of various implementations are described herein. It is to be understood that not necessarily all such advantages may be achieved in accordance with any particular implementation. Thus, for example, those skilled in the art will recognize that one implementation may be carried out in a manner that achieves one advantage or group of advantages as taught herein without necessarily achieving other advantages as may be taught or suggested herein.

A. Overview

The Web, especially the Dark Web, is an unbridled source of exposed or stolen PII and other personal information such as, for example, medical records, biometrics, medical diagnostic results, tax returns, classified government documents, and/or the like. PII may include, for example, a person's full or partial name, home address, work address, email address, social security number (SSN), passport number, driver's license number, credit card information/number, debit card information/number, date of birth (DOB), telephone number, cell phone number, owned properties, vehicle identification number, login details, device IDS, device serial numbers, and/or the like. A common use of compromised PII (for example, exposed or stolen PII) by fraudsters is identity theft, for example. In some implementations, to help protect consumers from fraudulent activity using compromised PII, systems and/or methods disclosed herein can be implemented that perform one or more of the following:

1. Enable the detection and prevention of consumer-focused identity theft.
2. Generate a Cyber Risk score with a flexible and variable range depending on the model used and level of granularity desired.
3. Combine Dark Web data and Confirmed Fraud and Non-Fraud data (CFNF) from consumer transactions.
4. Powered by a Predictive model using machine learning techniques and tools in addition to heuristic and/or regression data analysis, for example.
5. Use Predictive models that use a volume and variety of variable creation to seed the Predictive models and can be based on one or more triggers.
6. Visualizes the latest Cyber Risk score, trend over time, and any possible metadata of a consumers' cyber-risk footprint (for example, password encryption level and/or reuse) in UI/UX.
7. Create a system that drives and modifies a consumer online behavior to change or enhance their cyber risk profile by prioritizing actions and, in some implementations, automating the actions for the consumer.

In some implementations, the predictive models may be trained with confirmed fraud and non-fraud (CFNF) cases. For example, in some implementations, the CNFN cases include cases that have previously been confirmed to be fraudulent or not fraudulent. For instance, if a prior transaction or purchase was flagged as fraud by an associated consumer, the models can use that data to update the predictive models. In some implementations, exposed or compromised PII collected from the Dark Web can reside in a database, which may be referred to herein as the Dark Web Database or DWdb. In some implementations, compromised PII matching to PII of confirmed fraud cases are used to create consumer PII metrics and variables that train predictive models.

In some implementations, predictive models can be generated based at least in part on, for example, machine learning, artificial intelligence, neural networks, decision trees and/or the like. In some implementations, the predictive models are based on traditional statistical methods. In some implementations, the predictive models are different from traditional statistical methods, such as, for example, a logistic regression. Logistic regression analysis is a statistical method which estimates coefficients that are later used to compute a linear combination of coefficients and variables to fit a curve representing a relationship between dependent and independent variables. Logistic regression fits independent variables based on dependent variables using a logistic function. Similarly, a perceptron, in machine learning, estimates the weight of each input to represent a relationship between dependent and independent variables using a step function. For example, unlike regression analysis, which fits data to a 2-dimensional logistic curve, the interconnected perceptrons of an AI model are capable of fitting an N-dimensional hyperplane to a more complex input space with high dimensionality. Learning occurs when connections between perceptrons are adjusted iteratively by an error correcting method (for example, gradient descent, conjugate gradient, and/or the like) which minimizes the error between the expected and observed outputs. A similar error correcting step occurs with regression analysis but at a simpler level (for example, using conditional probabilities or a loss function to minimize error). Therefore, an artificial intelligence model may be considered as a multi-dimensional regression model that is more accurate and better able to generalize new examples. Ensemble decision trees are different from both logistic regression and neural networks. Each tree in an ensemble partitions the data values of the dependent variables such that the independent variables are optimally separated. The variance in the input data is captured by the decision trees of an ensemble that later vote to classify test examples.

In some implementations, and in contrast to previous and current risk scoring methods that are based on heuristics or statistical methods, such as logistic regression, respectively, the systems and methods described herein may train predictive models and calculate a risk score (for example, a DWRS) directly from historically confirmed fraud and non-fraud cases. In some implementations, the trained predictive models may predict future fraudulent activity from compromised PII signatures.

FIG. 1 is a block diagram illustrating an implementation of a process of generating a Dark Web Risk Score and a Dark Web Risk Report 110, for example, as implemented by a Dark Web Risk System. It is recognized that there are other implementations of the process which may exclude some of the blocks/steps shown and/or may include additional blocks/steps not illustrated in FIG. 1. Additionally, the block/steps discussed may be combined, separated into sub-blocks/sub-steps, and/or rearranged to be completed in a different order and/or in parallel. In some implementations, a block/step can be completed by one or more systems or processes as well.

In block 101, a consumer's PII 100 is compared to PII from a Dark Web Database (DWdb) 102 to determine whether the consumer's PII matches any PII in the DWdb 102. For example, in block 101, the system may identify that an element of the consumer PII 100, such as, for example, a SSN, matches a corresponding SSN from the DWdb 102. In some implementations, consumer PII 100 may be stored in a database, such as, for example, mass storage device 810. In some implementations, elements of the consumer PII 100 that are determined by the system to match elements of PII from the DWdb 102 may be stored in a database.

In some implementations, the consumer's PII 100 may comprise PII elements that may come directly from the consumer, one or more third party databases, one or more proprietary databases, and/or the like. For example, a consumer may input some elements of consumer PII 100 into the system during an interaction with the system, such as, for example, during the registration process 700b as described herein with reference to FIG. 7. In another example, some elements of consumer PII may be retrieved from third party databases, such as, for example, www.whitepages.com.

In some implementations, the DWdb 102 may comprise PII elements that are collected from one or more internet-accessible sources, such as, for example, the Surface Web, the Deep Web, and/or the Dark Web. In some implementations, the PII elements collected may come from a third-party source, service, or database. In some implementations, the DWdb 102 comprises compromised PII that corresponds to a plurality of users or consumers (for example, some of which may or may not be current customers or account holders). In some implementations, the PII elements may be collected using a monitoring component of the system to conduct automated inquires and search a variety of third-party sources to locate consumer PII. In some implementations, the system may use web crawling and/or web scraping techniques to find and extract PII elements for the DWdb 102. In some implementations, DWdb 102 may include PII collected from platforms, such as, for example, dark web platforms where PII data is exchanged and/or can be purchased. In some implementations, the DWdb 102 may be periodically updated to ensure that the risk scores and reports generated contain accurate exposure information. For example, in some implementations, the DWdb 102 may be updated one or more times daily, weekly, monthly, bimonthly, semiannually, annually, and/or the like. When the DWdb 102 is updated, the amount of new data points collected may exceed, for example, one million, ten million, fifty million, one hundred million, five-hundred million, one billion, and/or the like (for example, per day, etc.). Continually and automatically updating the DWdb 102 ensures that the most recent data available is utilized by the models. For example, having an updated DWdb 102 ensures that the variables created in conjunction with the machine learning algorithms and predictive modeling, as discussed further herein, are as up to date and accurate as possible. Continuous updates to the DWdb 102 can provide a benefit of having new variables for the machine learning algorithm or predictive model created that account for new fraud techniques/methods or criminal techniques/methods that are utilized to steal and perpetrate fraud with PII. Continually updating the DWdb 102 may also provide a benefit of more accurate DWRSs for consumers. For example, by continually updating the DWdb 102, the DWRSs generated by the system may account for newly exposed PII and provide more accurate and up to date DWRSs and other elements of the Identity Protection Plan, such as, for example, up to date recommendations including personalized actions and tools as described further herein. Given the large quantity of data collected for the DWdb 102, it would be unfeasible for an individual to constantly review and monitor their personal exposure on the internet (including the Dark Web) to ensure that their PII is not currently exposed. Further, because millions and sometimes billions of new data elements are exposed daily on the internet, a system to continually monitor the new exposures is used (as described herein) to more confidently assess potential risk from PII exposure.

In some implementations, the system may include a web searching system that can be used to find PII data. For example, the web searching system may utilize, for example, search engines, web spiders, and keyword-matching features. In one implementation, the search engines and the web spiders may be utilized to collect PII information such as, for example, potential sources of compromised PII. The potential sources of compromised PII may include, for example, websites and forums that facilitate exchange of compromised PII (for example, by identity thieves). Further, keyword-matching features may be leveraged to analyze the potential sources of PII information using, for example, identity-theft nomenclature. Additionally, the web searching system may be generally operable to identify and collect other information such as, for example, compromised PII, uniform resource locators (URLs), references to IRC chat rooms (i.e., channels), and/or the like.

In various implementations, in populating the DWdb 102, the system may use one or more Internet Relay Chat Robot (IRC Bots). Oftentimes, compromised PII is exchanged via chat rooms (for example, between identity thieves on IRC channels). In a typical implementation, an IRC bot is operable to crawl the Internet in search of chat rooms (for example, IRC channels) that may include compromised PII, such as, for example, chat rooms frequented by identity thieves. In a typical implementation, the IRC bot is operable to monitor such chat rooms for identity-theft nomenclature. Furthermore, the IRC bot is typically operable to identify and collect compromised PII, URLs, references to other IRC chat rooms, and other identity-theft information from such chat rooms. The collected data may be stored in the DWdb 102.

In some implementations, the IRC bot may work with other elements of the system to populate the DWdb 102. For example, the IRC bot may provide identity-theft nomenclature such as email addresses, nicknames, and other information that may be used by an identity thief. The IRC bot may further provide, for example, URLs to potential sources of compromised PII. In a typical implementation, the system may crawl the URLs provided by the IRC bot and scan for identity-theft information. The system may also search and crawl the Internet using the identity-theft nomenclature provided by the IRC bot. In a similar manner, the system may discover and send identity-theft information such as, for example, chat rooms, to the IRC bot. In a typical implementation, the IRC bot may monitor the chat rooms provided by the system.

In block 103, the PII from the DWdb 102 is compared to PII associated with confirmed fraud and confirmed non-fraud (CFNF) cases 104. For example, the confirmed fraud and confirmed non-fraud (CFNF) cases 104 may include labeled data indicating that a certain potentially fraudulent event (for example, someone using a person's credit card, etc.) was in fact confirmed to be fraud (for example, the owner of the credit card confirmed the use of their credit card was fraudulent), or alternatively, was in fact confirmed to be a false alarm or non-fraud (for example, the owner of the credit card confirmed the use of their credit card was not fraudulent). In some implementations, the confirmed fraud and confirmed non-fraud (CFNF) cases 104 are created and stored in a proprietary database and/or using proprietary data or information. In some implementations, the PII stored in the DWdb 102 may be compared and matched with the CFNF cases 104. In other implementations, only a portion of the PII stored in the DWdb 102 is compared and matched with the CFNF cases 104. In some implementations, the consumer PII 100 may be compared to the PII associated with CFNF cases 104. In other implementations, only elements of the consumer PII 100 that were identified to have a corresponding matching element in the DWdb 102 may be compared to the PII associated with CFNF cases 104. For example, if the only matches identified at block 101 were SSN and date of birth, only these PII elements may be compared to the PII associated with CFNF cases 104 to improve efficiency in working with large data sets. In some implementations, the CFNF cases 104 are continually updated to account for new confirmed fraud and new confirmed non-fraud cases to better improve the machine learning methods in the creation of a predictive fraud model. For example, the new confirmed fraud and new confirmed non-fraud cases can result in improved variable determination/selection, weightings, and improved predictive accuracy of the model. For example, the CFNF cases 104 may be updated one or more times daily, weekly, monthly, bimonthly, semiannually, annually, and/or the like. In some implementations, new data regarding new confirmed fraud and new confirmed non-fraud cases can be accessed, received, or retrieved from one or more consumers (for example, user can confirm that actual fraud or non-fraud occurred), third parties (for example, banks, lenders, etc.), or any other source of data that may be considered sufficiently confirmed (for example, user-flagged potential fraud resulting in a closed account, etc.). When the CFNF cases 104 are updated, the amount of new data points collected may exceed, for example, hundreds, thousands, tens of the thousand, hundreds of thousands, millions, tens of millions, and/or the like. Continually updating the CFNF cases 104 ensures that the most recent data available is utilized by the models. For example, having an updated CFNF cases 104 ensures that the model variables created, as discussed further herein, are based on up to date information so that the resulting machine learning or predictive model is the most accurate and/or predictive of future fraudulent activities. Continuous updates to the CFNF cases 104 can provide a benefit of having new variables created that account for new fraud techniques/methods or criminal techniques/methods that are utilized to steal and perpetrate fraud with PII, and/or new variables created that just better predict future fraudulent activities. Continually updating the CFNF cases 104 may also provide a benefit of more accurate DWRSs for consumers. In some implementations, the CFNF cases 104 are collected from one or more of: one or more proprietary databases, one or more users, such as, for example, one or more consumers, one or more third party service or companies, and/or the like.

In some implementations, the comparison of the DWdb 102 and the CFNF cases 104 may comprise determining which elements of exposed PII stored in the DWdb 102 relate to the CFNF cases 104. For example, for a particular consumer corresponding to a confirmed fraud case, there may be multiple PII elements exposed on various websites and in different internet levels (for example, dark web, surface web, etc.). For example, based on the compromised PII in the DWdb 102, a machine learning algorithm may determine which of the consumer's PII elements are compromised, the compromised PII exposure location(s), when the compromised PII was posted or available, and/or other data elements. Such machine learning determinations can be used in a variable selection and weighting processes (for example, coefficient determinations associated with the variables) in generating a predictive model or equation to determine the likelihood of future fraud or fraudulent activities based on any analyzed consumer data or PII in the DWdb 102 as compared to labeled data associated with the confirmed fraud and confirmed non-fraud cases. For example, in a first confirmed non-fraud case for a first consumer, there may still have been first compromised PII corresponding to the first consumer in the DWdb 102. Based on analysis of the first confirmed non-fraud case and the first compromised PII, the machine learning algorithm may, in some situations, determine that the particular exposed PII elements corresponding to the first compromised PII, exposure location, and/or other data elements are unlikely to be good indicators of future fraud, which may also be used in the variable selection and weighting processes. Also, for example, in a second confirmed fraud case for a second consumer, there may have been second compromised PII corresponding to the second consumer in the DWdb 102. Based on analysis of the second confirmed fraud case and the second compromised PII, the machine learning algorithm may, in some situations, determine that the particular exposed PII elements corresponding to the second compromised PII, exposure location, and/or other data elements are more likely to be good indicators of future fraud, which may also be used in the variable selection and weighting processes.

In some implementations, the DWdb 102, CFNF cases 104, and consumer PII 100 may all be stored in the same database. In other implementations, the DWdb 102, CFNF cases 104, and consumer PII 100 may be stored in separate databases.

In block 105, machine learning may be applied to selectively choose model variables 106 generated based at least in part on the compromised PII identified at block 103 where the CFNF 104 matched with Dark Web compromised PII stored in the DWdb 102. In some implementations, the machine learning applied to selectively choose model variables 106 may be considered a first machine learning algorithm. The compromised PII stored in the DWdb 102 may then be used to train predictive models 106 that can be used to predict fraud patterns from compromised PII profiles. For example, output from trained predictive models and model variable values may be used to generate Dark Web Risk Scores (DWRS) and cyber metrics for either a consumer in block 107 or a subpopulation in block 108 from the DWdb 102. In some implementations, generating DWRS and cyber metrics may be completed by a second machine learning algorithm. In some implementations, the Dark Web Risk Score represents the likelihood that a consumer's PII will be used for future fraud or future identity theft, such as, for example, an account take-over and fraudulent applications. For example, fraudsters commonly use compromised PII on online or paper applications, such as a personal line of credit, personal or business loans, requesting credit reports, and so forth. In some implementations, the Dark Web Risk Score is normalized to a predetermined range, such as between 0 and 1000, between 0 and 100, or low risk, moderate risk, and high risk, and/or the like. In some implementations, the score range may be broken down further to indicate the risk level, such as a letter grade A, B, C, D, F, etc., a qualitative descriptor, such as Poor, Fair, Good, Very Good, Excellent, etc., and/or the like. The score range may be interchangeable depending on the level of granularity that is needed to express not only the breadth of the risk potential for a consumer but also the break points at which a consumer's behavior would need to be altered to mitigate the risks based on the Dark Web Risk Score. For example, predetermined Dark Web Risk Score thresholds based on a distance metric may be used to establish high, medium, or low risk with respect to the mean Dark Web Risk Score of a subpopulation.

As described further herein, a number of different types of algorithms may be used by the machine learning component to generate the models. For example, certain implementations herein may use logistical regression models, decision trees, random forests, convolutional neural networks, deep networks, and/or the like. Additionally, other models are also possible, such as a linear regression model, a discrete choice model, and/or a generalized linear model. The machine learning algorithms can be configured to adaptively develop and update the models over time based on new inputs received by the machine learning component. For example, the models can be regenerated on a periodic basis as new received data is available to help keep the predictions in the model more accurate as the data is collected over time. Also, for example, the models can be regenerated based on configurations received from a device.

Some non-limiting examples of machine learning algorithms that can be used to generate and update the models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of received data may be analyzed to generate models without manual analysis or review by one or more people.

In block 109, cyber metrics from blocks 107 and 108 are merged and delivered to a consumer in an electronic Dark Web Risk Report (DWRR) in block 110. In some implementations, subsections of the Dark Web Risk Report may summarize a consumer's presence on the Dark Web and the contribution of a consumer's compromised PII to their DWRS. For example, explanations for the derivation of a consumer's DWRS may be essential to bring awareness to a consumer's online behavior and presence. The Dark Web Risk Report may provide factors that contributed to the calculation of the DWRS for a consumer to review and consider. A consumer's DWRS and determinants to the DWRS are indispensable tools for protecting a consumer's identity from being stolen. Consumers that utilizes information from a Dark Web Risk Report may enhance the security of their respective PII and mitigate the potential consequences of any compromised PII, such as, for example, by preventing and/or mitigating damage associated with future fraudulent use of their compromised PII. For example, if the system identifies a consumer with frequent, low complexity passwords found in the Dark Web, this identification may motivate the consumer to regularly change passwords to more secure (for example, higher complexity) passwords. In another example, a consumer may avoid risky websites and email domains based on information presented in the Dark Web Risk Report. In some implementations, an encrypted electronic data package may be generated that includes the data from the DWRR and may be formatted for network delivery. In some implementations, the encrypted electronic data package may be configured to be delivered to an application programming interface (API) associate with a consumer device, such as an API on an application running on the consumer device. A consumer device may include, for example, a personal computer, laptop, desktop computer, phone, smart phone, tablet, smart watch, and/or the like. In other implementations, the encrypted electronic data package may be configured to deliver to a messaging server, such as, for example, via an SMS messaging service, an electronic email service, and/or the like.

B. Machine Learning and Predictive Modeling

FIGS. 1-4 described herein include further example implementations with respect to machine learning and predictive modeling. In some implementations, the predictive modeling processing can begin with collecting data from multiple data sources that are coalesced into raw training data by matching portions of a consumer's PII between the multiple data sources. For example, the predictive modeling process may match a portion of a consumer's PII, such as for example, the consumer's name, credit card number, and SSN between the multiple data sources. In some implementations, machine learning variables are generated and selected based on multiple machine learning methods. In some implementations, the DWdb 102 contains PII as well as a listing of websites from which exposed PII was found. A website category may be determined for each website and a risk variable for each website category may be calculated (for example, the process described with reference to FIG. 3). In some implementations, variables strongly associated with compromised PII and thought to be good indicators of fraud are selected by machine learning methods. In some implementations, PII profiles in the training examples may be labeled to distinguish fraud from non-fraud cases. Training examples with fraud or non-fraud labels may then be used as inputs to train machine learning and artificial intelligence models. For example, the models may be trained to detect fraud signatures in the training data. The trained models may then be used to predict fraud signatures from new examples, such as, for example, a consumer's compromised PII data. In some implementations, the output of each predictive model may serve as the basis for calculating a Dark Web Risk Score as described further herein. Model variable values selected by machine learning can serve as a basis for a consumer's Dark Web Risk metrics presented in subsections of a Dark Web Risk Report as described further herein.

1. Raw Training Data

Figure 2:
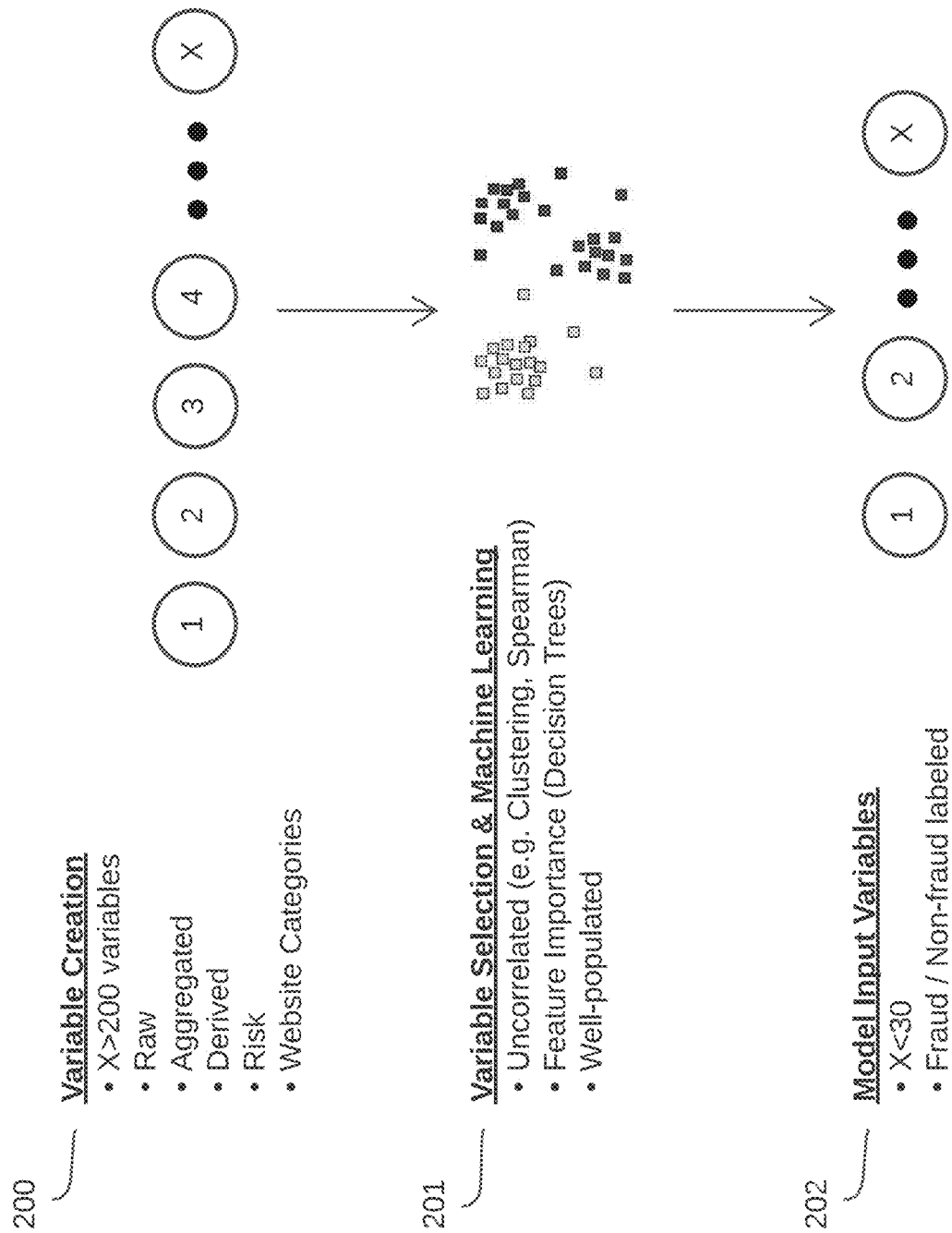
FIG. 2 is a diagram illustrating an implementation of a process of creating model variables and using machine learning to select variables to be used in a model.

FIG. 2 illustrates an example implementation for generating raw training data, for example, as implemented by a Dark Web Risk System. One source of PII may come from the DWdb 102, which may include an extensive collection of compromised PII from one or more Internet-accessible sources, such as, for example, the Dark Web, Deep Web, and/or Surface Web. As described with reference to FIG. 1, compromised PII from DWdb 102 may be matched in block 103 to PII from confirmed fraud cases 104. In some cases, a single piece of PII, such as, for example, a SSN, may be a sufficient match in block 103. Some pieces of PII, however, may require combining information to accurately identify an individual. For example, the system may require a name, address, and DOB to accurately identify an individual. In some implementations, CFNF data 104 may be comprised of both confirmed fraudulent and legitimate activity involving PII. For example, CFNF data 104 may include identity theft cases, such as, for example, account take-overs and compromised PII on financial applications. However, the methods described herein may be capable of using any representation for other types of fraud involving PII. In some implementations, the predictive model development may be improved when the raw training data 200 from CFNF 104 transactions and DWdb PII 102 comprises data collected over a significant period of time. For example, a significant period of time may be one month, two months, three months, six months, one year, two years, and/or the like. In some implementations, the longer the time period, the better the predictive model development will be. In some implementations, raw training data 200 may be limited by fraud transaction dates in CFNF data 104 that align with DWdb exposure dates, or the date that PII was found on the Dark Web. For example, in some implementations, CFNF data 104 that indicates a fraud transaction that occurred before a DWdb 102 exposure date may not be include in the raw training data 200. In some implementations, even if the PII was found on the Dark Web after the fraud transaction, it may still be included in the raw training data 200 if there is an indication that the DWdb 102 exposure date was prior to the fraud transaction date.

2. Model Variable Creation and Selection

FIG. 2 is a diagram illustrating an implementation of a process of creating model variables and using machine learning to select variables to be used in a model, for example, a first predictive model, that may be implement by, for example, a Dark Web Risk System. In some implementations, a first machine learning algorithm may be used to create a predictive model that includes selecting variables that are used in a second machine learning algorithm to create DWRSs and recommendations for a consumer. In some implementations, only one machine learning algorithm may be used to select variables and generate DWRSs and recommendations. It is recognized that there are other implementations of the process which may exclude some of the blocks/steps shown and/or may include additional blocks/steps not shown. Additionally, the block/steps discussed may be combined, separated into sub-blocks/sub-steps, and/or rearranged to be completed in a different order and/or in parallel.

In block 200, once a consumer's PII 100 are matched to the DWdb 102 or CFNF data 104 (for example, in block 103 of FIG. 1), multiple variables can be created by one or more machine learning algorithms, for example, a first machine learning algorithm (for example, in block 105 in FIG. 1). Multiple variables may include, tens, hundreds, thousands, hundreds of thousands, millions, tens of millions, and/or the like. The variables may include raw variables (for example, marital status, number of children, rent/own home, and/or the like), aggregated variables (for example, counts, indicator flags, PII being available from a particular Internet-available source and/or being exposed, number of instances of using the same password across multiple services or websites, days since breach, and/or the like), derived variables (for example, password complexity, most used email domain, clear text versus encrypted passwords, and/or the like), risk level variables (for example, proportional to the ratio of fraud) associated with Dark Web Database attributes, website category variables (for example, described herein with reference to FIG. 3), website category associated risk level variables, and/or the like. A variable is raw, for example, if the value of the variable may be used unaltered, such as, for example, "number of children". A variable may be considered an aggregated variables if, for example, the variable represents information that is summed or flagged, such as, for example, the total number of times an email was exposed, whether a consumer's SSN was ever exposed (for example, an indicator flag), and/or the like. Derived variables may include, for example, variables that are calculated from raw or derived variable values. A velocity variable may, for example, describe a rate at which PII elements are exposed or compromised. For example, a velocity variable may be the number of times a consumer's password was found in the Dark Web within 6 months of a reported fraud. A risk variable may, for example, be proportional to a fraction of an attribute, for example a piece or portion of PII or other attributes in a DWdb 102 that was used fraudulently.

In block 200, many variables, for example, tens, hundreds, thousands, millions, and/or the like may be created. However, not all variables may be useful for capturing a specific pattern in the data, such as, for example, a fraud signature.

In block 201, to reduce the number of variables to only those strongly associated with fraud and non-fraud patterns, the systems and methods may apply a first machine learning algorithm. For example, the systems and methods may use a concept of variable or feature importance from decision tree algorithms (for example, see block 401a in FIG. 4). A decision tree, for example, is a tree structure that is made up of branches, internal nodes, and leaf or terminal nodes. Data is split at each node into child nodes. Many factors decide a node's split behavior, but a node may be split by a variable's values and a node threshold value. The decision tree may attempt to cleanly split the training examples into leaf nodes and the purity of each leaf node may be calculated. In some implementations, it may be advantageous for a leaf node to be pure and/or have a single class (for example, either fraud or non-fraud cases). For each model variable, a variable's importance (for example, how much impact the variable has on the correctness of the resulting output of the model) may be determined by the mean decrease in node impurity. In some implementations, to more accurately assess feature importance, decision tree ensembles may be trained by, but not limited to, 10-fold cross-validation. Correlated variables, for example, may be determined by clustering cases by variable values. For example, the variable with the highest feature importance score from each cluster is retained for modeling. In some implementations, sparsely populated variables can be removed.

In some implementations, other machine learning methods may be used to reduce the number of variable using variable or feature importance such as, for example, logistical regression models, decision trees, random forests, convolutional neural networks, deep networks, and/or the like.

In block 202, a variable indicating PII associated with fraud and non-fraud activity from the CFNF cases may be added to the final culled, filtered, or reduced set of variables. In some implementations, the final set of variables may include less than 10 variables, less than 20 variables, less than 30 variables, less than 50 variables, less than 100 variables, and/or the like. The resulting predictive variables, for example, may be a fraction of the initial set of available variables determined. In some implementations, it may be preferable that the final set of variables includes less than 30 variables. These final set of variables may then be used to train machine learning and artificial intelligence models. In some implementations, a trained model's variables or variable values (e.g., coefficients or weightings) are also used to populate sections of the Dark Web Risk Report.

In one example, one of a plurality of final variables used by the system to generate DWRSs may be the strength of an exposed consumer password found on, for example, the dark web. For example, the system may determine that a low complexity password, such as, for example, "access123", exposed on the dark web indicates a high likelihood of future fraud for a consumer as compared to a high complexity password, such as, for example, "8>;QGFR=nekwE/4-B/p3", exposed on the dark web. This determination and variable selection may account for the fact that consumers who use low complexity passwords are more likely to reuse the same passwords or simple variations across multiple accounts while consumers who use high complexity passwords are less likely to reuse the same passwords or simple variations across multiple accounts, often because high complexity passwords are generated by a system and don't relate to the consumer in any way. Additionally, because passwords are easier to guess or determine through brute force when a portion of the password is known, fraudsters may be more likely to target consumers who are known to use low complexity passwords. If the system determines this correlation based on the comparison and matching of the DWdb 102 and the CFNF cases 104, a variable based on exposed password complexity may be generated and/or selected for the final culled variable list that is used in the resulting predictive model.

In another example, one of a plurality of final variables used by the system to generate DWRSs may be the time of exposure of an element of PII. For example, the system may determine that the amount of time a password has been exposed on, for example, the dark web, may a good indicator of future fraudulent activity. This determination and variable selection may account for the fact that the longer a PII element has been exposed on the internet, the more people who are likely to have seen it. For example, a password that was compromised one day ago may be less likely to indicate future fraudulent activity than a password that was exposed ten days ago. If the system determines this correlation based on the comparison and matching of the DWdb 102 and the CFNF cases 104, a variable based on exposed PII time may be generated and/or selected for the final culled variable list that is used in the resulting predictive model.

In another example, one of a plurality of final variables used by the system to generate DWRSs may be the number of times a compromised PII element showed up in the DWdb 102. Like the prior examples, a number of exposures of a PII element, for example, a SSN, found on the internet may be determined by the machine learning algorithm to be correlated to future fraudulent activity. Because many sites on the dark web are not indexed, the number of times and/or number of different locations a compromised PII element is found on the internet may indicate that more people, including future fraudsters, viewed the compromised PII, which increases the likelihood that the compromised PII may be used for fraudulent purposes.

In some implementations, the final set of variables may include/relate to factors that a consumer can control (for example, "actionable") and factors that a consumer cannot control (for example, "not actionable"). For example, a consumer may be able to control their password complexity (actionable) but cannot control the amount of time a certain compromised PII element has been exposed for (not actionable). Additionally, there may some situations where a consumer may be able to control only an aspect of a particular factor. For example, whether a service the consumer uses stores passwords as clear text with no encryption is not something in the control of the consumer (not actionable). However, the consumer can close their account on the less-secure service using no encryption (actionable). In some implementations, actionable factors may result in a consumer being able to cancel or modify PII elements, such as, for example, changing a password, canceling an account, changing a username, changing a phone number, canceling a credit card, and/or the like. Conversely, a consumer may have a harder time or is unable to control/change for example, their address, SSN, DOB, and/or the like. As described further herein, in some implementations, the system accounts for variables that a consumer can control and may provide specific recommendations and/or tools to help reduce a consumer's exposure and/or decrease the likelihood of fraud based on one or more compromised PII elements.

In some implementations, the system may continually generate new variables and/or continually update the final set of variables used in the future modelling, such as, for example, by a second machine learning algorithm to generate DWRSs and consumer recommendations. As described herein, and in some implementations, one or both of the DWdb 102 and the CFNF cases 104 are being continually updated. By updating these databases, new information regarding new PII exposed on the internet and its correlation to new CFNF cases 104 may have an impact on the importance of one or more variables or may require the generation of a new variable and/or combined variable. As more data is input into the system, for example, into a first machine learning algorithm, the final set of variables used in future models may adapt to changing trends in fraud. For example, criminals and fraudsters may implement new methods of perpetrating fraud using compromised PII which may have an impact on which variables are the best predictors of future fraud. In another example, new technological advancements may enhance or reduce the likelihood of fraud based on a certain type of compromised PII. By continually generating new variables and new final culled variables, the system ensures that the model predictions remain accurate and that the DWRSs and provided recommendations are up to date, relevant, and/or actionable for consumers. Similarly, by continually updated the DWdb 102, the system can provide up to date information regarding which PII elements of a consumer are actually exposed on the internet. This information is invaluable in predicting and preventing future fraud.

In some implementations, based at least in part on the updated data in the DWdb 102 and the CFNF cases 104, the featured importance or variable weight as determined and applied by the machine learning algorithms may be continually adjusted. In some implementations, GINI coefficients may be used as the variable weights and/or featured importance. For example, a threshold or threshold value can be used to determine a number of variables in the resulting/final set of culled variables. For instance, the threshold can be preconfigured and set to result in 30 variables, or 50 variables, or the like.

3. Website Domain Categories and Risk

Figure 3:
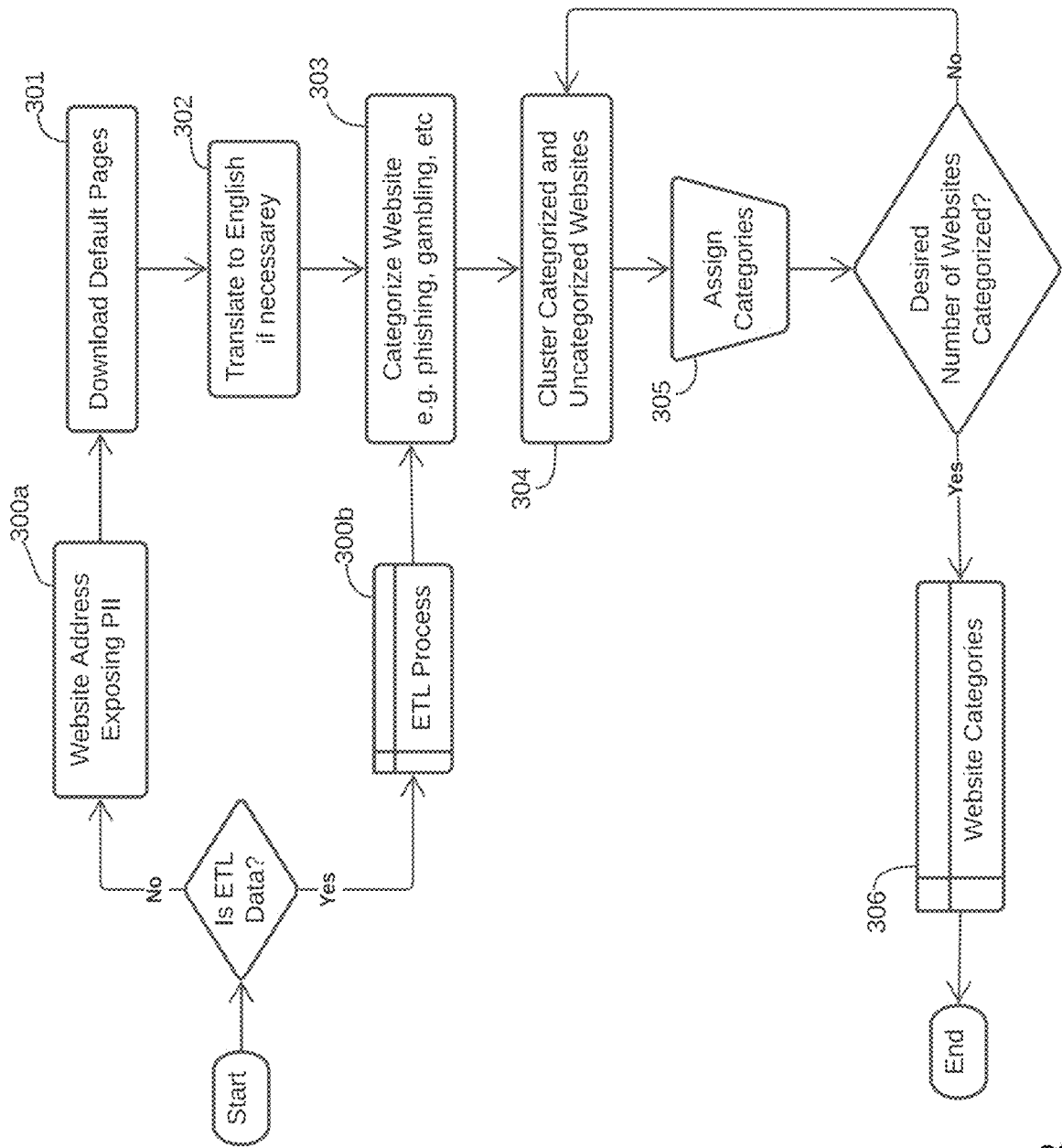
FIG. 3 is a block diagram illustrating an implementation of a process of assigning website categories.

FIG. 3 is a block diagram illustrating an implementation of a process of assigning website categories to websites that exposed PII, for example, as implemented by a Dark Web Risk System. It is recognized that there are other implementations of the process which may exclude some of the blocks/steps shown and/or may include additional blocks/steps not shown. Additionally, the block/steps discussed may be combined, separated into sub-blocks/sub-steps, and/or rearranged to be completed in a different order and/or in parallel. There are many sources and compromise types from which PII are exposed at 300*a*, such as, for examples, breaches, social media sites, phishing, malware, ransomware, identity theft chat rooms, and/or the like. In some implementations, a categorization engine may be implemented in the system that is flexible enough that any future data sources can be added to the system by adding an ETL (extract, transform, and load) 300*b* pre-processor to normalize the data for the categorization engine.

Once the process has begun, the system may first determine whether an ETL Data process is required. If the website being categorized does not require an ETL process, the flow may proceed to block 300*a*. If the system determines that the website being categorized requires an ETL process, the flow may proceed to block 300*b*. An ETL process as referred to herein may include the process used by the system to extract data from a variety of sources, transform the data into a format useable by the system, and then loan the data into the system so it can be further utilized by the system.

In some implementations, the extraction process may include a full extraction, partial extraction without update notification, and/or a partial extraction with an update notification. The target sources may include business systems, APIs, sensor data, marketing tools, transaction databases, and/or the like. In some implementations, there may be one or more validation processes completed during the extraction process, such as, for example, reconciling records within the source data, ensuring no spam or unwanted data is loaded, data type checks, removal of duplicated and/or fragmented data, and/or the like. After extraction, the transformation process may be completed, and generally includes transforming the raw extracted data into a format used by the system. For example, the transformation process may include data cleansing and/or mapping prior to transformation. Similar to the extraction process, a series of validations may also be completed during the transformation process, such as, for example, filtering, data standardization using rules and lookup tables, character set conversion, encoding handling, unit conversion, data threshold validation checks, such as, for example, ensuring that the correct number of digits are in a compromised SSN, the correct number of digits are in a compromised credit card number, and/or the like, cleaning, column transformation, transposing rows and columns, merging data using lookups, and/or the like. Following the transformation process, the loading process may be completed and may involve a process of writing converted data from a staging area into one or more target databases. In some implementations, the loading process may involve the creation of one or more databases. In some implementations, one or more loading process may be used, such as, for example, initial loading, incremental loading, full refresh, and/or the like. The loading process may also include a load verification step that may include, for example, ensuring the key field data is not missing or null, test modeling views based on target tables, one or more checks on combined/calculated values, and/or the like. Following the ETL process at 300*b*, the flow may proceed to block 303.

In block 301, a website's default page describing the site's content may be downloaded. In some implementations, the website's default page may be determined from website address exposing PII block 300*a*. Next, in block 302, website text may be translated to English if, for example, the website text includes foreign language text, such as, for example, German, Mandarin, French, and/or the like. In some implementations, the translation may be completed using translators and/or API services. In some implementations, the system may implement object character recognition (OCR) to converts website images containing written and/or printed text into a machine-readable format.

In block 303, one or more categories and sub-categories may be assigned to a website using, for example a taxonomy, such as, for example DMOZ-related (Directory Mozilla or "The Directory of the Web) taxonomies and/or the like. The categories may include, for example, phishing, gambling, social media, and/or the like.

In block 304, to facilitate the categorization of as many websites as possible, a machine learning method called "clustering" may be used. For example, a distance metric can be calculated for every pair of data points, each of which is a numerical representation of text from a website's default page. The data points that are close to one another may be grouped into clusters. In some implementations, websites that were not assigned a category may be clustered by, for example, distance between numerical representations, for those websites with assigned categories and websites that were not categorized.

In block 305, each cluster may be curated manually to assign a category to some or all of the websites without an already assigned category. In some implementations, the category of the website may be determined and selected based on the assigned category of the other websites in the same cluster. For example, categories may include: Computers, Gaming, Adult, News, Online Storage, and/or the like. In some implementations, outside of the categorization system, the DWdb 102 may capture websites that have been breached, websites that harbor malware, data that was obtained by a hacker or hacker group, websites used to store PII from phishing or keylogging and/or the like. Subsequently, in some implementations, the risk of each website category may be calculated using CFNF data 104. In some implementations, risk variables are calculated for the top-level of the taxonomy structure, and for as many lower levels or subcategories that pass the variable selection criteria.

Following block 305, the system may determine whether the desired number of websites have been categorized. If the system determines that a threshold has not been met, the system may return to block 304 to facilitate the categorization of further websites.

4. Machine Learning and Artificial Intelligence Modeling

Figure 4:
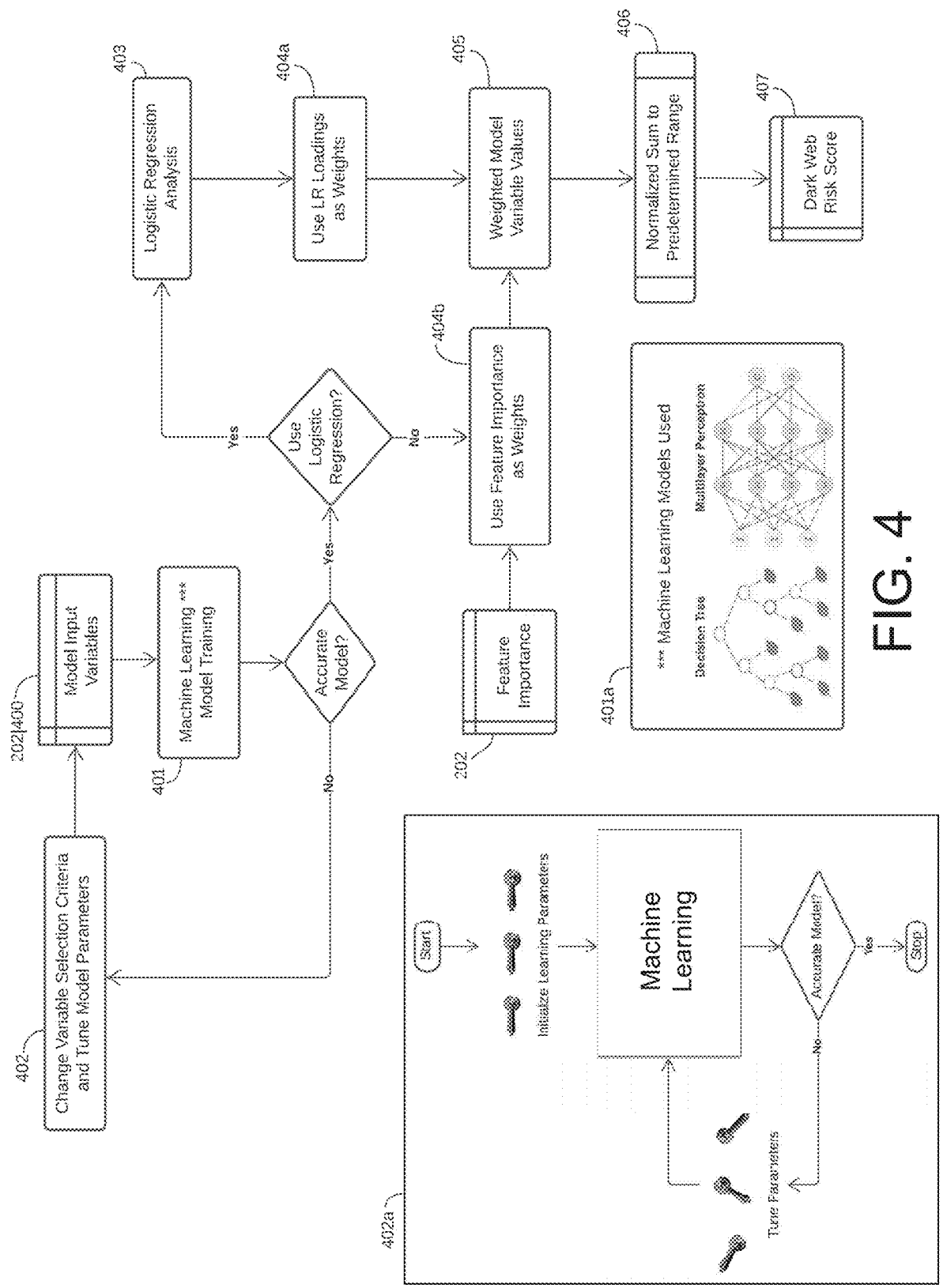
FIG. 4 is a block diagram illustrating an implementation of a process of training predictive models and generating a Dark Web Risk Score from PII.

FIG. 4 is a block diagram illustrating an implementation of a process of training predictive models 400|401|402 and generating a Dark Web Risk Score from PII, for example, as implemented by a Dark Web Risk System. It is recognized that there are other implementations of the process which may exclude some of the blocks/steps shown and/or may include additional blocks/steps not shown. Additionally, the block/steps discussed may be combined, separated into sub-blocks/sub-steps, and/or rearranged to be completed in a different order and/or in parallel. In some implementations, selected model variables are used as an input to train machine learning models in block 401, specifically ensemble decision trees and multilayer perceptron models (MLP) (for example, 401*a*). A decision tree, as described previously herein with reference to FIG. 2 for example, attempts to cleanly partition the input space into a binary class. In some implementations, the binary classes may be fraud and non-fraud examples. In some implementations, a voting scheme with multiple trained decision trees, or Ensemble Decision Trees (EDT), may be used.

As shown in block 402*a*, the process of training a predictive model may be an iterative process. Generally, the process may begin by initializing the learning parameters for the system. After the initializing is complete, the machine learning models, such as, for example, 401*a*, may be implemented. After the machine learning model generates a predictive model, the system may assess whether the machine learning generated an accurate model. In some implementations, a user may run a series of tests cases through the predictive model to determine if there is an accurate model generated by the system. If it is determined that the model is not sufficiently accurate, the system and/or the user may tune the parameters. The tuned parameters may then be reimplemented into the machine learning process and the machine learning model may generate an updated predictive model. The process of assessing the model is then iteratively repeated until a sufficiently accurate model is generated. In some implementations, the process shown in block 402*a* may be incorporated into the other processes shown in FIG. 4.

Similar to logistic regression, a perceptron is a weighted sum of inputs that represents a linear relationship (for example, if using a step function) between dependent and independent variables. In some implementations, model variables may be used as an input to train a perceptron by supervised learning that, similar to logistic regression, is accomplished by adjusting connection weights by a loss or error. In some implementations, new cases or examples may be classified using a perceptron with trained weights. A perceptron, however, has many limitations due to its linearity. In some implementations, to avoid this limitation, a logistic function can be used, instead of a step function. In some implementations, the system may also use two or more layered, interconnected perceptrons, and/or a multilayer perceptron (MLP) (for example, 401*a*), to create a non-linear classifier. MLPs are known to be more accurate and generalize better than statistical models, such as logistic regression, however, due to their complexity, MLP's are more computationally expensive to train. In some implementations, both EDTs and MLPs are trained using fraud and non-fraud labels from the confirmed fraud cases as the binary class.

Returning to FIG. 4, as previously described, the process of training a predictive model for generating a Dark Web Risk Score from PII may begin at block 400, when the model input variables are input into the system. In some implementations, inputting the model variables may be referred to as initializing the learning parameters. In some implementations, the variables input may comprise the culled or final set of variables generated in the process discussed with reference to FIG. 2. For example, in block 202, a final set of variables was generated that may be input into the system to generate a predictive model.

In block 401, the input variables are used to train the machine learning system to generate a predictive model as discussed with reference to blocks 401a and 402a. Following the completion of an iteration of the predictive model, the predictive model may be assessed to determine whether the machine learning generated an accurate model. In some implementations, a user may run a series of tests cases through the predictive model to determine if there is an accurate model generated by the system. If it is determined that the model is not sufficiently accurate, the system and/or the user may tune the parameters. For example, the process may proceed to block 402.

In block 402, each model can be configured by adjusting the model's hyperparameters. Hyperparameters are analogous to knobs that can be turned for each model (for example, 402a). For example, altering the values of hyperparameters can affect a model's accuracy and may be tuned to find parameter values that improve the model's predictive power. In addition to parameter tuning, in some implementations, different criteria may be used for selecting variables, such as, for example, increasing the threshold of feature importance and/or the like. In some implementations, the predictive power of trained models may be assessed by performance metrics, for example, area under the ROC curve (AUC), F1 score, sensitivity, specificity, and/or the like. Once the model's parameters have been tuned, the variable selection criteria changed, and/or the like in block 402, the updated model variable may be input into the machine learning system to generate a new predictive model at block 401. In some implementations, training may be terminated for a model with acceptable accuracy or an accuracy within a specified threshold and/or range. In some implementations, an odd number of the best performing models can be used to classify new cases or examples by majority-rule if both MLP and EDT are used, for example. In some cases, a single best performing model may be used for classification. In some implementations, ensemble decision trees and multilayer perceptrons may capture different aspects of the training data, such as variance, noise, the underlying distributions of model variables, and/or the like. For this reason, the utility of using either a single or multiple EDTs, MLPs, and/or a combination thereof may be assessed.

Once it is determined that the predictive model performs with acceptable accuracy or with an accuracy within a specified threshold and/or range, the process may continue. Next the system or a user may determine whether to use a logistic regression. In some implementations of the system, a logistic regression may be appropriate for generating the DWRS, while in other implementations of the system, using feature importance as weights may be more appropriate. If a logistic regression will be used, the process may proceed to block 403, where a logistic regression analysis may be completed. As described herein, a logistic regression analysis may include fitting independent variables based on dependent variables using a logistic function. Following the completion of the logistic regression analysis at block 403, the system may proceed to block 404a, where the system may use logistic regression loading as weights. In some implementations, the weights are determined based on the predictive model's analysis of the test cases, such as, for example, the subpopulation cases.

Returning to the completion of the predictive model, if the system and/or user determines that logistic regression should not be used, the process may proceed to block 404b. Logistic regression may not be used if, for example, it is determined that the number of observations is less than the number of features, as this may lead to overfitting. In some implementations, it may be determined that using feature importance as weights produces a more accurate DWRS, such that a user or the system determines the logistic regression should not be used. At block 404b, the system may use feature importance as weights. The feature importance may have been determined at block 202 as described with reference to FIG. 2 and may be input into the system. For example, the system may have determined feature importance during the test cases using the confirmed fraud and non-fraud data. The feature importance can then be used to assign a weighted value to each variable being used.

After determining which weighting system to use at block 404a or 404b, the process may proceed to block 405, where the weighted model variable values are generated.

In some implementations, the process may proceed to block 406, where the generated DWRS, or mean DWRS, may be normalized to a value between a predetermined range 406, such as, for example, between 0 and 1000, 0 to 100, 0 to 50, and/or the like. In some implementations, normalizing the sum to a predetermined range may provide for better resolution. In block 407, the process may be completed when the system generates a Dark Web Risk Score, which is described further herein.

In some implementations, the process of generating a first predictive model comprises selecting model variables and determining and applying variable or feature importance. For example, generating the first predictive model may be completed by a first machine learning algorithm. Inputs into the first machine learning algorithm may include data from the DWdb 102 and data from the CFNF cases 104. Based on these inputs, a first set of variables may be generated by the comparison and matching of data in DWdb 102 and CFNF 104. Generally, the first machine learning algorithm may then apply variable or feature importance to the first set of variables to, for example, generate a feature importance score for each variable in the first set of variables. The first machine learning algorithm may then determine a second set of variables (e.g., a subset of the first set of variables) based at least in part on the application of variable or features importance. In some implementations, the second set of variables includes fewer variables than the first set of variables. In some implementations, determining the second set of variables includes determining all variables of the first set of variables that comprise a feature importance score that meets a preconfigured threshold score that indicates a threshold predictive value for the first predictive model. Outputs from the first machine learning algorithm may include a first predictive model that comprises or is based on the second set of variables (also referred to herein as the final set of variables). For example, the output can include an equation with a number of variables and coefficients associated with each variable provide weights to each of the variables.

Additionally, in some implementations, the first predictive model, including a final weighted set of variables (e.g., the equation output from the first machine learning model), may then be input into a second machine learning algorithm along with specific consumer PII 100 data and data from the DWdb 102. For example, in some implementations, consumer PII 100 that matches compromised PII included in the DWdb 102 may be input into the second machine learning algorithm in order to calculate specific consumer variables, a consumer DWRS, and recommendations tailored to the specific consumer (e.g., actionable recommendations). The first machine learning algorithm may generate new sets of final variables and/or new variable weights frequently or infrequently, while the second machine learning algorithm generates consumer specific variables, DWRSs, and recommendations that are dependent on the specific consumer requesting the DWRR continuously as required by the system. For example the system may monitor actions taken by the consumer to determine if a password or account has been changes, then update the recommendations, DWRS, and/or DWRR. As described further herein, once the DWRS and recommendations are generated by the second machine learning algorithm, a DWRR, including the DWRS and recommendations, may be transmitted to a consumer device for display on the user interface of the consumer device.

In some implementations, recommendations generated by the system may include, for example, suggesting a consumer close an account, change a password, change a username, change or remove PII associated with an account, such as, for example, changing an authenticating phone number associated with an account, change multi-factor authentication settings, change general settings on an account, and/or the like. Generally, as described further herein, and in some implementations, the recommendations generated by the system include recommended actions that a consumer may take in order to improve their DWRS and/or reduce a likelihood of future fraudulent activity with respect to the consumer's PII. Also, for example, the recommendations generated by the system may be proactive (for example, to preempt or reduce the risk of fraud changing a low-complexity password prior to exposure/breach) or reactive (for example, to preempt or reduce the risk of fraud changing a password that has been exposed on the dark web). In some implementations, once a set of recommendations has been provided to the consumer by the system, the system may monitor the status of the recommendations, such as, for example, determining whether a consumer changed their flagged password, updated PII associated with an account, installed a password manager, and/or the like. Based on the monitoring, the system may continually generate an updated DWRS for the consumer and further recommendations, such as, a second set of recommendations that are updated based on one or more completed actions in the first set of recommendations. The cycle of generating a DWRR that includes a DWRS, and recommendations is continuous as new compromised PII is collected for the DWdb 102, new variables or new weightings are created by the first machine learning algorithm, and/or the like. For example, after a consumer completes one or more of the second set of recommendations, and/or new consumer PII is found to be comprised, the system will generate further updated DWRSs and further recommendations. In this way, the consumer can be confident that they are managing the risk associated with their compromised PII and proactively preventing future fraudulent events by having updated knowledge of their personal exposure and updated recommendations to implement.

C. Dark Web Risk Score

Figure 6A:
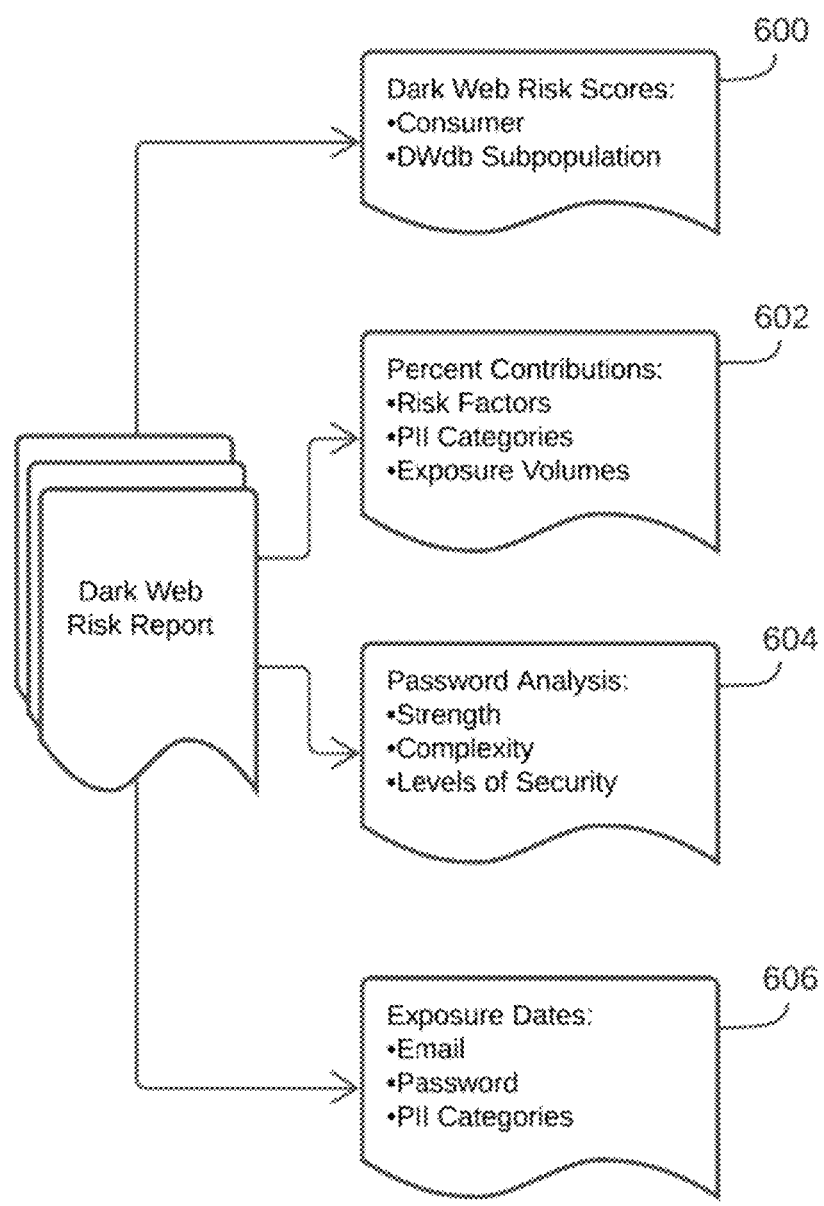
FIG. 6A is a block diagram illustrating an implementation of a Dark Web Risk Report.

FIG. 6A is a block diagram illustrating an implementation of a Dark Web Risk Report (DWRR). As shown in FIG. 6A, the DWRR may include a variety of information. In some implementations the DWRR may include a DWRS section 600, a percent contributions section 602, a password analysis section 604, an exposure dates section 606, and/or additional sections.

The DWRS 600 section may include, for example, an individual DWRS and a DWRS as determined from a DWdb subpopulation as described herein. The percent contributions section 602 may include, for example, one or more risk factors, PII categories, exposure volumes, and/or the like. The password analysis section 604 may include, for example, an analysis of the strength of the consumer's passwords, an analysis of the complexity of a consumer's passwords, a levels of security analysis, and/or the like. The exposure dates section 606 may include the actual and/or suspected exposure date for any of the consumer's PII as determined by the system, such as for example, the exposure dates of one or more of the consumer's email, passwords, and other PII categories as described herein.

Figure 6B:
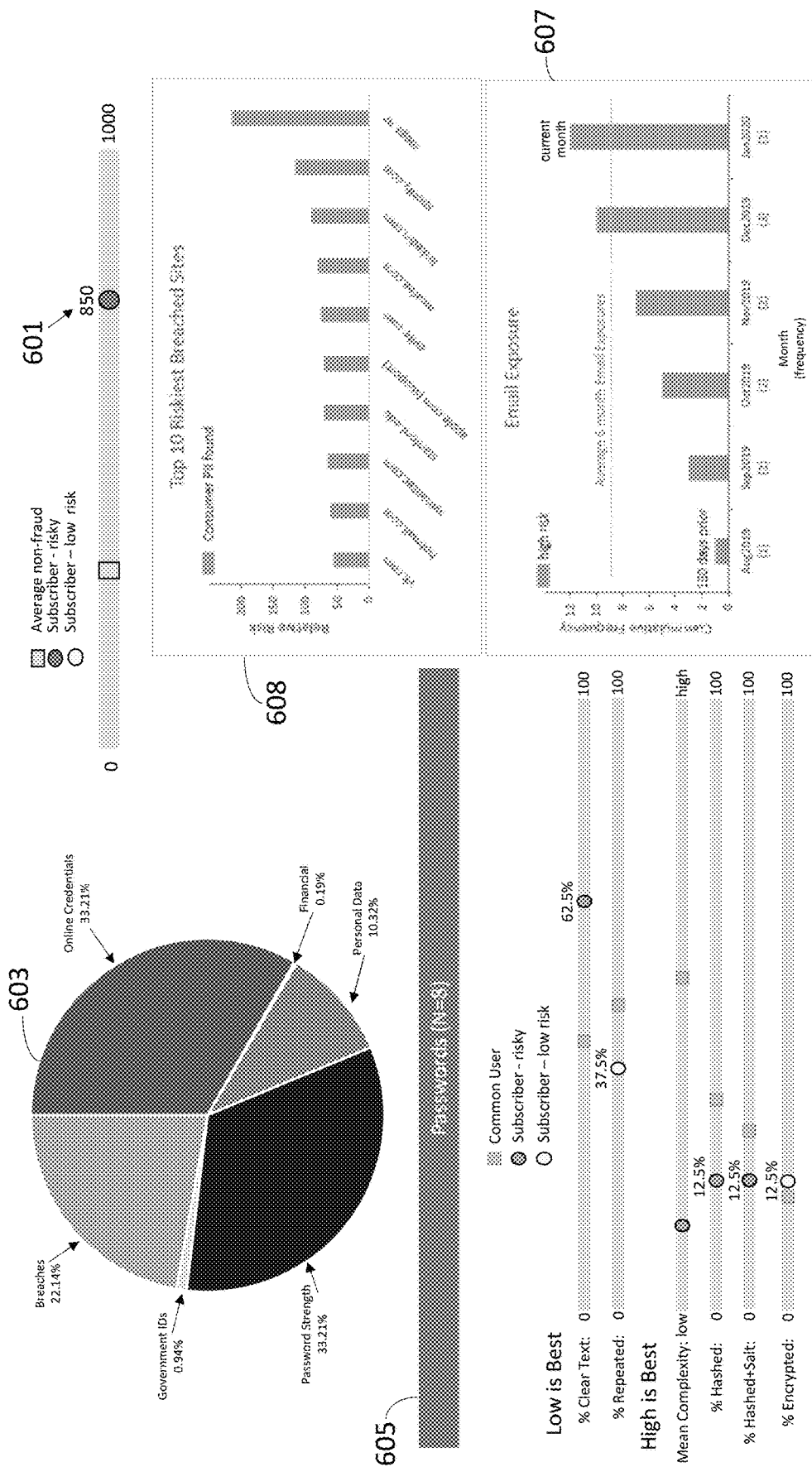
FIG. 6B illustrates an implementation of a user interface showing portions of a Dark Web Risk Report.

FIG. 6B illustrates an implementation of a user interface showing portions of a DWRR, for example, as implemented by a Dark Web Risk System. In some implementations, the DWRR risk report may include an indication of a DWRS 601, an indication of the percent contribution of a PII category to a consumer's risk score 603, an indication of a password analysis 605, an indication of PII exposure 607, an indication of website domain risk 608, and/or any other relevant information that may benefit a consumer as described herein.

The indication of a DWRS 601 may be presented in any suitable format, with the goal of informing a consumer of their potential PII exposure. In some implementations, the DWRS 601 may include an indication/comparison of the consumer's DWRS and another metric, such as, for example, a subpopulation DWRS as described herein. For example, in some implementations, both the consumer and subpopulation Dark Web Risk Scores 600 are plotted on a number line as shown in 601 in FIG. 6B for a visual comparison between two scores. For example, each score in 601 may be represented with its own geometric shape. In some implementations, the consumer's DWRS may be color-coded to indicate a consumer's Dark Web risk level compared to a DWdb subpopulation. A consumer's Dark Web Risk Score may be colored red, for example, if the consumer's score is higher, by a distance metric, than the score from the DWdb subpopulation of PII used for legitimate transactions. Similar visualizations may also be used to present other risk factors, such as, for example, a consumer's email domain, breached websites containing a consumer's PII, breach website sector, password complexity, and/or the like.

The indication of the percent contribution of a PII category to a consumer's risk score 603 may provide a visual indication of which aspects of the consumer's PII contributed to the consumer's risk score. As described further herein, elements of a consumer's PII may be grouped into one or more categories and the information included may enable a consumer to determine which category poses the biggest threat to the protection of the consumer's PII. In some implementations, the DWRR may include a legend or other indication of which elements of a consumer's PII is included in each category. In some implementations, the information may be presented as a Bar graph/chart, pie chart, line graph/chart, histogram, area chart, dot graph/plot, scatter plot, bubble chart, and/or the like.

The indication of PII exposure 607, also referred to herein as dark web exposure, may provide a visual indication of, for example, reporting dates and volumes of a consumer's compromised PII. For example, the DWRR may include an indication of PII exposure 607 for one or more of each element of the consumer PII analyzed by the system. For example, there may be an indication for one or more of: full or partial name, home address, work address, email address, social security number (SSN), passport number, driver's license number, credit card information/number, debit card information/number, date of birth (DOB), telephone number, cell phone number, owned properties, vehicle identification number, login details, device IDS, device serial numbers, and/or the like. In some implementations, only PII elements assessed as having an exposure risk may be included in the report.

The indication of website domain risk 608, also referred to herein as website domain risk, may include a visual indication of, for example, the websites determined by the system to pose the greatest risk to the consumer's PII. For example, the DWRR may include a visual indication of the top 2, 5, 10, 15, 20, 50 and/or the like riskiest websites. This information may be used to inform the consumer of where their greatest risk may be and may encourage a consumer to avoid websites or modify their use of websites that were determined by the system to pose a risk.

In some implementations, an objective of the DWRR is to summarize a consumer's Dark Web hygiene and/or habits as a Dark Web Risk Score. For example, Dark Web hygiene or habits may refer to the presence and security of an individual's PII that have and/or may have been exposed on the Dark Web. In contrast to risk scores based on mathematical heuristics, the Dark Web Risk Score may be based on variable values from the best performing model or models. For example, in some implementations, the output of each model represents a likelihood that a consumer's PII will be used for future fraudulent activity based on compromised PII and fraud and non-fraud labels from CFNF data 104. In some implementations, a Dark Web Risk Score that is high in value, for example, may indicate a higher risk that compromised PII will be used for fraudulent activity than lower scores. A Dark Web Risk Score that is low in value, for example, may indicate a lower risk that compromised PII will be used for fraudulent activity than higher scores. In another implementation, the scale may be switched. For example, a Dark Web Risk Score that is low in value, for example, may indicate a higher risk that compromised PII will be used for fraudulent activity than lower scores. A Dark Web Risk Score that is high in value, for example, may indicate a lower risk that compromised PII will be used for fraudulent activity than higher scores.

In some implementations, another objective of the DWRR may be to guide a consumer's online behavior in a manner that secures an individual's PII. For example, variables selected by machine learning may be reported as cyber hygiene metrics in sections of the Dark Web Risk Report. In some implementations, the DWRR may include a password analysis section which may, for example, outline the security and number of exposures of an individual's passwords that were discovered on the Web, especially the Dark Web. In some implementations, low complexity passwords and a high DWRS should alert the consumer to use more complex passwords. Conversely, in some implementations, a consumer may be put at ease to see an historical use of complex password and a low Dark Web Risk Score reported on their Dark Web Risk Report.

1. Dark Web Risk Score & Dark Web Risk Metrics

Figure 5:
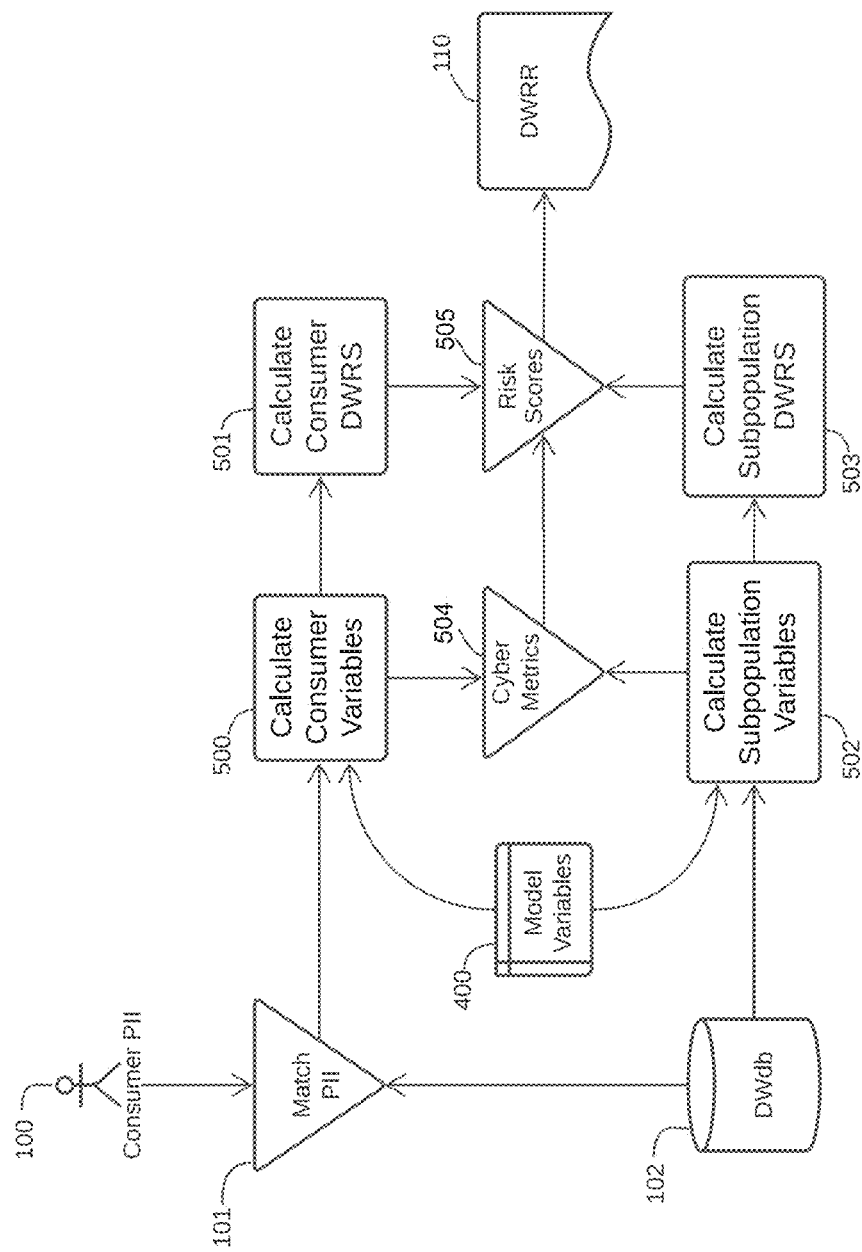
FIG. 5 is a block diagram illustrating an implementation of a process of generating a Dark Web Risk Report.

FIGS. 4 and 5 are example implementations illustrating the generation of a Dark Web Risk Score after model training. For example, the model variables from a model with high accuracy 400 that best captures information from the training data. In some implementations, the Dark Web Risk Score 407 is proportional to the weighted sum of model variable values 400 from the model with best accuracy. In some implementations, the weights may come from a wide variety of sources, but are not limited to analyses such as, coefficients 404a from logistic regression analysis 403, loadings from a principal component analysis (for example, a dimensionality reduction of data to orthonormal space), feature importance from decision trees 201|404b, and/or the like.

FIG. 5 is an example implementation illustrating the process of generating a DWRS after the predictive model training as described herein. For example, a DWRS may be generated by a second machine learning algorithm based on the variables generated and weighted by a first machine learning algorithm. It is recognized that there are other implementations of the process which may exclude some of the blocks/steps shown and/or may include additional blocks/steps not shown. Additionally, the block/steps discussed may be combined, separated into sub-blocks/sub-steps, and/or rearranged to be completed in a different order and/or in parallel.

The process may begin when at block 101, when a consumer's PII 100 is compared to PII from a DWdb 102 to determine whether the consumer's PII matches any PII in the DWdb 102 as described herein with reference to FIG. 1.

In block 500, the system may calculate consumer variables using the matching PII 101 and the model variables 400 described herein, particularly with reference to FIGS. 1 and 4. In block 501, once the consumer variables are calculated, the system may calculate an individual consumer DWRS as described herein, with reference to FIG. 4.

In block 502, the system may calculate subpopulation variables using the model variables 400 and data from the DWdb 102. This calculation may involve using subpopulation data and confirmed fraud and non-fraud data as described herein. For example, in some implementations, a subpopulation in 502 from the DWdb 102 may be records that match PII used legitimately (non-fraud) from CFNF cases and within an exposure date range that is aligned with CFNF activity dates. For example, an activity date from CFNF data 104 may be the date a fraud transaction occurred or the date of a legitimate inquiry. In some implementations, a purpose of the subpopulation is to serve as a low-risk base to which a consumer's DWRS and cyber metrics are merged 504 | 505 and compared in a Dark Web Risk Report. In block 503, the system may calculate subpopulation DWRS using the previously calculated subpopulation variables, for example, as described with reference to FIG. 4.

In block 504, the system may merge the cyber metrics that were generated using the consumer variables from block 500 and the subpopulation variables from block 502. As described herein, cyber metrics may include metrics that are intended to facilitate decision making and improve DWRS performance and consumer accountability. In block 505, consumer DWRS and subpopulation DWRS may be compared and/or merged. For example, as described further herein, the consumer DWRS may be plotted on a graph displaying the subpopulation DWRS for comparison purposes. In some implementations, a purpose of the subpopulation is to serve as a low-risk base to which a consumer's DWRS and cyber metrics are merged 504 | 505 and compared in a Dark Web Risk Report. In block 110, a DWRR may be generated by the system.

In some implementations, an average DWRS may be reported if the scores of two or more individuals were used, for example, subpopulation DWRS 108|503. In some implementations, the DWRS, or mean DWRS, is normalized to a value between a predetermined range 406, such as between 0 and 1000, 0 to 100, or the like, for better resolution. In some implementations, Dark Web Risk Scores are calculated for an individual consumer 501 and a mean subpopulation 503 from the DWdb 102. In some implementations, a subpopulation 108|502|503 from the DWdb are records that match PII used legitimately (non-fraud) from CFNF cases and within an exposure date range that is aligned with CFNF activity dates. For example, an activity date from CFNF data 104 may be the date a fraud transaction occurred or the date of a legitimate inquiry. In some implementations, a purpose of the subpopulation is to serve as a low-risk base to which a consumer's DWRS and cyber metrics are merged 504 | 505 and compared in a Dark Web Risk Report. In some implementations, both the consumer and subpopulation Dark Web Risk Scores 600 are plotted on a number line similar to 601 in FIG. 6 for a visual comparison between two scores. For example, each score in 601 may be represented with its own geometric shape. In some implementations, the consumer's DWRS may be color-coded to indicate a consumer's Dark Web risk level compared to a DWdb subpopulation. A consumer's Dark Web Risk Score may be colored red, for example, if the consumer's score is higher, by a distance metric, than the score from the DWdb subpopulation of PII used for legitimate transactions. Similar visualizations may also be used to present other risk factors, such as, for example, a consumer's email domain, breached websites containing a consumer's PII, breach website sector, password complexity, and/or the like.

2. PII Categories and Percent Contribution to Dark Web Risk Score

In some implementations, compromised PII may be grouped into one of several PII categories. For example, one category "Online Credentials" may be a PII category for a consumer's email addresses and usernames to online bank accounts, online shopping sites, social media, gambling sites, and/or the like, that were found on the Dark Web. In another example, a "Financials" category may be a PII category for numbers for a consumer's credit, debit cards, US and/or international bank accounts, bank routing numbers, and/or the like. In another example, a "Physical Location" category may include information about a consumer's location, such as address, zip code, phone number, IP address, and/or the like. In another example, PII that was exposed from a breach may be included in a "Breached Website" category. In another example, a "Password Strength" category for a consumer may be one of, or a combination of, weak, moderate, good, strong, encrypted, hashed, hashed plus salt, and/or the like. In another example, a consumer's driver's license, social security card, passport number, and/or the like may fall under the category of "Government Issued Identification". As shown in blocks 602 | 603 of FIGS. 6A and 6B, the percent contribution of a PII category to a consumer's risk score may be proportional to the weighted sum of all variable values related to the category. For example, if a consumer's SSN was exposed on the Dark Web, the percent contribution of the "Government Issued Identification" category may be proportional to the weighted sum of model variable values for all SSN-related variables, such as, for example, SSN_FOUND and SSN_EXPOSED_IN_30_DAYS. For example, to calculate percent contribution, the category's weighted sum may be normalized by the consumer's weighted sum for all model variable values in all categories. These percent categorical contributions may be visualized in a Dark Web Risk Report as a pie chart 603, histogram, and/or other visualization suitable for the data. In some implementations, percent contributions from risk variables and exposure volumes may also be calculated and visualized in the DWRR in a similar manner.

3. Dark Web Exposure: Dates and Volumes

FIG. 6B illustrates an implementation of a user interface showing portions of a DWRR. For example, in some implementations, the interface may show reporting dates and volumes of a consumer's compromised PII, such as, for example, email exposure. In some implementations, dates and cumulative sums 606 of exposures may be visualized 607 in a number of forms, such as, for example, a bar graph/chart, pie chart, line graph/chart, histogram, area chart, dot graph/plot, scatter plot, bubble chart, and/or the like. Alternatively, in some implementations, dates of PII exposure may be visualized in a calendar view. For example, highlighting portions of a visualization can be used for a date, or dates, at which a consumer's cumulative exposures are higher than an average cumulative exposure of a subpopulation from the compromised PII database. In some implementations, bars of a histogram, for example, may be colored red to indicate that a consumer's cumulative email exposure is higher than the average cumulative email exposures of a DWdb subpopulation. The visualizations may encourage a consumer to proactively change a low-complexity password to a more secure password. Alternatively, a consumer may choose to use a new email account and password to invalidate old emails and passwords that have and/or may have been successfully used for account takeovers. Although the example shows email exposure dates, the frequencies of exposures of other PII, such as driver's license, SSN, credit card, passport number, address, phone number, and/or the like may also be included in the report.

4. Password Analysis

In some implementations, by using a large collection of email accounts and passwords in the Dark Web Database, analysis of a consumer's historical use of exposed passwords can be performed. For example, a "Password Analysis" section 604 of the DWRR, which may be presented as shown as 605 in FIG. 6, visualizes the historical security levels of a consumer's password usage as fractions of clear text, repeated, hashed, and/or encrypted passwords. Historical, in this sense, is within the time period of PII exposure dates in the Dark Web Database that align with CFNF fraud dates in the training data. In some implementations, calculation of a consumer's password complexity can be performed, where the password complexity can be defined as being proportional to a log sum of the number of different types of characters that make up a consumer's clear text passwords in DWdb 102 for example. In some implementations, if multiple consumer passwords are in the DWdb 102, an aggregated password complexity can be reported, such as but not limited to mean and/or standard deviation. In some implementations, A visualization 605 can be used to display password complexity. Similar visualizations may be used to report percentage of historical clear text, repeated clear text, hashed, and/or encrypted passwords. As illustrated in 605, the visualizations may each compare a consumer's password metrics to a DWdb low risk subpopulation. In some implementations, the password analysis section of the DWRR may also highlight exposure volumes and dates in a graphical format, such as, for example, similar to the histogram 607. For example, the graph may highlight volumes and dates from which the cumulative number of exposed passwords is greater than the mean cumulative number of exposed passwords for a subpopulation of the Dark Web Database. In some implementations, the password analysis section may be presented on the DWRR as a Bar graph/chart, pie chart, line graph/chart, histogram, area chart, dot graph/plot, scatter plot, bubble chart, and/or the like.

5. Website Domain Risk

In some implementations, a Dark Web Database, or associated systems, can be configured to capture website and server addresses that previously exposed a consumer's PII (for example, through a breach or hack). In some implementations, the risk level of a breached website can be determined during a variable creation phase described in section B3 or "Website Domain Categories and Risk", for example. In some implementations, a Dark Web Risk Report can be configured to display the top riskiest websites 608 based on website-related risk variables that may have been used to train a model. For example, a website may be highlighted if a consumer's PII was exposed from the website, or potentially several websites, as illustrated by the lighter gray bars in the histogram 608. The list of riskiest websites may guide a consumer to avoid risky websites that have been breached, for example. In some implementations, the Dark Web Database includes website source categories and compromise types, such as breached sites, phished PII, key logged PII, IRC chat rooms, identity theft forums, and/or the like. In some implementations, this information may be presented as a bar graph/chart, pie chart, line graph/chart, histogram, area chart, dot graph/plot, scatter plot, bubble chart, and/or the like. For example, as shown in FIG. 6B, a histogram may be used to conveniently present the information to the consumer viewing the DWRR. The graph, such as, for example, the histogram 608 in the Dark Web Risk Report may also be used to guide consumers to avoid risky source websites that were compromised in a specific manner. For example, the histogram, or other appropriate visualization, may also help guide a consumer to avoid high-risk website categories that were described in section B3 or "Website Domain Categories and Risk", for example.

6. Drive and Modify a Consumer's Online Behavior

Figure 7:
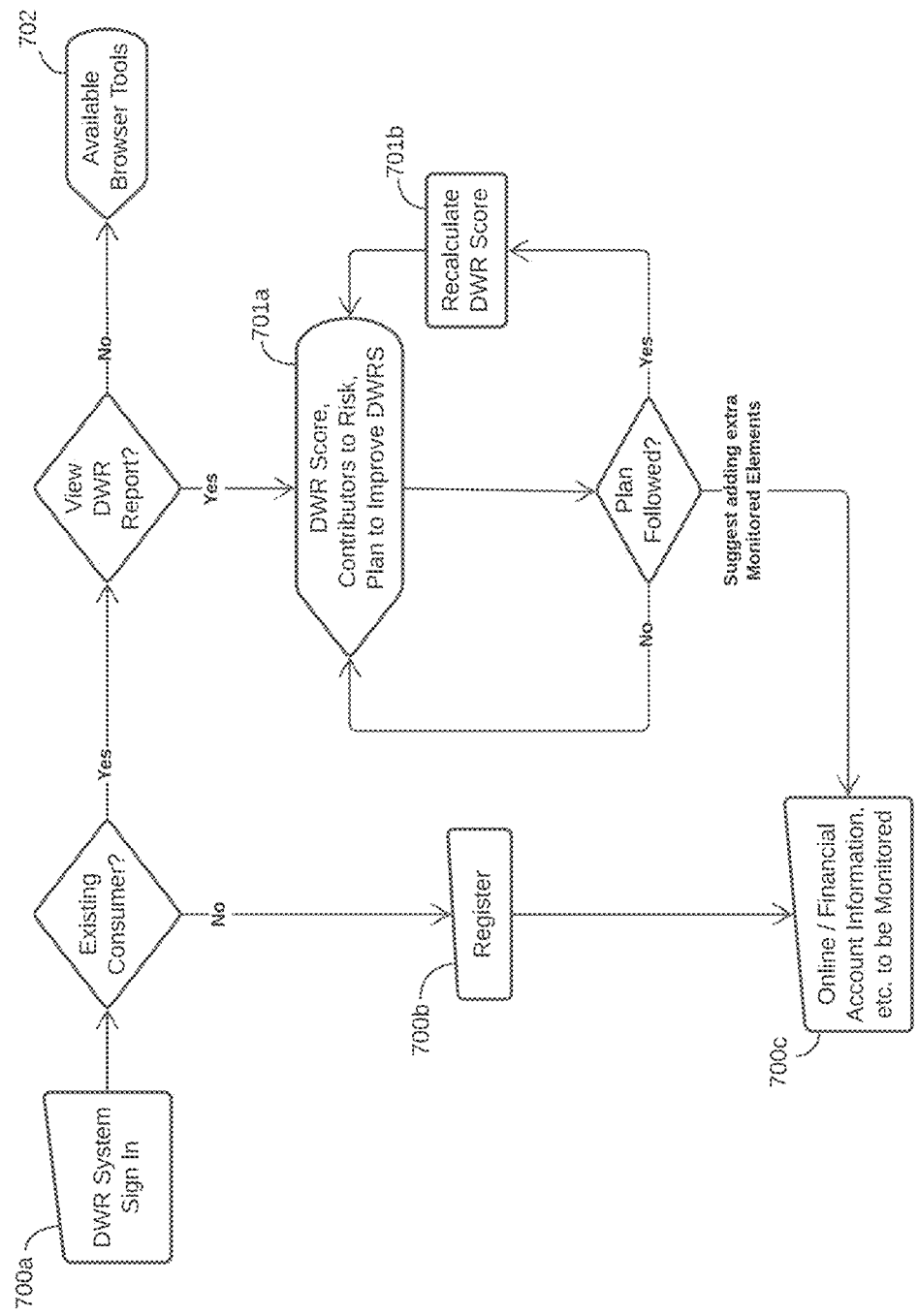
FIG. 7 is a block diagram illustrating an implementation of a process of a system used to drive or enhance the security of a consumer's online behavior.

In some implementations, a consumer's Dark Web Risk Score and cyber metrics may be used to create a system as illustrated in FIG. 7. FIG. 7 is a block diagram illustrating an implementation of a process of a system used to drive or enhance the security of a consumer's online behavior, for example, as implemented by a Dark Web Risk System. The Dark Web Risk Score, for example, can guide a consumer to more secure online practices. In some implementations, the process may begin at 700a when a consumer accesses the Dark Web Risk system such as, for example, by opening a program associated with the Dark Web Risk System, navigating to a domain associated with the Dark Web Risk System, and/or the like through a consumer device. The system may require an online account at 700a which the consumer may use to access the system. For example, the account may require one or more of: a username, email, password, phone number and/or the like that a consumer must input at the "Sign In" stage to access the system. In some implementations, when a consumer logs into the system, an alert may be sent to the consumer, such as, for example, an email, SMS, push notification, and/or the like to ensure that the person accessing the account is the consumer or is someone with permission from the consumer. If a consumer has not previously created an account, the system may direct the consumer to 700b, where a consumer may register for an account. Registering for an account may require, for example, inputting one or more of: a username, email, password, phone number and/or the like. Registering may also require inputting some consumer PII and/or payment information required to use the system.

Once a user or consumer is registered, the system may prompt the consumer to enter personal information including, for example, financial and online account information 700c the consumer wish to be included in their score. If the consumer already had an account, this information may already have been input to the system. Having signed in or successfully completed the registration process, the consumer may use the system to view their DWRR. For example, as described herein, in some implementations, a score, such as a DWRS, can be generated and displayed in a DWRR.

Figure 9A:
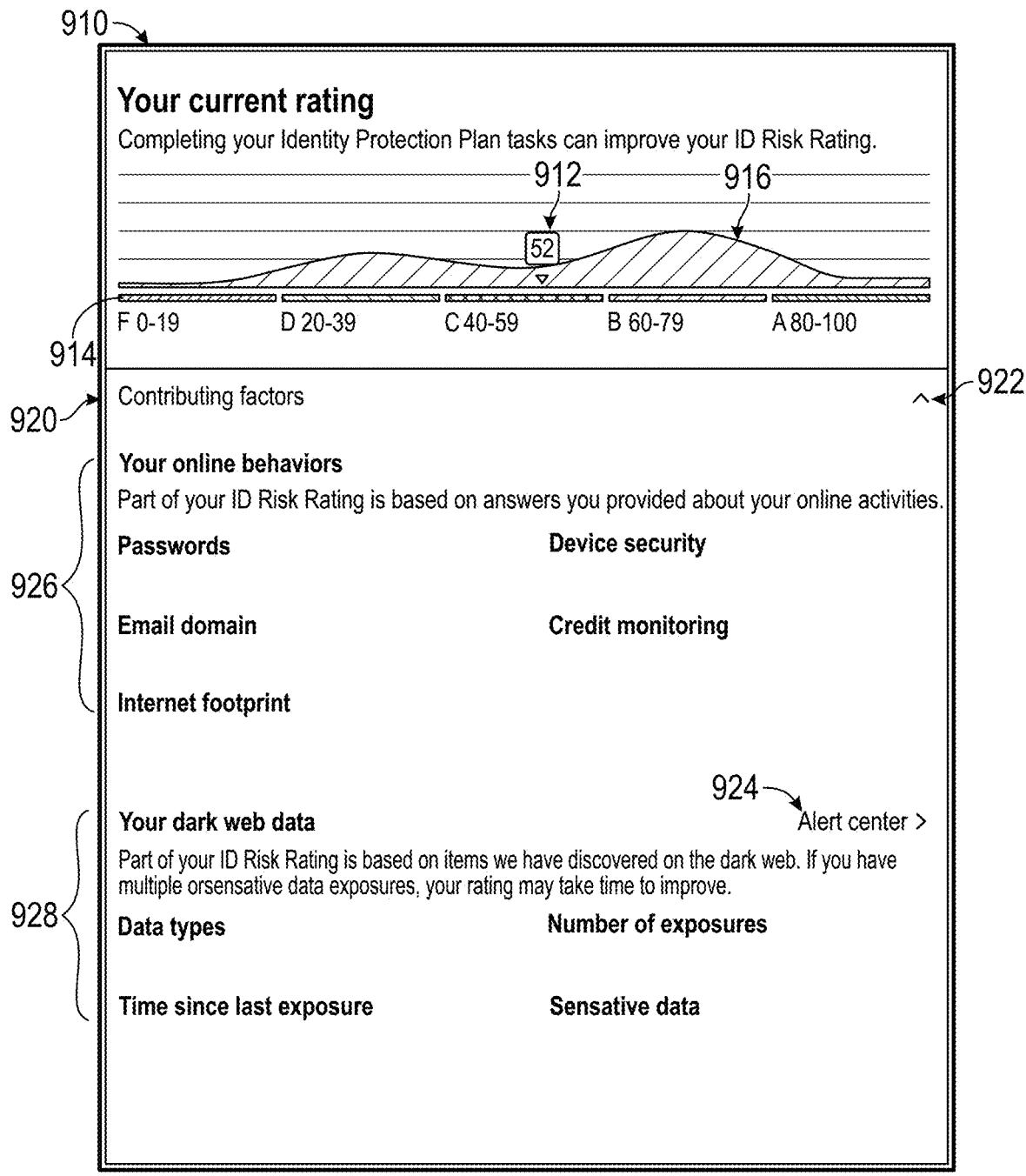
FIG. 9A illustrates an example implementation of a user interface showing portions of a report (for example, a Dark Web Risk Report).
Figure 9B:
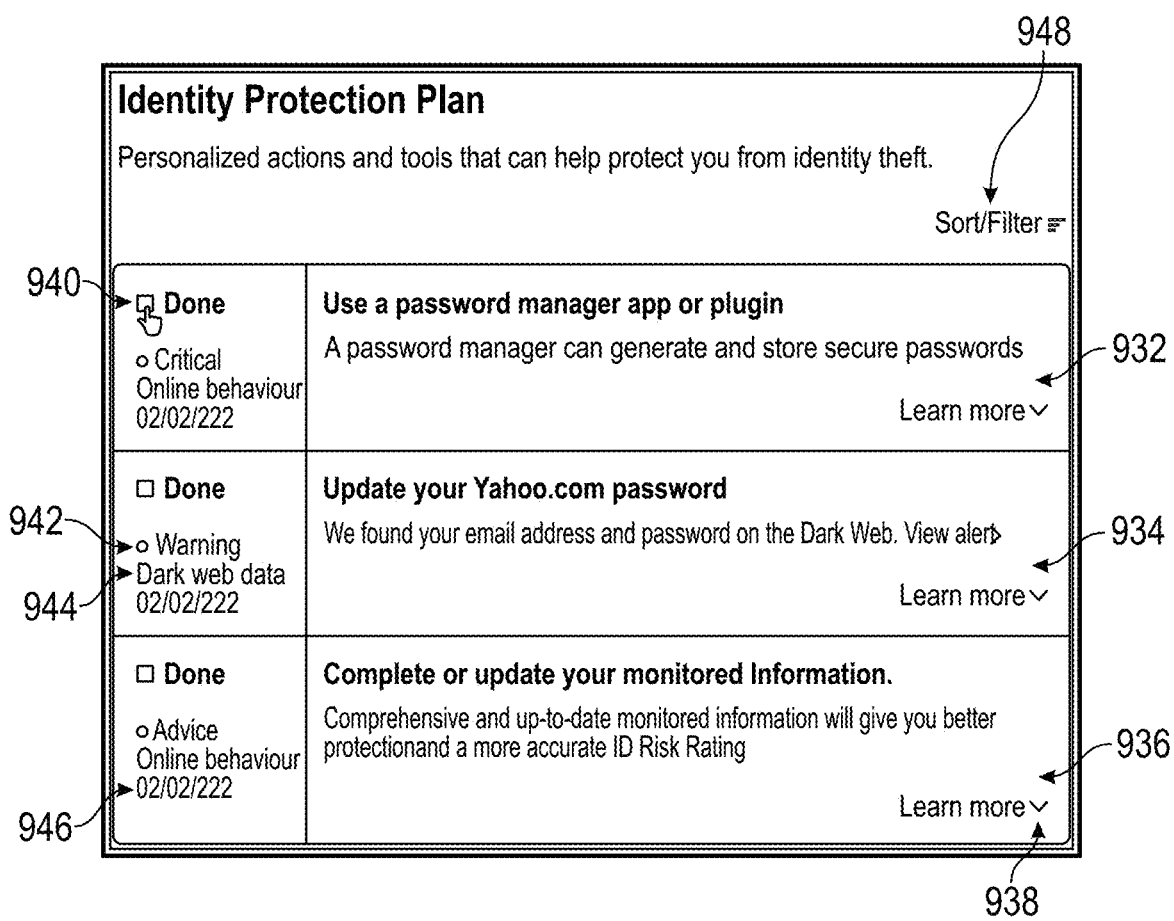
FIG. 9B illustrates an example implementation of a user interface showing a portion of a report (for example, an Identity Protection Plan feature).

FIGS. 9A and 9B illustrate implementations of user interfaces showing portions of one or more reports (e.g., Dark Web Risk Report). In FIG. 9A, in some implementations, the user interface may include a current rating section 910, that may include a consumer's DWRS 912, subpopulation DWRS(s) 916, and a visual indication of a score rating range, such as, for example, graph 914. For example, as shown in FIG. 9, the DWRS 912 may be plotted on graph 914, where the bottom axis includes a categorization of the DWRS, such as, for example, letter grades F, D, C, B, A, and/or the like, and/or a numerical representation of which scores correspond to which letter grade, for example, 0-19 for a "F" grade. The graph 914 may also be color coded for each section. Additionally, the DWRS 912 may be presented as the same color corresponding to the section the score falls in. In some implementations, a subpopulation DWRS 916 may also be presented in section 910. For example, the subpopulation DWRS 916 may be graphically presented on graph 914 to show the distribution of DWRSs in a subpopulation. A user viewing the DWRR may use the subpopulation DWRS 916 to compare to their DWRS as a way to evaluate their score. In another implementation, the subpopulation DWRS 916 may be presented in another manner, such as, for example, as a percentage range, average score, in a different graphical format, and/or the like.

In some implementations, the user interface may also include a contributing factors section 920, which may be configured as a drop-down menu such that it can be accessed by, for example, drop down button 922. In other implementations, other presentation methods for section 920 may be used. The contributing factors section 920 may include information regarding a consumer's online behavior, such as online behavior section 926. Online behavior section 926 may include subsections with additional information, such as, for example, an analysis of the consumer's passwords, email domain, internet footprint, device security, credit monitoring, and/or the like. Section 920 may also include information on the consumer's dark web data, such as, for example, dark web data section 928. Dark web data section 928 may include, for example, information or analysis on the data types found on the dark web and/or other sections of the internet, the number of exposures, the time since the last exposure, sensitive data that may have been exposed, and/or the like. In some implementations, DWRR sections discussed with reference to FIGS. 6A and 6B may be included in the contributing factors section 920. In some implementations, there may be one or more graphs associated with each elements to provide further information to the consumer. Section 920 may also include a link or button 924 that can be accessed by a consumer to generate a new user interface to present the alert center. In some implementations, the alert center may allow a consumer to perform various actions such as, for example, add or modify the consumer's online and/or financial information that the system monitors. The alert center is discussed herein with reference to block 700c in FIG. 7.

In some implementations, after the consumer has viewed the DWRR, the system may provide actionable recommendations based on the information 701*a*. The actionable recommendations are generated through analysis of the records which support the Dark Web Risk Score. The Risk Score engine is used to determine which record, when excluded, minimizes the score. This is the dominant record. The records are also analyzed for information content and potency for commission of identity fraud. These metrics are used to rank the support records based on the effectiveness of reducing the Dark Web Risk Score and overall risk. The actionable recommendations form the Identity Protection Plan.

FIG. 9B illustrates an implementation of a user interface showing a portion of a report (e.g., an Identity Protection Plan feature) that may be accessed by a user of the system. For example, in some implementations, the Identity Protection Plan may include one or more personalized actions and tools that can help protect a consumer from identity theft. For example, as shown in FIG. 9B, there are three example recommended actions/tools 932, 934, and 936, that may be generated for a particular consumer. Each action/tool may include additional information about the specific action or tool. For example, by clicking the learn more drop down 938, the consumer may be presented with additional information on the user interface. In other implementations, there may be a link to another section of the user interface where a consumer can learn more info. In some implementations, a consumer may also be presented with the tool to implement the action. For example, if the system recommends use of a password manager app or plugin, the consumer may be presented with options to download and install a password manager app or plugin. Actions/tools may also include a user selectable checkbox, such as, for example checkbox 940. In some implementations, checkbox 940 may be for the consumer's personal reference, so that they know they have completed the action or utilized the tool. In other implementations, a consumer may click checkbox 940 to let the system know that the action have been completed or the tool have been utilized. In response to the user action, the system may generate a new DWRS as shown in FIG. 7. Actions/tools may also each include a label 942 and/or category 944. The category 944 may be used categorize the action/tool, such as, for example, online behavior, dark web data, and/or the like. The label 942 may be used to indicate to the consumer how urgent the action or tool is. For example, the system may indicate an action as critical because of the positive and/or immediate benefit it may provide the consumer with regards to protecting their PII. For example, in FIG. 9B the suggestion to use a password manager app or plugin is labeled as critical. In another example, the system may categorize an action as a warning. For example, in FIG. 9B, the system indicates that the consumer's email and password were found on the Dark Web and generated a warning as a result. In another example, the system may categorize an action as advice. For example, the advice categorization may be used for actions/tools that may not be critical but may benefit the consumer or the system's ability to accurately generate a DWRS. For example, in FIG. 9B, the system categorized a recommendation that the consumer complete or update their monitored information as advice. Each action/tool may also have a date 946, which indicates to the consumer how recent the update is. In some implementations, actions and tools may also be color coded. The Identity Protection Plan feature may also include a sort/filter button 948 that a user may select to sort/filter the actions/tools. For example, a user may use the button 948 to sort the actions by date, category 944, label 942, and/or the like. Similarly, a user may user the button 948 to filter the results by date, category 944, label 942. For example, a user may wish only to view critical actions or tools.

Generally, in some implementations, there are two facets of the Identity Protection Plan, reactive and proactive. The reactive portion aims to guide the consumer to remediate a Dark Web and/or other Web exposure by rendering the exposed information impotent for the perpetration of identity fraud. The consumer is prompted to change or dissociate from the exposed information. For example, if a password is exposed, as shown in FIG. 9B, the consumer is recommended to change that password. Records containing the previous password, now no longer current, drop from the score calculation, which may for example, decrease the DWRS. In another example, if an account number or title has been exposed, closing that account dissociates the exposed record from the consumer, improving the score. The proactive portion of the Protection Plan encourages Cyber hygiene best practices. These practices may include changing passwords periodically, reducing password reuse, using email boxes targeted for specific purposes. Through reminding the consumer of the best practices and gathering consent that they are in compliance, the risk is reduced and hence the risk score improves. The Dark Web Risk score may also have the capability via $3^{rd}$ party integrations to automatically verify and validate that the consumers have indeed improved their Cyber hygiene best practices by scanning their wider digital footprint.

The consumer following the Protection Plan, whether in full or partially, can result in a lower risk score over time. In some implementations, and in the event that the DWRR suggested actions were completed, a new DWRS score can be calculated 701*b* and a new DWRR is displayed 701*a*. If the consumer decides to not take action, for example, the system can recommend adding additional monitored elements and may direct a consumer to 700*c*. In some implementations, a consumer with a high Dark Web Risk Score may be required to change existing low complexity passwords (for example, through the system). In some implementations, the system can also make available for download browser tools 702, such as plugins or extensions, which alert a consumer of risky websites determined by model variable values representing website-related risk. In addition, in some implementations, the browser tool alerts consumers of sites that the system categorized negatively, such as websites harboring malware, such as those used for phishing or keylogging.

In some implementations, the DWRR may provide unique benefits to individual consumers. For example, because the DWRR is tailored to a specific consumer based on their unique compromised PII, the recommendations and suggestions provided in the Identity Protection Plan are uniquely tailored to the individual consumer. Rather than only providing generic risk-reducing recommendations, the DWRR provides recommendations appropriate for the specific consumer and in some implementations weighs the importance of each recommendation. Recommendations as used herein includes actions and tools generated by the system as part of the Identity protection plan. Because it would be impossible for a consumer to review which elements of their PII are currently compromised on the internet, the DWRR provides a unique summary of risk and an action plan to reduce the likelihood of future fraud for each consumer.

Dark Web Risk System

Figure 8:
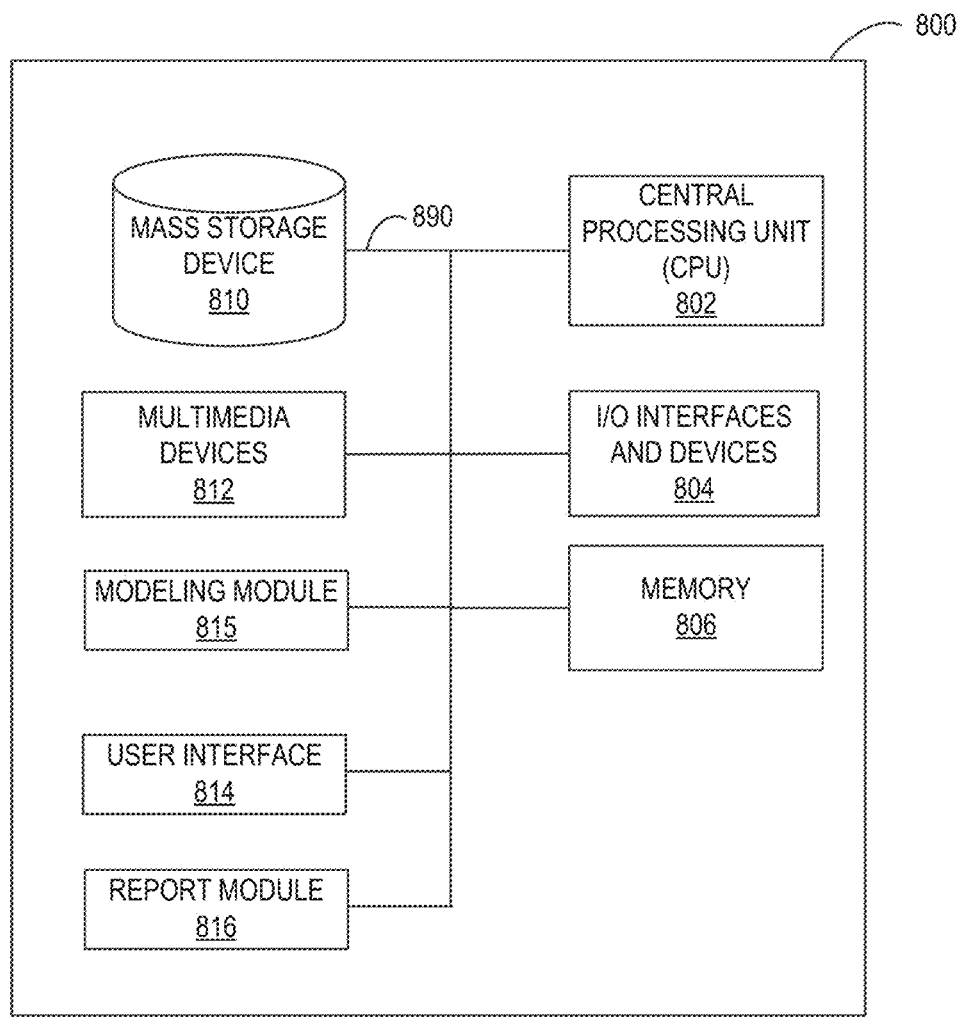
FIG. 8 is a block diagram corresponding to an aspect of a hardware and/or software component of an example implementation of a device in the systems described herein.

FIG. 8 is a block diagram corresponding to one implementation of a device 800 used to implement the systems and methods described herein, for example as implemented by a Dark Web Risk System. The illustrated device 800 includes a modeling module 815, a report module 816, and a user interface module 814. The device 800 also includes one or more of a central processing unit 802 (CPU or processor), input/output interfaces and devices 804, a mass storage device 810, multimedia devices 812), and one or more communication channels 890, such as, for example a bus. The hardware and/or software components may be used to implement one or more features of the systems and methods described herein. Further, in some implementations, one or more modules described below, such as a user interface module 814, or a report module 816 may be included with, performed by, or distributed among different and/or multiple devices of the Dark Web Risk System. For example, certain user interface functionality described herein may be performed by the user interface module 814 of various devices such as the Dark Web Risk System. It is also recognized that one or more components of the Dark Web Risk System may be implemented on different systems. For example, the predictive model could be developed of a first system and then deployed on a different system.

In some implementations, the various modules described herein may be implemented by either hardware or software. In an implementation, various software modules included in the Dark Web Risk System may be stored on a component of the Dark Web Risk System itself (for example, a local memory 806 or a mass storage device 810), or on computer readable storage media or other component separate from the Dark Web Risk System and in communication with the device 800 via a network or other appropriate means.

As shown in FIG. 8, the Dark Web Risk System includes the modeling module 815. As described herein, the modeling module 815 may generate one or more models for processing data. In some implementations, the modeling module 815 may also apply the generated models to the data to generate predicted features, scores, or measurements. In some implementations, the one or more models may be stored in the mass storage device 810 or the memory 806. In some implementations, the modeling module 815 may be stored in the mass storage device 810 or the memory 806 as executable software code that is executed by the processor 802. This, and other modules in the Dark Web Risk System, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the implementations described herein, the Dark Web Risk System is configured to execute the modeling module 815 to perform the various methods and/or processes as described herein. It is recognized that the instructions and components for generating models may be included in the Dark Web Risk System or may be stored and executed on a connected or remote system.

In some implementations, the report module 816 may be configured to generate a report, notification, or output mentioned and further described herein. In some implementations, the report module 816 may utilize information received from the Dark Web Risk System, the data acquired from the data stores, and/or the user of a consumer device to generate the report, notification, or output. For example, the Dark Web Risk System may receive information that the Dark Web Risk System uses to acquire information from the data stores and generate models for processing of the information. In some implementations, the report module 816 may be used to apply the models and/or generate notification data packages, reports, or output that may include any pertinent information that are of interest.

The user interface module 814 may be configured to generate and/or operate user interfaces of various types. In some implementations, the user interface module 814 constructs pages, applications, or displays to be displayed in a web browser, computer/mobile application, or other interface channel. In some implementations, the user interface module 814 may provide an application or similar module for download and operation on a computer or system through which the client may interface with the Dark Web Risk System to obtain the desired report or output. The pages or displays may, in some implementations, be specific to a type of device, such as a mobile device or a desktop web browser, to improve usability for the particular device. In some implementations, the user interface module 814 may also interact with a client-side application, such as a mobile phone application, a standalone desktop application, or user communication accounts (for example, e-mail, SMS messaging, and so forth) and provide data as necessary to display determinations. For example, as described herein, the Dark Web Risk System may be accessible to the client via a website or similar interface.

After the Dark Web Risk System receives a user inputs, the user may view the received information via the I/O interfaces and devices 804 and/or the user interface module 814. Once the Dark Web Risk System receives the corresponding information from the data stores (for example, via the I/O interfaces and devices 804 or via the user interface module 814), the processor 802 or the modeling module 815 may store the received inputs and information in the memory 806 and/or the mass storage device 810. In some implementations, the received information from the data stores may be parsed and/or manipulated by the processor 802 before the generated models are applied to the information.

In some implementations, one or more of the processors 802 and the modeling module 815 employs machine learning or similar algorithms and/or systems to generate models according to which customized advertisement content and advertisement location information can be selected or determined by the system. In some implementations, the machine learning continuously updates, improves, and trains the models. For example, the models will be adapted to make stronger and better associations and predictions. In some implementations, manual review can help the Dark Web Risk System and/or associated machine learning algorithms better predict outcomes based on prior "successes" and "failures".

The device 800 may comprise, for example, a computer that is IBM, Macintosh, or Linux/Unix compatible or a server or workstation or a mobile computing device operating on any corresponding operating system. In some implementations, the device 800 interfaces with one or more third party systems, such as, for example, a smart phone, a personal digital assistant, a kiosk, a tablet, a smart watch, a car console, or a media player. In some implementations, the device 800 may comprise more than one of these devices. The CPU 802 may control operation of the Dark Web Risk System. The CPU 802 may also be referred to as a processor. The processor 802 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The I/O interface 804 may comprise a keypad, a microphone, a touchpad, a speaker, and/or a display, or any other commonly available input/output (I/O) devices and interfaces. The I/O interface 804 may include any element or component that conveys information to the user of the device 800, and/or receives input from the user. In one implementation, the I/O interface 804 includes one or more display devices, such as a monitor, that allows the visual presentation of data to the consumer. More particularly, the display device provides for the presentation of GUIs, application software data, websites, web apps, and multimedia presentations, for example.

In some implementations, the I/O interface 804 may provide a communication interface to various external devices. For example, the Dark Web Risk System and/or consumer devices may be electronically coupled to a network, which comprises one or more of a local area network (LAN), wide area network (WAN), and/or the Internet. Accordingly, the I/O interface 804 includes an interface allowing for communication with the network, for example, via a wired communication port, a wireless communication port, or combination thereof. The network may allow various computing devices and/or other electronic devices to communicate with each other via wired or wireless communication links.

The memory 806, may include one or both of read-only memory (ROM) and random access memory (RAM), may provide instructions and data to the processor 802. For example, data received via inputs received by one or more components of the Dark Web Risk System and/or the consumer devices may be stored in the memory 806. A portion of the memory 806 may also include non-volatile random access memory (NVRAM). The processor 802 typically performs logical and arithmetic operations based on program instructions stored within the memory 806. The instructions in the memory 806 may be executable to implement the methods described herein. In some implementations, the memory 806 may be configured as a database and may store information that is received via the user interface module 814 or the I/O interfaces and devices 804.

The device 800 also includes the mass storage device 810 for storing software, data, or information (for example, the generated models or data obtained to which the models are applied, and so forth). Software may include any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the processing system to perform the various functions described herein. Accordingly, the Dark Web Risk System and/or consumer devices may include, for example, hardware, firmware, and software, or any combination therein. The mass storage device 810 may comprise a hard drive, diskette, solid state drive, or optical media storage device. In some implementations, the mass storage device may be structured such that the data stored therein is easily manipulated and parsed.

It is recognized that the hardware and/or software components, as discussed below with reference to the block diagram of the device 800 may be included in any of the components of the systems described herein, and/or systems designed and configured to execute methods described herein. These various depicted components may be used to implement the systems and methods described herein.

Computing Systems

Any of the components or systems described herein may be controlled by operating system software, such as Windows XP, Windows Vista, Windows 7, Windows 8, Windows Server, UNIX, Linux, SunOS, Solaris, iOS, Android, Blackberry OS, or other similar operating systems. In Macintosh systems, the operating system may be any available operating system, such as MAC OS X. In other implementations, the components or systems described herein may be controlled by a proprietary operating system. Conventional operating systems control and schedule computer processes for execution, perform memory management, provide file system, networking, I/O services, and provide a user interface, such as a graphical user interface (GUI), among other things.

Computing devices, which may comprise the software and/or hardware described above, may be an end user computing device that comprises one or more processors able to execute programmatic instructions. Examples of such computing devices are a desktop computer workstation, a smart phone such as an Apple iPhone or an Android phone, a computer laptop, a tablet PC such as an iPad, Kindle, or Android tablet, a video game console, or any other device of a similar nature. In some implementations, the computing devices may comprise a touch screen that allows a user to communicate input to the device using their finger(s) or a stylus on a display screen.

The computing devices may also comprise one or more client program applications, such as a mobile "app" (for example, iPhone or Android app) that may be used to visualize data, and initiate the sending and receiving of messages in the computing devices. This app may be distributed (for example downloaded) over the network to the computing devices directly or from various third parties such as an Apple iTunes or Google Play repository or "app store." In some implementations, the application may comprise a set of visual interfaces that may comprise templates to display vehicle history reporting and financing information. In some implementations, as described above, visual user interfaces may be downloaded from another server or service. This may comprise downloading web page or other HTTP/HTTPS data from a web server and rendering it through the "app". In some implementations, no special "app" need be downloaded and the entire interface may be transmitted from a remote Internet server to computing device, such as transmission from a web server to an iPad, and rendered within the iPad's browser.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the platform 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some implementations, the system distinguishes between the initial transmission of loan application data required for user interfaces, and subsequent transmissions of user interface data so that it may transmit only portions that are necessary to update a vehicle history reporting and financing user interface. This may be done, for example, using an XMLHttpRequest (XHR) mechanism, a data push interface, Asynchronous JavaScript and XML ("Ajax"), or other communication protocols.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process blocks may be stored, persistently or otherwise, in any type of non-transitory computer storage such as, for example, volatile or non-volatile storage.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example implementations. The example systems and components described herein may be configured differently than described. For example, elements may be added to, removed from, or rearranged compared to the disclosed example implementations.

Any process descriptions, elements, or blocks in the flow diagrams described herein and/or depicted in the attached figures should be understood as potentially representing modules, segments, or portions of code which include one or more executable instructions for implementing specific logical functions or blocks in the process. Alternate implementations are included within the scope of the implementations described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

The I/O devices and interfaces provide a communication interface to various external devices and systems. The computing system may be electronically coupled to a network, which comprises one or more of a LAN, WAN, the Internet, or cloud computing networks, for example, via a wired, wireless, or combination of wired and wireless, communication links. The network communicates with various systems or other systems via wired or wireless communication links, as well as various data sources.

Data sources may include one or more other internal or external data sources. In some implementations, one or more of the databases or data sources may be implemented using an open-source cross-platform document-oriented database program, such as a Mongo dB, a relational database, such as IBM DB2, Sybase, Oracle, CodeBase and Microsoft® SQL Server as well as other types of databases such as, for example, a flat file database, an entity-relationship database, and object-oriented database, and/or a record-based database.

It is recognized that the term "remote" may include systems, data, objects, devices, components, or modules not stored locally, that are not accessible via the local bus. Thus, remote data may include a system that is physically stored in the same room and connected to the computing system via a network. In other situations, a remote device may also be located in a separate geographic area, such as, for example, in a different location, country, and so forth.

Additional Implementations

It is to be understood that not necessarily all objects or advantages may be achieved in accordance with any particular implementation described herein. Thus, for example, those skilled in the art will recognize that certain implementations may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. In some implementations, at least some of the processes may be implemented using virtualization techniques such as, for example, cloud computing, application containerization, or Lambda architecture, so on, alone or in combination. The code modules may be stored in any type of non-transitory computer-readable medium or other computer storage device. Some or all the methods may be embodied in specialized computer hardware.

Many other variations than those described herein will be apparent from this disclosure. For example, depending on the implementation, certain acts, events, or functions of any of the algorithms described herein can be performed in a different sequence or can be added, merged, or left out altogether (for example, not all described acts or events are necessary for the practice of the algorithms). Moreover, in certain implementations, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the implementations disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the implementations disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can include electrical circuitry configured to process computer-executable instructions. In another implementation, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the implementations disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are understood within the context as used in general to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain implementations require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the implementations described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described implementations, the elements of which are to be understood as being among other acceptable examples. All such modifications and variations are intended to be included herein within the scope of this disclosure. The foregoing description details certain implementations of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Although particular implementations of the invention have been described in detail for purposes of illustration, various modifications and enhancements may be made without departing from the spirit and scope of the invention.

What is claimed is:

1. A system comprising:
    one or more data stores configured to store:
        computer-executable instructions;
        exposed personal identifiable information (PII) collected from one or more internet-accessible sources, wherein the exposed PII corresponds to a plurality of users;
        training PII associated with confirmed fraud cases and confirmed non-fraud cases; and
        first user PII associated with a first user;
    a network interface configured to communicate with a plurality of network devices; and
    one or more physical computer processors in communication with the one or more data stores, wherein the computer-executable instructions, when executed, configure the one or more physical computer processors to:
        access, by the network interface and from the one or more data stores, the exposed PII, the training PII, and the first user PII;
        generate a first predictive model by training a first machine learning algorithm, wherein the training comprises inputting the exposed PII corresponding to the plurality of users and the training PII into the first machine learning algorithm, wherein the training further includes comparing the training PII with a corresponding first subset of the exposed PII, wherein the first predictive model is configured to determine a likelihood of future fraudulent activities based on identifying data elements associated with confirmed fraud cases and confirmed non-fraud cases;
        provide, into the first predictive model, a first input comprising the first user PII and a corresponding second subset of the exposed PII, the second subset including PII associated with the first user;
        receive, from the first predictive model, a first output that includes a likelihood of future fraudulent activities associated with the first input;
        generate a first risk score and first recommendations for the first user based on the first output; and
        based at least in part on the first risk score, generate and transmit, to a first user device associated with the first user, display instructions configured to present an interactive user interface comprising a risk report, wherein the risk report comprises the first risk score and first recommendations.

2. The system of claim 1, wherein training the first machine learning algorithm further comprises:
    determining a first set of variables by comparing the exposed PII to the training PII;
    applying variable or feature importance to the first set of variables to generate a feature importance score for each variable of the first set of variables;
    determining a second set of variables based at least in part on application of the variable or feature importance, wherein the second set of variables is a subset of the first set of variables; and
    generating the first predictive model based on the second set of variables.

3. The system of claim 1, wherein the first recommendations include one or more of: closing an account, changing a password, changing a username, changing or removing PII associated with an account, changing multi-factor authentication settings, and changing general settings on an account.

4. The system of claim 1, wherein the first recommendations include recommended actions the first user can take to improve the first risk score or reduce a likelihood of future fraudulent activity with respect to the first user PII.

5. The system of claim 4, wherein the one or more physical computer processors are further configured to:
    monitor status of the first recommendations; and
    based on the monitoring, determine that a second recommendation of the first recommendations has been completed.

6. The system of claim 5, wherein the one or more physical computer processors are further configured to:
    in response to the determination that the second recommendation has been completed, generate an updated risk score and updated recommendations for the first user.

7. The system of claim 1, wherein the risk report further comprises one or more of: a subpopulation risk score, a user password analysis, a percent contribution analysis, a list of riskiest breached sites, and a web exposure analysis.

8. The system of claim 1, wherein confirmed fraud cases and confirmed non-fraud cases are determined by data collected from one or more of: one or more proprietary databases, one or more users, and one or more third party services or companies.

9. The system of claim 2, wherein the first predictive model comprises an equation comprising weighted coefficients and variables, wherein the variables are based at least in part on the second set of variables.

10. The system of claim 2, wherein the comparing of the exposed PII to the training PII comprises matching PII from the exposed PII collected from one or more internet-accessible sources with PII from the training PII associated with confirmed fraud cases and confirmed non-fraud cases.

11. The system of claim 2, wherein determining the second set of variables includes determining all variables of the first set of variables that comprise a feature importance score that meets a preconfigured threshold score that indicates a threshold predictive value for the first predictive model.

12. The system of claim 2, wherein the second set of variables includes fewer variables than the first set of variables.

13. A computer-implemented method comprising:
    accessing, by a network interface and from one or more data stores:
        exposed personal identifiable information (PII) collected from one or more internet-accessible sources, wherein the exposed PII corresponds to a plurality of users;
        training PII associated with confirmed fraud cases and confirmed non-fraud cases; and
        first user PII associated with a first user;
    generating a first predictive model by training a first machine learning algorithm, wherein the training comprises inputting the exposed PII corresponding to the plurality of users and the training PII into the first machine learning algorithm, wherein the training further includes comparing the training PII with a corresponding first subset of the exposed PII, wherein the first predictive model is configured to determine a likelihood of future fraudulent activities based on identifying data elements associated with confirmed fraud cases;

providing, into the first predictive model, a first input comprising the first user PII and a corresponding second subset of the exposed PII, the second subset including PII associated with the first user;

receiving, from the first predictive model, a first output that includes a likelihood of future fraudulent activities associated with the first input;

generating a first risk score and first recommendations for the first user based on the first output; and based at least in part on the first risk score, generating and transmitting, to a first user device associated with the first user, display instructions configured to present an interactive user interface comprising a risk report, wherein the risk report comprises the first risk score and first recommendations.

14. The method of claim 13, wherein training the first machine learning algorithm further comprises:

determining a first set of variables by comparing the exposed PII to the training PII;

applying variable or feature importance to the first set of variables to generate a feature importance score for each variable of the first set of variables;

determining a second set of variables based at least in part on application of the variable or feature importance, wherein the second set of variables is a subset of the first set of variables; and generating the first predictive model based on the second set of variables.

15. The method of claim 13, wherein the first recommendations include recommended actions the first user can take to improve the first risk score or reduce a likelihood of future fraudulent activity with respect to the first user PII.

16. The method of claim 14, wherein the comparing of the exposed PII to the training PII comprises matching PII from the exposed PII collected from one or more internet-accessible sources with PII from the training PII associated with confirmed fraud cases and confirmed non-fraud cases.

17. The method of claim 14, wherein determining the second set of variables includes determining all variables of the first set of variables that comprise a feature importance score that meets a preconfigured threshold score that indicates a threshold predictive value for the first predictive model.

18. A non-transitory computer storage medium storing computer-executable instructions that, when executed by a processor, cause the processor to at least:

access, by a network interface and from one or more data stores:

exposed personal identifiable information (PII) collected from one or more internet-accessible sources, wherein the exposed PII correspond to a plurality of users;

training PII associated with confirmed fraud cases and confirmed non-fraud cases; and first user PII associated with a first user;

generate a first predictive model by training a first machine learning algorithm, wherein the training comprises inputting the exposed PII corresponding to the plurality of users and the training PII into the first machine learning algorithm, wherein the training further includes comparing the training PII with a corresponding first subset of the exposed PII, wherein the first predictive model is configured to determine a likelihood of future fraudulent activities;

provide, into the first predictive model, a first input comprising the first user PII and a corresponding second subset of the exposed PII, the second subset including PII associated with the first user;

receive, from the first predictive model, a first output that includes a likelihood of future fraudulent activities associated with the first input;

generate a first risk score and first recommendations for the first user based on the first output; and based at least in part on the first risk score, generate and transmit, to a first user device associated with the first user, display instructions configured to present an interactive user interface comprising a risk report, wherein the risk report comprises the first risk score and first recommendations.

19. The non-transitory computer storage medium of claim 18, wherein training the first machine learning algorithm further comprises:

determining a first set of variables by comparing the exposed PII to the training PII;

applying variable or feature importance to the first set of variables to generate a feature importance score for each variable of the first set of variables;

determining a second set of variables based at least in part on application of the variable or feature importance, wherein the second set of variables is a subset of the first set of variables; and generating the first predictive model based on the second set of variables.

20. The system of claim 1, wherein the risk report further comprises one or more of: exposure details that include quantities of exposed first user information, password analytics that include user password analysis, source analytics that include information on the one or more internet-accessible sources where the exposed PII was collected from, and PII exposures that include quantities of exposed first user PII.

* * * * *